(12) United States Patent
Mahany

(10) Patent No.: US 7,676,198 B2
(45) Date of Patent: Mar. 9, 2010

(54) SPREAD SPECTRUM TRANSCEIVER MODULE UTILIZING MULTIPLE MODE TRANSMISSION

(75) Inventor: Ronald L. Mahany, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 1506 days.

(21) Appl. No.: 10/684,650

(22) Filed: Oct. 14, 2003

(65) Prior Publication Data

US 2004/0077352 A1    Apr. 22, 2004

Related U.S. Application Data

(63) Continuation of application No. 08/973,195, filed as application No. PCT/US96/09474 on Jun. 3, 1996, now Pat. No. 6,697,415.

(51) Int. Cl.
  *H04B 1/00*  (2006.01)
  *H04B 7/00*  (2006.01)
(52) U.S. Cl. ............................ 455/69; 455/88; 455/558; 455/557; 455/552.1; 455/556.1; 375/130; 375/219; 375/133; 375/149; 370/342; 370/335
(58) Field of Classification Search ................... 455/69, 455/557, 558, 556.1, 552.1, 448, 88, 556.2; 375/130, 133, 141, 146, 149, 150; 370/338
See application file for complete search history.

(56) References Cited

U.S. PATENT DOCUMENTS 3,665,164 A    5/1972    Beveridge .................... 235/460

(Continued)

FOREIGN PATENT DOCUMENTS

EP    0194115    9/1986

(Continued)

OTHER PUBLICATIONS

News Release "Norand Introduces Enhanced Wireless LAN Capabilities", May 16, 1995, by Norand Corporation, Cedar Rapids, Iowa, pp. 1-4.

(Continued)

*Primary Examiner*—Marceau Milord
(74) *Attorney, Agent, or Firm*—McAndrews, Held & Malloy, Ltd.

(57) ABSTRACT

A data transceiver module for digital data communications in a portable hand-held data terminal has multiple data spread spectrum modes which include direct sequence and frequency function modulation algorithms. The transceiver module has multiple user or program configurable data rates, modulation, channelization and process gain in order to maximize the performance of radio data transmissions and to maximize interference immunity. Various module housings, which may be PCMCIA type, are able to be mated with a suitably designed data terminal. Media access control protocols and interfaces of multiple nominal operational frequencies are utilized. Wireless access devices in a cell based network each consider a variety of factors when choosing one of a plurality of modes of wireless operation and associated operating parameters. Such selection defines a communication channel to support wireless data, message and communication exchanges. In further embodiments, the wireless access devices also support a second channel, a busy/control channel, for managing communication on the main communication channel and to overcome roaming and hidden terminal problems. Roaming terminal devices are also configured to support the dual channel design. Such configuration in both circumstances may involve the use of a multimode radio that is timeshared between the two channels or two radios, one dedicated to each channel.

24 Claims, 36 Drawing Sheets

U.S. PATENT DOCUMENTS

| | | | |
|---|---|---|---|
| D230,859 S | 3/1974 | Kurosu | D26/56 |
| 3,826,900 A | 7/1974 | Moellering | 250/568 |
| 3,947,817 A | 3/1976 | Requa | 235/472 |
| 3,976,973 A | 8/1976 | Martin et al. | 235/472 |
| 4,002,892 A | 1/1977 | Zielinski | 307/150 |
| 4,005,400 A | 1/1977 | Engdahl | 340/365 R |
| 4,017,725 A | 4/1977 | Roen | 235/152 |
| 4,020,527 A | 5/1977 | O'Neill | 16/110 |
| 4,058,838 A | 11/1977 | Crager et al. | 358/257 |
| 4,091,270 A | 5/1978 | Musch et al. | 235/419 |
| 4,115,870 A | 9/1978 | Lowell | 364/900 |
| 4,133,034 A | 1/1979 | Etter | 364/464 |
| 4,136,821 A | 1/1979 | Sugiura et al. | 235/462 |
| 4,141,492 A | 2/1979 | Michel et al. | 235/437 |
| 4,158,130 A | 6/1979 | Speraw et al. | 235/146 |
| 4,158,194 A | 6/1979 | McWaters et al. | 235/454 |
| 4,165,554 A | 8/1979 | Faget | D18/7 |
| 4,188,103 A | 2/1980 | Biber et al. | 354/27 |
| 4,210,802 A | 7/1980 | Sakai | 235/483 |
| 4,247,908 A | 1/1981 | Lockhart, Jr. et al. | 364/900 |
| 4,277,837 A | 7/1981 | Stuckert | 364/900 |
| 4,282,425 A | 8/1981 | Chadima et al. | 235/462 |
| 4,322,612 A | 3/1982 | Lange | 235/419 |
| 4,385,285 A | 5/1983 | Horst et al. | 382/3 |
| 4,414,661 A | 11/1983 | Karlstrom | 370/95 |
| 4,415,065 A | 11/1983 | Sandstedt | 186/39 |
| 4,418,277 A | 11/1983 | Tremmel et al. | 235/472 |
| 4,422,745 A | 12/1983 | Hopson | 354/105 |
| 4,423,319 A | 12/1983 | Jacobsen | 235/419 |
| 4,460,120 A | 7/1984 | Shepard et al. | 235/472 |
| 4,488,679 A | 12/1984 | Bockholt et al. | 235/469 |
| 4,500,776 A | 2/1985 | Laser | 235/162 |
| 4,506,344 A | 3/1985 | Hubbard | 364/900 |
| 4,511,970 A | 4/1985 | Okano et al. | 364/401 |
| 4,519,068 A | 5/1985 | Krebs et al. | |
| 4,523,087 A | 6/1985 | Benton | 235/379 |
| 4,523,297 A | 6/1985 | Ugon et al. | 235/380 |
| 4,569,421 A | 2/1986 | Sandstedt | 235/383 |
| 4,570,057 A | 2/1986 | Chadima, Jr. et al. | 364/708 |
| 4,578,571 A | 3/1986 | Williams | 235/472 |
| 4,603,262 A | 7/1986 | Eastman et al. | 250/566 |
| 4,621,189 A | 11/1986 | Kumar et al. | 235/472 |
| 4,627,736 A | 12/1986 | Komaki | 368/88 |
| 4,628,193 A | 12/1986 | Blum | 235/375 |
| 4,634,845 A | 1/1987 | Hale et al. | 235/350 |
| 4,641,292 A | 2/1987 | Tunnell et al. | 381/42 |
| 4,654,818 A | 3/1987 | Wetterau, Jr. | 364/900 |
| 4,661,993 A | 4/1987 | Leland et al. | 455/103 |
| 4,689,761 A | 8/1987 | Yurchenco | 364/708 |
| 4,703,161 A | 10/1987 | McLean | 235/1 |
| 4,706,096 A | 11/1987 | Sato | 235/488 |
| 4,718,103 A | 1/1988 | Shajima et al. | 382/13 |
| 4,718,110 A | 1/1988 | Schaefer | 455/90 |
| 4,727,245 A | 2/1988 | Dobbins et al. | 235/472 |
| 4,734,566 A | 3/1988 | Senda et al. | 235/495 |
| D295,411 S | 4/1988 | Cho et al. | D14/100 |
| 4,743,773 A | 5/1988 | Katanta et al. | 250/566 |
| 4,749,353 A | 6/1988 | Breedlove | 381/43 |
| 4,752,965 A | 6/1988 | Dunkley | 235/379 |
| 4,758,717 A | 7/1988 | Shepard et al. | 235/472 |
| 4,760,248 A | 7/1988 | Swartz et al. | 235/472 |
| 4,761,822 A | 8/1988 | Maile | 455/82 |
| 4,766,300 A | 8/1988 | Chadima, Jr. et al. | 235/472 |
| 4,768,230 A | 8/1988 | Viebrantz et al. | 455/603 |
| 4,773,032 A | 9/1988 | Uehara | 364/900 |
| 4,793,812 A | 12/1988 | Sussman et al. | 235/472 |
| D299,234 S | 1/1989 | Kajita | D14/100 |
| 4,825,057 A | 4/1989 | Swartz | 235/472 |
| 4,831,275 A | 5/1989 | Drucker | 235/472 |
| 4,835,372 A | 5/1989 | Gombrich | 235/375 |
| 4,836,256 A | 6/1989 | Meliconi | 206/523 |
| 4,837,858 A | 6/1989 | Ablay et al. | 455/34 |
| 4,842,966 A | 6/1989 | Omori et al. | 307/150 |
| 4,845,350 A | 7/1989 | Shepard et al. | 235/472 |
| 4,850,009 A | 7/1989 | Zook et al. | 235/375 |
| D303,112 S | 8/1989 | Desrochers | D14/100 |
| 4,857,716 A | 8/1989 | Gombrich et al. | 235/462 |
| 4,866,646 A | 9/1989 | Nakamura et al. | 364/709.11 |
| 4,877,949 A | 10/1989 | Danielson et al. | 235/462 |
| 4,881,839 A | 11/1989 | Grimm | 400/692 |
| 4,890,832 A | 1/1990 | Komaki | 235/146 |
| 4,897,532 A | 1/1990 | Swartz et al. | 235/472 |
| 4,910,775 A | 3/1990 | Yves et al. | 235/379 |
| 4,916,441 A | 4/1990 | Gombrich | 235/380 X |
| 4,940,974 A | 7/1990 | Sojka | 340/825.08 |
| 4,942,356 A | 7/1990 | Ellingen et al. | 361/392 |
| 4,953,113 A | 8/1990 | Chadima, Jr. et al. | 364/708 |
| 4,967,188 A | 10/1990 | Collins | 340/636 |
| 4,972,496 A | 11/1990 | Sklarew | 382/13 |
| 4,979,183 A * | 12/1990 | Cowart | 375/142 |
| 4,983,818 A | 1/1991 | Knowles | 235/467 |
| 4,984,247 A | 1/1991 | Kaufmann et al. | |
| 5,002,184 A | 3/1991 | Lloyd | 206/305 |
| 5,008,879 A | 4/1991 | Fischer et al. | 370/85.2 |
| 5,012,407 A | 4/1991 | Finn | 364/200 |
| 5,022,046 A | 6/1991 | Morrow, Jr. | |
| 5,023,824 A | 6/1991 | Chadima, Jr. et al. | 235/462 |
| 5,029,181 A | 7/1991 | Endo et al. | |
| 5,041,918 A * | 8/1991 | Ishida et al. | 358/442 |
| 5,046,066 A | 9/1991 | Messenger | |
| 5,046,130 A | 9/1991 | Hall et al. | 455/456 |
| 5,049,862 A | 9/1991 | Dao et al. | 340/706 |
| 5,049,863 A | 9/1991 | Oka | 340/710 |
| 5,057,676 A | 10/1991 | Komaki | 235/375 |
| 5,059,778 A | 10/1991 | Zouzoulas et al. | 235/472 |
| 5,070,536 A | 12/1991 | Mahany et al. | 455/67 |
| 5,097,484 A | 3/1992 | Akaiwa | |
| 5,101,406 A | 3/1992 | Messenger et al. | |
| 5,117,501 A | 5/1992 | Childress et al. | 455/11.1 |
| 5,131,019 A | 7/1992 | Sheffer et al. | |
| 5,142,534 A | 8/1992 | Simpson et al. | |
| 5,164,942 A | 11/1992 | Kamerman et al. | |
| 5,179,572 A * | 1/1993 | Schilling | 375/145 |
| 5,181,200 A | 1/1993 | Harrison | |
| 5,202,817 A | 4/1993 | Koenck et al. | 361/393 |
| 5,216,233 A | 6/1993 | Main et al. | 235/472 |
| 5,218,187 A | 6/1993 | Koenck et al. | 235/375 |
| 5,227,614 A | 7/1993 | Danielson et al. | 235/380 |
| 5,268,933 A | 12/1993 | Averbuch | |
| 5,282,222 A * | 1/1994 | Fattouche et al. | 375/260 |
| 5,291,516 A | 3/1994 | Dixon et al. | |
| 5,297,144 A | 3/1994 | Gilbert et al. | |
| 5,321,542 A | 6/1994 | Freitas et al. | |
| 5,363,401 A | 11/1994 | Lucas et al. | 375/131 |
| 5,363,402 A | 11/1994 | Harmon et al. | |
| 5,373,149 A * | 12/1994 | Rasmussen | 235/492 |
| 5,390,166 A | 2/1995 | Rohani et al. | |
| 5,404,375 A | 4/1995 | Kroeger et al. | |
| 5,410,141 A | 4/1995 | Koenck et al. | 235/472 |
| 5,410,740 A | 4/1995 | Hagstrom | |
| 5,410,752 A | 4/1995 | Scholefield | |
| 5,465,392 A | 11/1995 | Baptist et al. | |
| 5,469,468 A | 11/1995 | Schilling | |
| 5,513,184 A | 4/1996 | Vannucci | 370/350 |
| 5,528,621 A * | 6/1996 | Heiman et al. | 375/133 |
| 5,541,985 A * | 7/1996 | Ishii et al. | 379/111 |
| 5,546,397 A * | 8/1996 | Mahany | 370/310 |
| 5,551,060 A | 8/1996 | Fuji et al. | 455/33.4 |
| 5,561,845 A | 10/1996 | Bendixen et al. | 455/33.4 |
| 5,619,530 A * | 4/1997 | Cadd et al. | 375/219 |
| 5,644,576 A | 7/1997 | Bauchot et al. | 375/131 |
| 5,655,219 A | 8/1997 | Jusa et al. | 455/338 |
| 5,708,833 A * | 1/1998 | Kinney et al. | 710/301 |
| 5,734,645 A | 3/1998 | Raith et al. | 455/466 |

| | | | | | | |
|---|---|---|---|---|---|---|
| 5,748,621 | A | | 5/1998 | Masuda et al. | | |
| 5,768,267 | A | | 6/1998 | Raith et al. | ................. | 370/329 |
| 5,781,612 | A | * | 7/1998 | Choi et al. | ............... | 455/435.1 |
| 5,790,587 | A | | 8/1998 | Smith et al. | ................. | 375/147 |
| 5,809,432 | A | * | 9/1998 | Yamashita | ............... | 455/575.1 |
| 5,822,362 | A | * | 10/1998 | Friedmann | ................. | 375/130 |
| 5,832,026 | A | * | 11/1998 | Li | ................................ | 375/136 |
| 5,844,893 | A | * | 12/1998 | Gollnick et al. | ............. | 370/329 |
| 5,887,020 | A | * | 3/1999 | Smith et al. | ................. | 375/130 |
| 5,896,574 | A | * | 4/1999 | Bass, Sr. | ..................... | 455/557 |
| 5,926,501 | A | | 7/1999 | Souissi et al. | | |
| 5,937,348 | A | * | 8/1999 | Cina et al. | .................. | 455/421 |
| 5,960,344 | A | * | 9/1999 | Mahany | ................... | 455/432.2 |
| 5,974,082 | A | * | 10/1999 | Ishikawa et al. | ............ | 375/141 |
| 6,005,884 | A | | 12/1999 | Cook et al. | | |
| 6,012,634 | A | * | 1/2000 | Brogan et al. | ................ | 235/380 |
| 6,026,119 | A | | 2/2000 | Funk et al. | ................... | 375/222 |
| 6,035,216 | A | * | 3/2000 | Cheng et al. | ............... | 455/558 |
| 6,049,536 | A | * | 4/2000 | Ariyoshi et al. | ............ | 370/335 |
| 6,115,412 | A | | 9/2000 | Vanderpool | | |
| 6,118,824 | A | | 9/2000 | Smith et al. | | |
| 6,138,010 | A | | 10/2000 | Rabe et al. | | |
| 6,149,319 | A | * | 11/2000 | Richter et al. | ................ | 713/300 |
| 6,188,720 | B1 | * | 2/2001 | Batzer et al. | ................ | 375/222 |
| 6,223,053 | B1 | * | 4/2001 | Friedmann et al. | ........ | 455/552.1 |
| 6,295,031 | B1 | * | 9/2001 | Wallace et al. | .............. | 343/702 |
| 6,404,393 | B1 | * | 6/2002 | Nelson et al. | ................ | 343/702 |
| 6,531,985 | B1 | * | 3/2003 | Jones et al. | .................. | 343/702 |
| 6,539,207 | B1 | * | 3/2003 | del Castillo et al. | ......... | 455/90.3 |
| 6,618,580 | B2 | * | 9/2003 | Parrott et al. | ................ | 340/7.33 |
| 6,697,415 | B1 | * | 2/2004 | Mahany | ....................... | 375/130 |
| 6,714,983 | B1 | * | 3/2004 | Koenck et al. | .............. | 709/230 |
| 6,717,801 | B1 | * | 4/2004 | Castell et al. | ................ | 361/683 |
| 6,757,523 | B2 | * | 6/2004 | Fry | ............................. | 455/78 |
| 6,865,216 | B1 | * | 3/2005 | Beamish et al. | ............. | 375/140 |
| 6,928,302 | B1 | * | 8/2005 | Kinney et al. | ................ | 455/558 |
| 7,024,223 | B1 | * | 4/2006 | Wietfeldt | ..................... | 455/557 |
| 7,024,224 | B2 | * | 4/2006 | Kuehnel et al. | ............. | 455/557 |
| 7,044,387 | B2 | * | 5/2006 | Becker et al. | ................ | 235/492 |
| 7,079,847 | B2 | * | 7/2006 | Blair et al. | ................. | 455/452.2 |
| 7,171,237 | B2 | * | 1/2007 | Vangala | ....................... | 455/557 |
| 7,194,283 | B2 | * | 3/2007 | Kardach et al. | ............. | 375/130 |

FOREIGN PATENT DOCUMENTS

| | | |
|---|---|---|
| EP | 0262943 | 4/1988 |
| FR | 2389938 | 1/1979 |
| GB | 2 201 125 A | 2/1987 |
| JP | 1572962 | 8/1980 |
| JP | 58-176792 | 10/1983 |
| JP | 58-211261 | 12/1983 |
| JP | 2-144681 | 6/1990 |
| WO | 8700659 | 1/1987 |
| WO | 8707106 | 11/1987 |

OTHER PUBLICATIONS

News Release "Ositech Communications Inc. Will Release Next Month the Jack of Diamonds, A Type II PC Card", dated May 31, 1995.
Gary Legg, "Special Components Simplified Interface to PCMCIA cards", Jun. 10, 1993 EN., pp. 61, 63-64, 66 and 68.
Carole Patton, "Radio Transceiver Circuit Card Acts as Wireless Modem in PCs", Info World, Mar. 28,1988, p. 18.
John R. Gyorki, "New Deal for Smart Cards", Machine Design, Jun. 1, 1993, pp. 38-40, 42 and 44.
PCMCIA Primer, by John Reimer, pp. 66-67, 1995.
PCMCIA (IC) Cards, vol. 13, No. 8, 1995.
Roger C. Alford, The PCMCIA Redefines Portability, Under the Hood, pp. 237-242, Dec. 1992.

* cited by examiner

SPREAD SPECTRUM TRANSCEIVER MODULE UTILIZING MULTIPLE MODE TRANSMISSION

CROSS-REFERENCE TO RELATED APPLICATIONS

This application is a continuation of U.S. application Ser. No. 08/973,195, filed Mar. 6, 2000, now U.S. Pat. No. 6,697,415. This application is also the National Stage of International Application No. PCT/US96/09474 filed Jun. 3, 1996, which claims priority from U.S. application Ser. No. 08/645,348 filed May 13, 1996, U.S. application Ser. No. 08/544,815 filed Oct. 18, 1995, U.S. application Ser. No. 08/513,658 filed Aug. 11, 1995, and U.S. application Ser. No. 08/457,697 filed June, 1995.

BACKGROUND

1. Technical Field

The present invention relates generally to communication networks utilizing spread spectrum radio transceivers, and, more specifically, to multi-hop RF networks wherein participating devices utilize spread spectrum transceivers that are capable of operating in any of a variety of spread spectrum modes. The spread spectrum modes include, for example, direct sequence transmission across a spreading bandwidth or channelized across the spreading bandwidth, frequency hopping transmission across all or a part of the spreading bandwidth, a hybrid combination of direct sequence transmissions and frequency hopping transmissions, and transmissions on a portion of the spreading bandwidth. The selection of a spread spectrum mode of operation depends upon signal conditions and characteristics of members capable of communication within the RF communication network.

2. Description of Related Art

Communication devices within a wireless local area network employ wireless communication links to transfer data and commands within the local area network. Typical units within a wireless local area network include stationary wireless access devices, mobile radio units, mobile image capture units, printing units, and other units operative with the data and commands. These units often link to a wired local area network through a wireless access device to transfer data and commands to devices located on the wired network. The wireless local area networks typically employ cellular communication techniques to provide the wireless communication links within the local area network.

One common installation of a wireless local area network serves factory automation functions. Because hard-wiring a local area network within a large, dynamic facility is both expensive and difficult, the wireless local are network provides traditional network functions as well as additional functions germane to the wireless attributes of the network. However, due to difficult transmission and interference conditions within a factory, establishing and maintaining sufficient wireless communication ties oftentimes proves difficult. Attenuation or transmitted signals, multi-path fading, ambient noise, and interference by adjacent cells often disrupts communication within the wireless local area network.

Spread spectrum transmissions are often used in attempts to overcome communication problems. With spread spectrum transmissions, the bandwidth over which information is broadcast is deliberately made wide relative to the information bandwidth of the source information. Spread spectrum transmission techniques include direct sequence transmission, frequency hopping transmission, a combination of direct sequence transmission and frequency hopping transmission, and may include other techniques that deliberately transmit over a wide spectrum.

Direct sequence spread spectrum transmitters typically spread by first modulating a data signal with a pseudo random chipping sequence at a multiple of the source data clocking rate. Once constructed, the composite modulation is coupled to a carrier via modulation techniques and then transmitted. Phase modulation is typically employed, but frequency modulation or other types of modulation may also be used. Circuitry in a receiving units receives the signal, decodes the signal at the multiple of the source data clocking rate using a particular chipping sequence, and produces received data. In a typical direct sequence system, the pseudo random chipping sequence applied by the receiving unit corresponds to all, or respective portions, of the transmitted signal. In this fashion, the receiving unit receives only intended data and avoids receiving data from adjacent cells operating on the same frequency. Direct sequence spread spectrum modes also provide significant noise rejection characteristics since each component of the source data is essentially transmitted multiple times. The received signal is therefore a composite that may be averaged or weighted to avoid receiving improper data or falsing based upon noise.

A frequency hopping system commonly uses conventional narrowband modulation but varies the modulation frequency over time in accordance with a known pattern or algorithm, effectively moving the modulated signal over the intended spreading bandwidth. The spread spectrum signal is only discernible to a receiver that has prior knowledge of the spreading function employed and which has obtained synchronization with the spreading operation at the transmitter. By spreading transmissions over the spreading bandwidth, particular portions of the spreading bandwidth within which transmission is difficult may be substantially avoided.

In the United States and many other countries, spread spectrum communications is used commercially within designated Industrial, Scientific and Medical (ISM) bands. These bands are structured as multi-use bands containing non-communications equipment such as industrial and commercial microwave ovens as well as low power consumer grade transmitters, vehicle location and telemetry systems and other spread spectrum devices of differing characteristics. Operation in ISM bands is unlicensed and uncoordinated, so equipment operating in these bands must be designed to operate successfully without knowledge of the types of devices that may be used in close proximity. The spread spectrum system design must also take into consideration the occupants of the spectrum adjacent to the ISM bands which may be both potential sources of interference to, and susceptible to interference from, various types of spread spectrum products.

Various forms of modulation across the spreading band may be utilized in commercial spread spectrum packet data communication systems. Full band direct sequence systems occupy the entire width of an ISM band. The spreading ratio, the ratio of the bandwidth of the spread spectrum modulated signal to the information bandwidth of the source modulation, determines the process gain of the system. Regulations within the United States mandate a minimum process gain of 10 dB, which is determined from ten times the logarithm of the spreading ratio. Process gain is a measure of the ability of a spread spectrum system to resist interference. The larger the spreading ratio, the more resistant the system is to interference within the receiver bandwidth. Wide bandwidth modulation is reasonably resistant to low or moderate levels of interference, but even systems with relatively high process gains experience difficulties when subject to strong interference.

When system throughout requirements dictate high data rates, the minimum process gain requirements in the regulations necessitate using wide bandwidth transmissions. For example, a well-known system NCR Wavelan uses Quadrature PSK modulation at 1 million symbols per second to achieve 2 megabits per second (MBPS) data rates with a source information bandwidth available in the US ISM band at 902 MHz band. In practice, implementation constraints dictate that this system uses the full 26 MHz band. Systems operating at other data rates, including the original Norand system, utilize the full bandwidth at lower source data rates, e.g., 200 kilobits per second (KBPS). Utilization of a wider spreading bandwidth in this case provides greater rejection of multipath fading typical of the indoor RF signal propagation environment.

When it is anticipated the direct sequence systems may be used in environments with strong in-band interference, a design choice is to employ channelization to reject interference. In the case of channelized direct sequence (DS) modulation, the spreading bandwidth is reduced to a fraction of the total available bandwidth, and a frequency-agile frequency generation systems is employed. By selecting the carrier frequency of operation, communications can be established in a portion of the band where interference is not present. This technique requires the use of selective filters in the receiver intermediate frequency (IF) section to provide the necessary interference rejection. These channelized DS systems utilize interference avoidance rather than relying on process gain to reject interference.

Utilization of frequency hopping spread spectrum systems is appropriate in environments where interference within the band of operation is not confined to particular portions of the band, but may periodically arise in various parts of the entire band. Frequently hopping is also useful as a multiple access technique. Use of multiple hopping sequences concurrently within a given location allows many simultaneous communication sessions to be supported. Occasionally, devices operating on different hopping sequences will simultaneously occupy the same channel within the band for short periods of time. For moderate numbers of simultaneous hopping sequences, this occurs infrequently.

Frequency hopping also provides similar multipath rejection capabilities to wideband direct sequence modulation. If a particular channel of operation is in a fade temporarily preventing communication, a jump to a frequency sufficiently removed from the faded frequency will often allow communications to resume.

Frequency hopping systems require more protocol overhead to aid in establishing and maintaining synchronization between units sharing a given hopping sequence. Additionally, the initial acquisition of the hopping sequence may require that an unsynchronized device scan the band for a period equivalent to may hop times. The overhead for direct sequence systems is lower, with several bit-times usually allocated to receiver acquisition at the beginning of each transmission.

Spread spectrum communications may not be appropriate for some applications. For example, short hop communications such as communications between a portable hand-held terminal and a peripheral device such as a scanner or printer over a short distance is a very cost sensitive application. Spread spectrum operation requires more circuit complexity and power consumption than is tolerable for this application. Simpler FM or AM techniques such as ON-OFF-Keying (OOK) may be desirable.

Conventionally, the particular spread spectrum modulation technique is chosen according to the particular applications in which the data transceiver is to be utilized. For example, in a small warehouse having few RF barriers, minimal interference from cellular and wireless phones, and minimal amounts of communication traffic, radio transceivers used therein might only employ direct sequence spread spectrum transmission techniques. Thus, conventionally, such transceivers would be specifically designed, constructed and installed. However, after installation, if communication traffic or local noise increases, the communication might fail to function as required. Likewise, after installation, if RF barriers are installed or if the network is moved to an urban environment with a great deal of noise from neighboring installations, cellular and mobile phones, etc., the network may fail to meet the needs of the customer.

Similarly, a design might be based on a customer's needs for a small store in a downtown urban area. Because of the greater likelihood of a great amount of radio frequency traffic in the vicinity, the customer requires a radio which is free from interference from nearby radio transmissions with little concern for operating range. Consequently, a different specific type of radio would be designed to meet the needs of the corporation based upon the operating conditions in which the radio is to be used, for example using frequency hopping modulation.

In the exemplary installations mentioned above, each of the radios would be optimized to meet the needs of the customer. However, a customer's needs continually change, and, if the particular application or environment were to change justifying a different spread spectrum modulation technique, the customer is either forced to change all of their radio transceivers or live with the under-performance they currently receive.

Moreover, in a typical network installation, a client may have diverse operational requirements. For example, the particular applications of the radio unit may change several times within the same day. The site may also have areas which are relatively noise and barrier free and those which encounter heavy noise and barriers. Some areas may have high traffic volume, while others experience only occasional traffic. In such networks, a single radio transceiver design can never provide optimal performance in all areas. Sacrifices are made in the design characteristics of the transceivers in an attempt to provide best performance overall.

Similarly, in mobile contexts, a worker may require mobile communications to a vehicle based information system or forwarding to a central communication facility through a vehicle based radio WAN transceiver. The characteristics of the communications medium for this class of operation vary greatly. Interference will vary from location to location. Additionally, it is necessary to allow operation if the worker moves away from the vehicle or inside a building structure. Because each wireless local area network may have been designed for a particular set of criteria with particular spread spectrum operational abilities, mobile units may be non-functional within particular wireless local area networks.

Thus, there is a need in the art for a communication network that operates dynamically to optimize communication utilizing various spread spectrum transmission techniques, considering the characteristics of RF noise, neighboring interference, RF barriers, participating transceiver unit capabilities and applications to be performed in such dynamic optimization.

It is another object of the present invention to provide a spread spectrum RF transceiver module, for use in wireless network devices, which utilizes multiple spread spectrum modulation techniques providing multiple configurable modes of data transmission, whereby modes may be selected to attain optimal transmission performance.

A further object of the present invention is to provide an RF data transceiver module which combines frequency hopping and direct sequence transmission techniques within a single design.

It is an object of the present invention to provide a spread spectrum RF transceiver module which utilizes common media access protocols and interfaces for multiple nominal carrier frequencies and modulation parameters.

It is a further object of the present invention to provide a spread spectrum RF transceiver utilizing 900 MHz transmission and having a standard interface with common 2.4 GHz transmission.

It is a further object of the invention to provide a spread spectrum RF transceiver which may be utilized in several different types of multi-layered data communications networks.

Another object of the present invention is to produce a wireless local area network and packet wireless data communication system that is flexible to operate reliably in varied and unpredictable RF propagation and interference environments.

A further object of the present invention is to provide a wireless RF transceiver module capable of utilizing a variety of operational modes thereby allowing large business operation to purchase a single product meeting a multiple usage needs maximizing operational flexibility and minimizing sparing and service concerns.

It is another object of the present invention to provide a modular wireless LAN modem capable of supporting multiple modes of operation under a single media access protocol with a standardized interface to a hand-held portable data terminal such that the wireless LAN modem may dynamically change modes of operation transparently to the host device, not requiring that the host device be aware of changes in the modes of operation, or that operation of higher protocol layers be impacted.

Yet another object of the present invention is to produce a modular wireless LAN modem that may be utilized for both in-premise and worker to vehicle application, and for short range communications to peripheral devices.

These and other objects of the invention will be apparent from examination of the drawings and remainder of the specification which follows.

SUMMARY OF THE INVENTION

The system and radio of the present invention to overcome the limitations of the prior devices as well as other limitations therefore may operate in any of a plurality of spread spectrum modes. A selected spread spectrum mode, or set of spread spectrum modes, is based upon system characteristics as well as transmission characteristics within an operating environment.

One particular operating environment relates to multi-hop wireless networks that are subject to in-band interference and multi-path fading. However, in these systems, members (hereinafter "transceiver devices") of the network may have different operating capabilities. Therefore, the system and radio of the present invention provide a mechanism for selecting spread spectrum modes of operation to satisfy network member limitations, data transmission throughput requirements, neighboring system non-interference requirements, as well as noise tolerance requirements.

By providing a dynamic mechanism for selecting spread spectrum modes of operation, the present invention provides many import objects and advantages that will become apparent with reference to the entire specification and drawings. In particular, in one embodiment, a communication network for collecting and communicating data is disclosed. The network comprises a wireless access device and at least one mobile terminal. The wireless access device comprises a control circuit and a first RF transceiver that selectively operates in one of a plurality of spread spectrum modes. The at least one mobile terminal comprises a second RF transceiver that operates in at least one of a plurality of spread spectrum modes. The control circuit responds to transmissions received from the first RF transceiver to evaluate communication performance and dynamically selects one of the plurality of spread spectrum modes of the first RF transceiver. Such selection also takes into consideration the at least one of the plurality of spread spectrum modes of the second RF transceiver.

Further, the plurality of spread spectrum modes of the first RF transceiver may comprise direct sequence transmission, frequency hopping, channelized direct sequence and/or hybrid frequency hopping (direct sequence) modes. The control circuitry may evaluate communication performance through reference to received signal strength indications, transmission success rate and neighboring cell operating characteristics.

Other aspects may be found in a communication system for collecting and communicating data using wireless data signal transmission. Therein a wireless access device capable of communicating with a plurality of radios comprises a radio capable or operating in a plurality of spread spectrum modes. The wireless access device also comprises a spread spectrum mode controller responsive to transmissions and data received for evaluating the data communication system and for controlling the radio to selectively operate in a spread spectrum mode among a plurality of spread spectrum modes.

The wireless access device may further comprise circuitry for evaluating the plurality of spread spectrum modes to select a spread spectrum mode of operation. Such selection may take involve the identification of a common spread spectrum mode.

Yet other aspects can be found in a data communication system having spread spectrum capability for collecting and communicating data using wireless data signal transmission. Therein, an RF transceiver comprises an modulator having a spreader, a demodulator having a despreader, a controllable oscillator attached to the modulator and demodulator, and control circuitry that both selectively enables the spreader and despreader and selectively controls the controllable oscillator to cause operation in one of a plurality of modes of spread spectrum operation.

The data communication system may further comprising a host controller that directs the control circuitry in the selection of the one of the plurality of modes of spread spectrum operation. The host controller may comprise wireless access device control circuitry. In addition, the control circuitry may wirelessly receive instruction regarding selection of the one of the plurality of modes of spread spectrum operation. Many other aspects of the present invention will be appreciated with full reference to the specification, drawings and claims.

DETAILED DESCRIPTION OF THE INVENTION

Figure 1A:
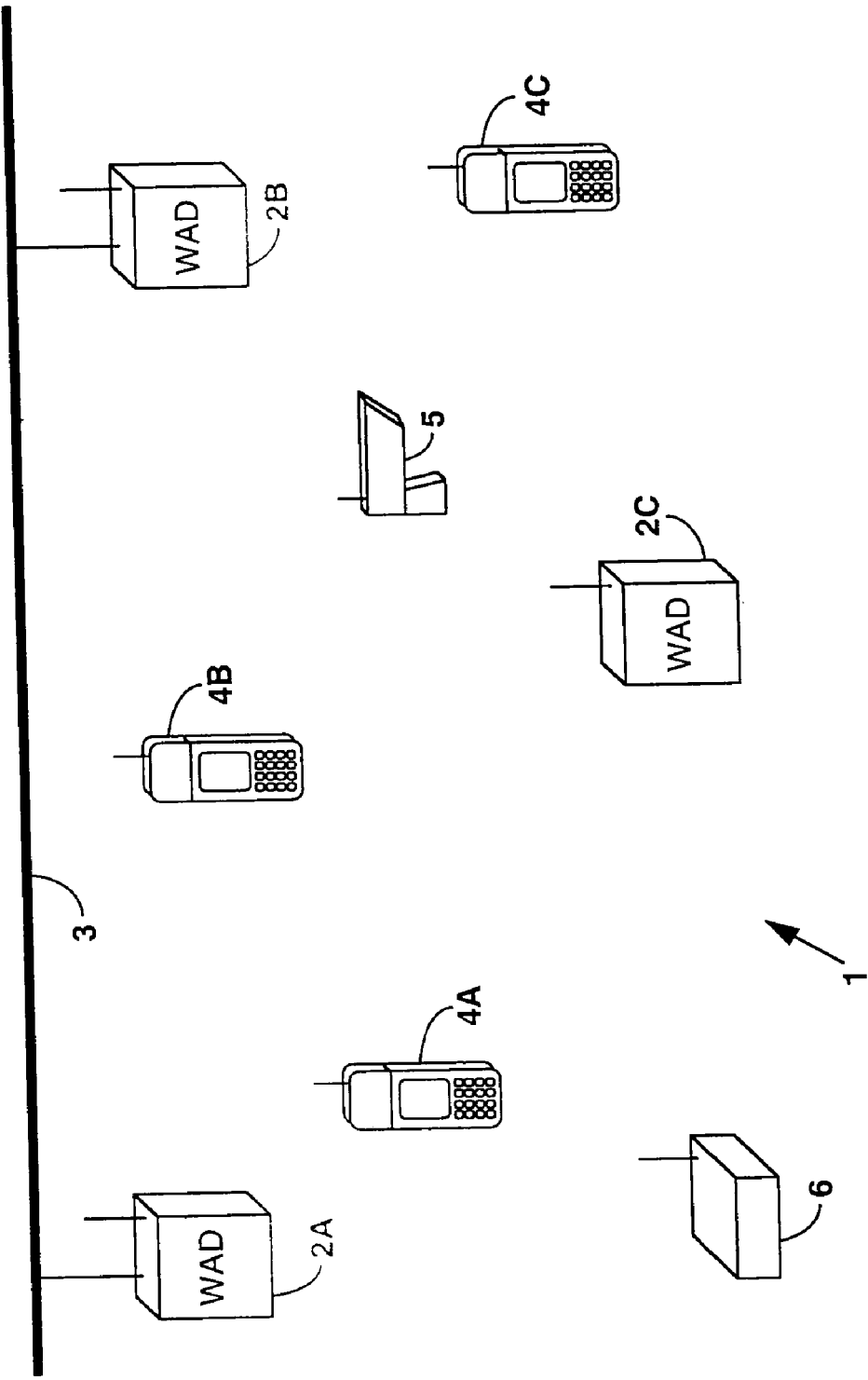
FIG. 1A is a perspective view of a wireless communication network built in accordance with the present invention which incorporates dynamically adapting spread spectrum transceivers and supporting communication protocols.

FIG. 1A illustrates a communication network 1 incorporating the teachings of the present invention. The system comprises wireless access devices 2A, 2B and 2C, portable transceiver units 4A, 4B and 4C, a wireless code reader 5 and a peripheral device 6. The wireless access devices 2A and 2B communicate directly on a wired network 3 to each other and to other wired network devices (not shown). The wireless access device 2C communicates with the wired network 3 and the wireless access device 2A via wireless transmissions through the wireless access device 2B.

The wireless access 2A-C may comprise wireless access points or wireless access servers to provide an interface among the portable transceiver units 4A-C, the code reader 5, the peripheral device 6 and devices on the wired network. Each of these wireless access devices 2A-C has associated with it a range or cell of communication. For example, the portable transceiver units 4A-C may wander in and out of range of the wireless access device 2A. Similarly, they may wander in and out of range of the wireless access devices 2B-C, i.e., they may wander from cell to cell. Each access device 2A-C, and many more as may prove necessary, are located to provide coverage of a customer's premises. Cell areas typically overlap somewhat to support ubiquitous coverage.

Because cells typically overlap slightly with one another, at any time, a hand-held radio unit may communicate with at least two wireless access devices. To avoid conflicts with transmissions in such overlap areas, it is desirable to configure neighboring cells operate with different spreading codes, different hopping sequences or different modes, for example. However, when the portable transceiver unit 4B for example passes from one cell to another, it cannot communicate with a neighboring wireless access device without changing its operating characteristics. Thus, the present invention provides several techniques for accommodating devices wishing to communicate in a new cell.

Moreover, the wireless access devices 2A-C, peripheral device 6 and code reader 5 may be capable of only some modes of wireless operation. Thus, the present invention provides a mechanism for each of the wireless access devices 2A-C to dynamically attempt to select a common mode of appropriation for each participating device within its cell. Moreover, if a given mode of operation proves dissatisfactory, a wireless access device may dynamically switch modes to attempt to achieve superior performance.

In particular, data throughput concerns and requirements, ambient noise, power consumption of portable units, previously recorded success rates, received signal strength indications, neighboring cell operating modes and success rates, and mode capabilities of participating devices are all considered in determining the mode in which to operate. Each wireless access device engages in such consideration when initially establishing communication in its cell, when attaching or detaching a participating device and as channel conditions are evaluated. In other embodiments, less than all of such considerations need be made. For example, where all transceivers are known to operate in all available modes, consideration of this factor is not necessary. Similarly, if only one cell exists or if problems in overlap regions prove minimal, consideration of neighboring cell operation need not be engaged. Likewise, received signal strength alone may be used as a mode performance indication.

Using lower power transmissions, a benefit to battery powered portable transceiver units, requires the use of more wireless access devices to cover a premises. Lower power transmissions might also or alternately require a mode having a wider spreading bandwidth or slower data transfer rate to overcome the lower received signal strength. In other cells that have minimal battery power concerns and little or no noise, a spread spectrum mode may be chosen that provides higher data transmission rates. In yet other cells experiencing significant background noise, a direct sequence spreading mode may be employed that provides greater noise tolerance.

In addition to changing modes, the wireless access devices 2A-C also support changes to various mode parameters such as data segment sizes, chipping rates, spreading code lengths, etc. By supporting dynamic changes in operating modes and mode parameters, the communication network 1 attempts to accommodate any transceiving device that enters any cell. This flexibility allows for expansion without replacing existing equipment. An older radio transceiver may be able to participate with newer transceivers that may support newer modes of operation. The network 1 would attempt to accommodate such communication in a common, older mode of operation.

RF signals are inherently subject to what is termed "multipath fading". A signal received by a receiver is a composite of all signals that have reached that receiver by taking all available paths from the transmitter. The received signal is therefore often referred to as a "composite signal" which has a power envelope equal to the vector sum of the individual components of the multipath signals received. If the signals making up the composite signal are of amplitudes that add "out of phase" the desired data signal decreases in amplitude. If the signal amplitudes are approximately equal, an effective null (no detectable signal at the receiver) results. This condition is termed "fading".

Normally changes in the propagation environment occur relatively slowly, i.e., over periods of time ranging from several tenths ($\frac{1}{10}$'s) of seconds to several seconds. However, in a mobile RF environment, receivers (or the corresponding transmitters) often travel over some distance in the course of receiving a message. Because the signal energy at each receiver is determined by the paths that the signal components take to reach that receiver, the relative motion between the receiver and the transmitter causes the receiver to experience rapid fluctuations in signal energy. Such rapid fluctuations can result in the loss of data if the amplitude of the received signal falls below the sensitivity of the receiver.

Over small distances, the signal components that determine the composite signal are well correlated, i.e., there is a small probability that a significant change in the signal power envelope will occur over the distance. If a transmission of a data packet can be initiated and completed before the relative movement between the receiver and transmitter exceeds the "small distance" data loss to fading is unlikely to occur. The maximum "small distance" wherein a high degree of correlation exists is referred to hereafter as the "correlation distance".

As expressed in wavelengths of the carrier frequency, the correlation distance is on half ($\frac{1}{2}$) of the wavelength, while a more conservative value is one quarter ($\frac{1}{4}$) of the wavelength. Taking this correlation distance into consideration, the size of the data packet for segmentation purposes can be calculated. For example, at 915 MHz (a preferred RF transmission frequency), a quarter wavelength is about 8.2 centimeters. A mobile radio moving a ten (10) miles per hour, or 447 centimeters per second, travels the quarter wavelength in about 18.3 milliseconds. In such an environment, as long as the segment packet size remains well under 18.3 milliseconds, significant signal fluctuations during the duration of a packet transmission is unlikely. In such an preferred embodiment, five (5) millisecond data packet segments are chosen which provides a quasi-static multipath communication environment.

The faster the relative movement between a transmitter and a receiver the greater the effect of fading. Similarly, if the relative movement is slower, fading is less pronounced. In many communication environments, the degree of fading effects varies dramatically both from time to time and from installation to installation.

One example of a receiver making such a measurement of fading can be found in the abandoned patent application of Ronald L. Mahany, U.S. Ser. No. 07/485,313, filed Feb. 26, 1990, which is incorporated herein by reference. Specifically, in that reference, a received signal strength indicator (RSSI) circuit is found in the receiver. The RSSI circuit sample the signal strength of a transmission. If the signal strength samples are evaluated in sequence and the trend analyzed, the degree of fading can be measured. If the signal strength samples decrease in value, it is likely that fading is present in the network.

A transceiver using direct-sequence spread spectrum transmission uses a spreading-code of a higher frequency than that of the data rate to encode the data to be sent. This higher frequency is achieved by increasing the chip clock rate (wherein each chip constitutes an element of the spreading-code). Using the same spreading code, the receiver decodes the received signal while ignoring minor faults which occurred in transmission, providing noise immunity and multi-path signal rejection. The frequency and length of the spreading-code can be varied to offer more or less multi-path signal rejection or noise immunity. Although it may result in improved communication, increasing the frequency or length of the spreading-code requires additional overhead which may not be justifiable unless necessary.

Frequency-hopping is the switching of transmission frequencies according to a sequence that is fixed or pseudo-random and that is available to both the transmitter and receiver. Adaptation to the communication environment via an exchange in frequency-hopping operating parameters is possible, for example, via selective control of the hopping rate or through the use of coding or interleaving. The greater the degree of frequency selectivity of the fading envelope (i.e., when fading is significant only over a portion of the spectrum of hopping frequencies), the greater the benefit of such adaptation.

Particularly, a parameter indicating the hopping rate can be varied to minimize the probability that the channel characteristics will detrimentally change during the course of a communication exchange. To vary the hopping rate is to vary the length of a hopping frame. Although multiple data (or message) exchanges per hopping frame is contemplated, the preferred hopping frame consists of a single exchange of data, For example, in a polling environment, the hopping frame might consist of: 1) a base station transmitting a polling packet to a roaming terminal; 2) the roaming terminal transmitting data in response; and 3) the base station responding in turn by transmitting an acknowledge packet. Each hopping frame exchange occurs at a different pseudo-randomly chosen frequency.

For optimization, the hop frame length is adjusted to be as long as possible, while remaining shorter than the coherence time of the channel by some safety margin. Although such adjustment does not eliminate the effects of fading, it increases the probability that the characteristics of the channel will remain consistent during each hopping frame. Thus, in the preferred embodiment, if the polling packet transmission is successfully received, the probability of successful receipt of the data (or message) and acknowledge is high.

Another parameter for changing frequency-hopping performance is that of coding. Coding on the channel for error correction purposes can be selectively used whenever the probability of data or message loss due to fading is high. In particular, coding methods which provide burst error correction, e.g., Reed-Solomon coding, can be applied if the hop length is likely to exceed the coherence time of the channel. Such coding methods allow some portion of the data to be lost and reconstructed at the expense of a 30-50% reduction in throughput. The operating parameter for coding indicates whether coding should be used and, if so, the type of coding to be used.

An operating parameter indicating whether interleaving should be used also help to optimize the communication channel. Interleaving involves breaking down the data into segments which are redundantly transmitted in different hopping frames. For example, in a three segment exchange, the first and second segments are sequentially combined and sent during a first hopping frame. In a subsequent hopping frame, the second and third segments are sequentially combined and transmitted in a third hopping frame. The receiving transceiver compares each segment received with the redundantly received segment to verify that the transmission was successful. I errors are detected, further transmissions must be made until verification is achieved. Once achieved, the transceiver reconstructs the data from the segments.

Other methods of interleaving are also contemplated. For example, a simpler form of interleaving would be to sequentially send the data twice without segmentation on two different frequencies (i.e., on two successive hops).

As can be appreciated, interleaving provides for a redundancy check but at the expense of data or message throughput. The interleaving parameter determines whether interleaving is to be used and, if so, the specific method of interleaving.

In addition, any combination of the above frequency-hopping parameters might interact to define an overall operating configuration, different from what might be expected from the sum of the individual operating parameters. For example, selecting interleaving and coding, through their respective parameters, might result in a more complex combination scheme which combines segmentation and error correction in some alternate fashion.

In the United States, data communication equipment operating in the ultra-high frequency (UHF) range under conditions of frequency modulation (FM) is subject to the following limitations.

1) The occupied band width is sixteen kilohertz maximum with five kilohertz maximum frequency deviation.
2) The channel spacing is 25 kilohertz. This requires the use of highly selected filtering in the receiver to reduce the potential for interference from nearby radio equipment operating on adjacent channels.
3) The maximum output power is generally in the range of ten to three hundred watts. For localized operation is a fixed location, however, transmitter power output may be limited to two watts, maximum, and limitations may be placed on antenna height as well. These restrictions are intended to limit system range so as to allow efficient reuse of frequencies.

For non-return to zero (NRZ) data modulation, the highest modulating frequency is equal to one half the data rate in a baud. Maximum deviation of five kilohertz may be utilized for a highest modulation frequency which is less than three kilohertz, but lower deviations are generally required for higher modulation frequencies. Thus, at a rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limited-discriminator detector for reasonable performance at weak RF signal levels. However, the channel bandwidth constraints limit the maximum data "high" data rate that can be utilized for transmitting NRZ coded data. Significant improvements in system throughput potential can be realized within the allotted bandwidth by extending the concept of adaptively selecting data rate to include switching between source encoding methods. The preferred approach is to continue to use NRZ coding for the lower system data rate and substitute partial response (PR) encoding for the higher rate. The throughput improvements of NRZ/PR scheme over an HRZ/NRZ implementation are obtained at the expense of additional complexity in the baseband processing circuitry. An example of a transceiver using such an approach can be found in the previously incorporated patent application of Ronald L. Mahany, U.S. Ser. No. 07/485,313, filed Feb. 26, 1990.

Partial response encoding methods are line coding techniques which allow a potential doubling of the data rate over NRZ encoding using the same baseband bandwidth. Examples of PR encoding methods include duobinary and modified duobinary encoding. Bandwidth efficiency is improved by converting binary data into three level, or pseudo-ternary signals. Because the receiver decision circuitry must distinguish between three instead of two levels, there is a signal to noise (range) penalty for using PR encoding. In an adaptive baud rate switching system, the effects of this degradation are eliminated by appropriate selection of the baud rate switching threshold.

Since PR encoding offers a doubling of the data rate of NRZ encoded data in the same bandwidth, one possible implementation of a NRZ/PR baud rate switching system would be a 4800/9600 bit/sec system in which the low-pass filter bandwidth is not switched. This might be desirable for example if complex low-pass filters constructed of discrete components had to be used. Use of a single filter could reduce circuit costs and printed circuit board area requirements. This approach might also be desirable if the channel bandwidth were reduced below what is currently available.

The implementation with bandwidth available is to use PR encoding to increase the high data rate well beyond the 9600 bit/sec implementation previously described. An approach using 4800 bit/sec NRZ encoded data for the low rate thereby providing high reliability and backward compatibility with existing products, and 16 K bit/sec PR encoded transmission for the high rate may be utilized. The PR encoding techniques is a hybrid form similar to duobinary and several of its variants which has been devised to aid decoding, minimize the increase in hardware complexity, and provide similar performance characteristics to that of the previously described 4800/9600 bit/sec implementation. While PR encoding could potentially provide a high data rate of up to 20 K bit/sec in the available channel bandwidth, 16 K bit/sec is preferable because of the practical constraints imposed by oscillator temperature stability and the distortion characteristics of IF bandpass filters.

All of the above referenced parameters must be maintained in local memory at both the transmitter and the receiver so that successful communication can occur. To change the communication environment by changing an operating parameter requires both synchronization between the transceivers and a method for recovering in case synchronization fails.

In one embodiment, if a transceiver receiving a transmission (hereinafter referred to as the "destination") determines that an operating parameter needs to be changed, it must transmit a request for change to the transceiver sending the transmission (hereinafter the "source"). If received, the source may send an first acknowledge to the destination based on the current operating parameter. Thereafter, the source modifies its currently stored operating parameter, stores the modification, and awaits a transmission from the destination based on the newly stored operating parameter. The source may also send a "no acknowledge" message, rejecting the requested modification.

If the first acknowledge message is received, the destination modifies its currently stored operating parameter, stores the modification, sends a verification message based on the newly stored operating parameter, and awaits a second acknowledge message from the source. If the destination does not receive the first acknowledge is not received, the destination modifies the currently stored parameter, stores the modification as the new operating parameter, and, based on the new parameter, transmits a request for acknowledge. If the source has already made the operating parameter modification (i.e., the destination did not properly receive the first acknowledge message), the destination receives the request based on the new parameters and response with a second acknowledge. After the second acknowledge is received, communication between the source and destination based on the newly stored operating parameter begins.

If the destination does not receive either the first or the second acknowledge messages from the source after repeated requests, the destination replaces the current operating parameter with a factory preset system-default (which is also loaded upon power-up). Thereafter, using the system-default, the destination transmits repeated requests for acknowledge until receiving a response from the source. The system-default parameters preferably define the most robust configuration for communication.

If after a time-out period the second request for acknowledge based on the newly stored operating parameters is not received, the source restores the previously modified operating parameters and listens for a request for acknowledge. If after a further time-out period a request for acknowledge is not received, the source replaces the current operating parameter with the factory preset system-default (which is the same as that stored in the destination, and which is also loaded upon power-up). Thereafter, using the common system-default, the source listens for an acknowledge request from the destination. Once received, communication is re-established.

Other synchronization and recovery methods are also contemplated. For example, instead of acknowledge requests originating solely from the destination, the source might also participate in such requests. Similarly, although a polling protocol is used to carry out the communication exchanges described above, carrier-sense multiple-access (CSMA) or busy tone protocols might alternately be used.

In the embodiment illustrated in FIG. 1A, various modes of operation are dynamically controlled by the wireless access devices 2A-C. Such control involves the consideration by each wireless access device of many factors such as: 1) received signal strength; 2) success/fail rates; 3) mode capabilities of participating devices; 4) neighboring access device operation and performance; 5) application support required; and 6) power concerns. In addition to modifying the parameters of a particular mode (as previously mentioned), the wireless access devices may also select from a plurality of modes (as described in more detail below in reference to FIG. 10).

Figure 1B:
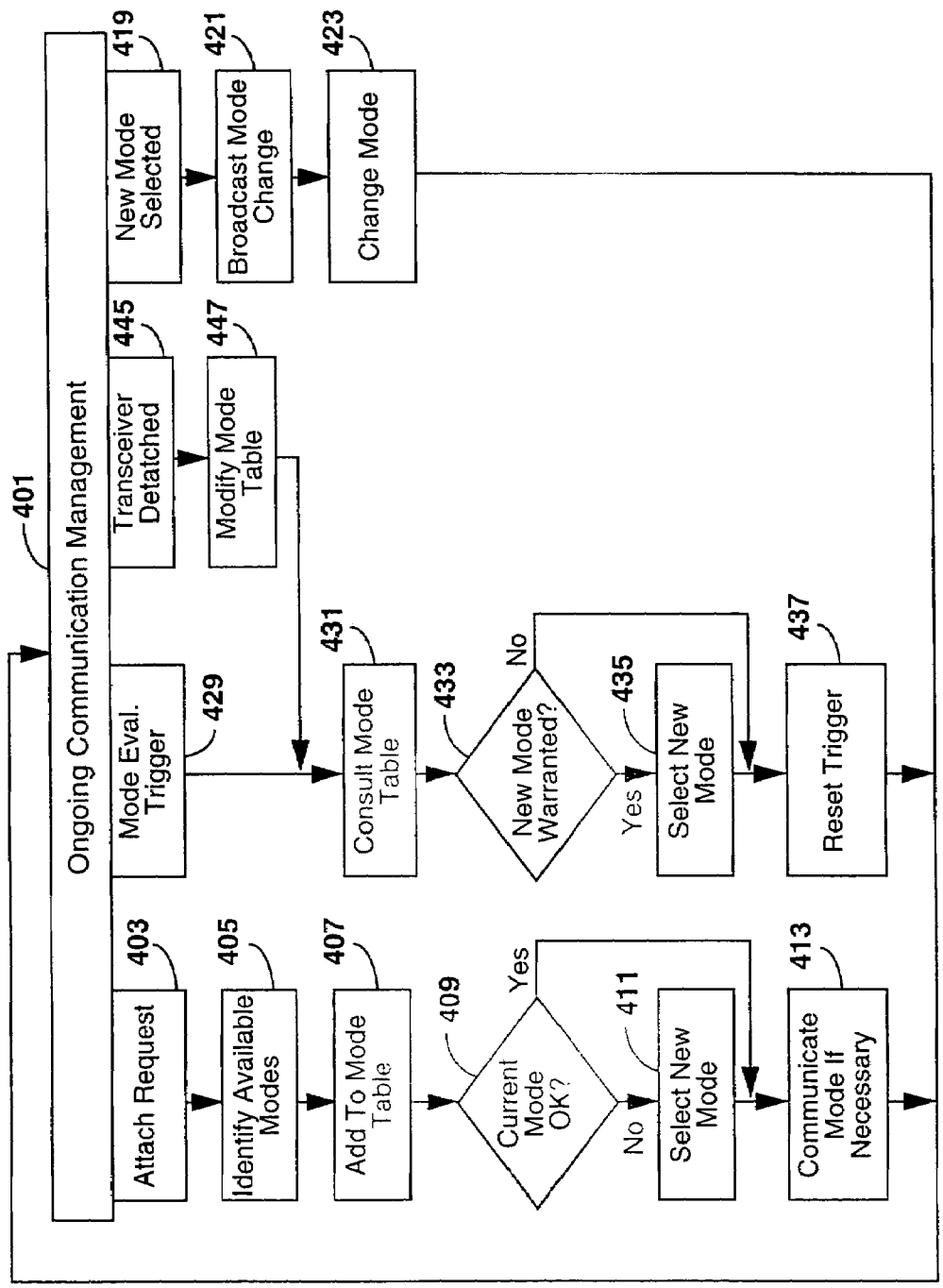
FIG. 1B is a flow diagram illustrating the operation of a wireless access device in accordance with present invention whereby multiple wireless devices having potentially different transceiver capabilities are supported.

FIG. 1B is a flow diagram illustrating the operation of a wireless access device in accordance with present invention whereby multiple wireless devices having potentially different transceiver capabilities are supported. In particular, a wireless access device manages ongoing communication within its cell with a previously selected mode and mode parameters at a block 401. At a block 403, the wireless access device identifies an attach request from a wireless transceiver (hereinafter the "requesting transceiver") that may have wandered into the cell. The access device 403 responds at a block 405 by identifying the available modes of operation of the requesting transceiver. At a block 407, the modes are added to a mode table, which stores the available modes of all the participating devices. Note that a requesting transceiver only communicates the availability of those modes which are both possible (determined by the transceiver's design) and useful (determined by a current application).

If the requesting device is capable of operating in the currently selected mode, as determined at a block 409, the wireless access device communicates mode information and parameters to the requesting transceiver at a block 413. Thereafter, the wireless access device returns to the block 401 and services all participating devices including the requesting device in the current mode with current parameters.

Alternatively, if the requesting device has a limited number of operating modes, at the block 409 the current mode may not be a possibility. If the requesting device is not capable of operating in the current mode, the wireless access device attempts to select a new mode at a block 411. If at least one common mode can be found, e.g., if all the participating devices and the requesting device have at least one common mode, the wireless access device chooses the common mode that it believes will offer optimal performance. Thereafter, at a block 413, the wireless access device communicates the selected mode and parameter information to the requesting transceiver at the block 413 and returns to the block 401. At the block 401, because a new mode has been selected, the wireless access device vectors to service the event at a block 419. At a block 421, the wireless access device broadcasts the mode and parameter information, and, at a block 423, changes its own mode. Thereafter, the wireless access device returns to service ongoing communication in that mode at the block 401.

If however a common mode cannot be found for a requesting transceiver at the block 411, the requesting transceiver is rejected from participating. In such a case, the customer must identify the radios causing the limitations and upgrade them. In another embodiment, the wireless access device operates in a time shared configurations, switching between two or more modes in a sequential fashion. In this embodiment, however, the overall delays in the system may still justify upgrading the radio transceiver(s) causing the limitations.

During the course of ongoing operation at the block 401, the wireless access device monitors channel performance (a variety of factors described in more detail above), and compares such performance to available other common modes of operation and considers potential parameter modifications: In particular, as represented by the block 429, if channel conditions degrade below a predefined threshold, the wireless access device vectors to consider changing modes. At a block 431, the wireless access device consults the mode table. If a new mode is available and warranted, per a determination at a block 433, the wireless access device responds by selecting an alternate common mode at the block 435, resets the conditions that caused the vectoring and returns to the block 401 to complete the mode change via the blocks 419, 421 and 423. Similarly, each time a participating transceiver detaches from the cell (through either active detachment or aging) as represented by an event block 445, the wireless access device removes that transceiving device's mode information from active status in the mode table and attempts to choose a better common mode via the blocks 431, 433, 435 and 437. Although not shown, the wireless access device might also periodically attempt to choose a better common mode, without requiring channel conditions to change or degrade or participants to detach.

Figure 1C:
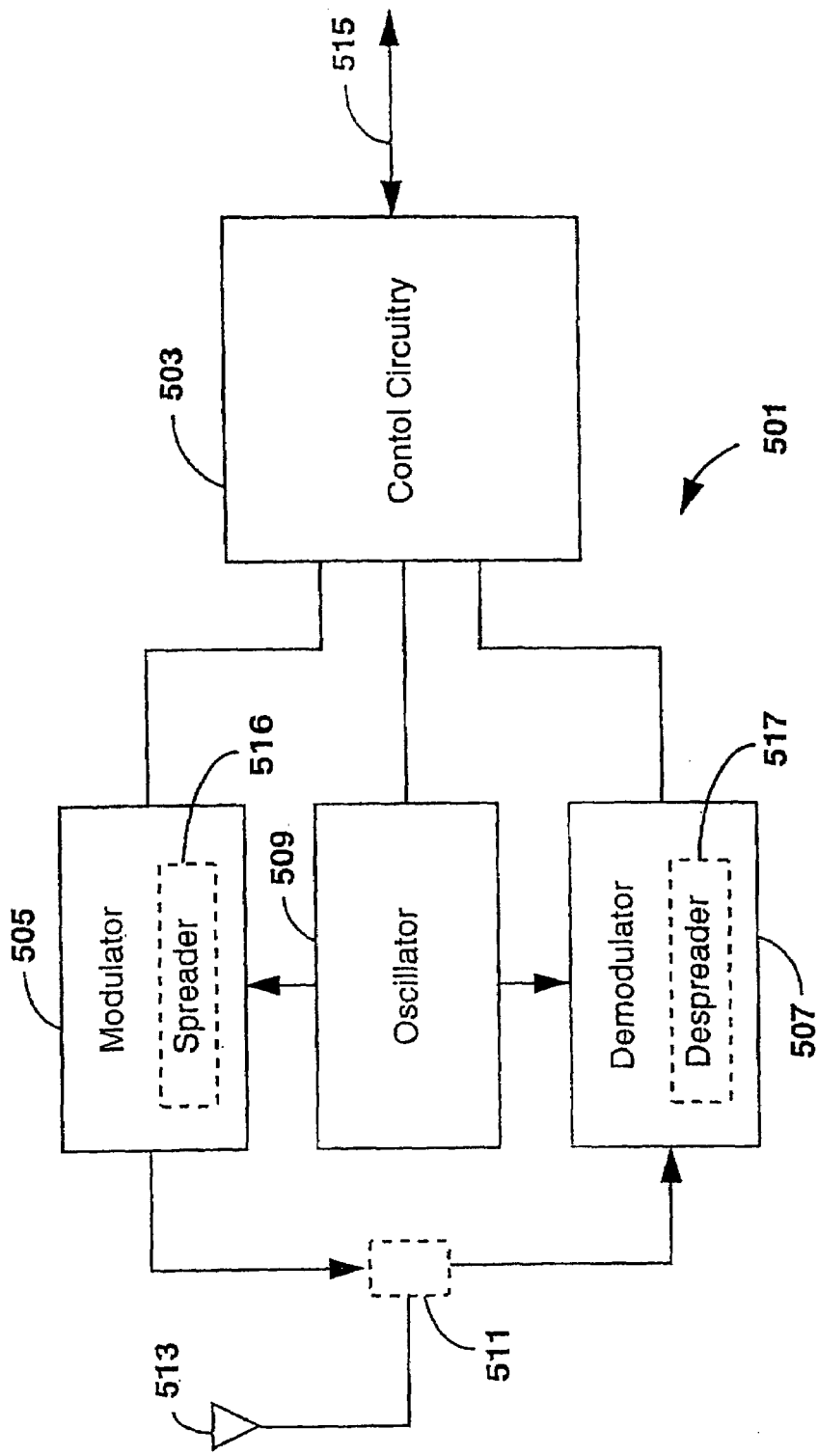
FIG. 1C is a block diagram illustrating a radio transceiver built in accordance with the present invention to provide multiple modes of operation.

FIG. 1C is a block diagram illustrating a radio transceiver used in wireless access devices and any transceiving device, such as a printer, code reader, hand-held terminal, etc., and built in accordance with the present invention to support multiple modes of operation. The transceiver module 501 comprises control circuitry 503, a modulator 505, a demodulator 507, and oscillator 509 and a switch circuit 511. The control module may have either an internal or external antenna attached thereto, i.e., an antenna 513.

The control circuitry 503 manages the operation of the other components of the transceiver module 501. The control circuitry 503 receives instructions and data to be transmitted from a host unit (not shown) via a wired communication link 515. The control circuitry 503 deliver such data to the modulator 505 for modulation (and possibly spreading). Thereafter, the data is delivered to the antenna 513 via the switch 511. Data and control signals received by the antenna 513 passes through the switch 511 to the demodulator 507 for demodulation (and possibly despreading). The control circuitry 503 receives the demodulated data or control signals for processing and/or delivery to the host unit through the link 515.

The control circuitry 503 causes the selection of operating parameters and modes as described previously and in reference to FIG. 1B. Specifically, the control circuitry 503 sets the configuration of the modulator 505, demodulator 507 and oscillator 509. For example, to operate in a direct sequence spread spectrum mode, the control circuitry 503: 1) sets the base frequency of the oscillator 509; 2) sets related mode parameters such as the chipping rate; and 3) delivers enable signals and a spreading code to a spreader circuit 516 and despreader circuit 517 of the modulator 505 and demodulator 507, respectively. To operate in a frequency hopping mode, the control circuitry 503: 1) establishes related parameter settings; 2) disables the spreading and despreading circuits 516 and 517; 3) selects a hopping sequence of frequencies; and 4) directs the oscillator 509 through the sequence. To operate in a hybrid, direct sequence, frequency hopping mode, the control circuitry 503: 1) establishes related parameter settings; 2) delivers enable signals and a spreading code to a spreader circuit 516 and despreader circuit 517; 3) selects a hopping sequence of frequencies; and 4) directs the oscillator 509 through the sequence. Similarly, the control circuitry 503 may select any modes, e.g., the modes identified in reference to FIG. 10 below, and set all parameters related thereto.

Figure 1D:
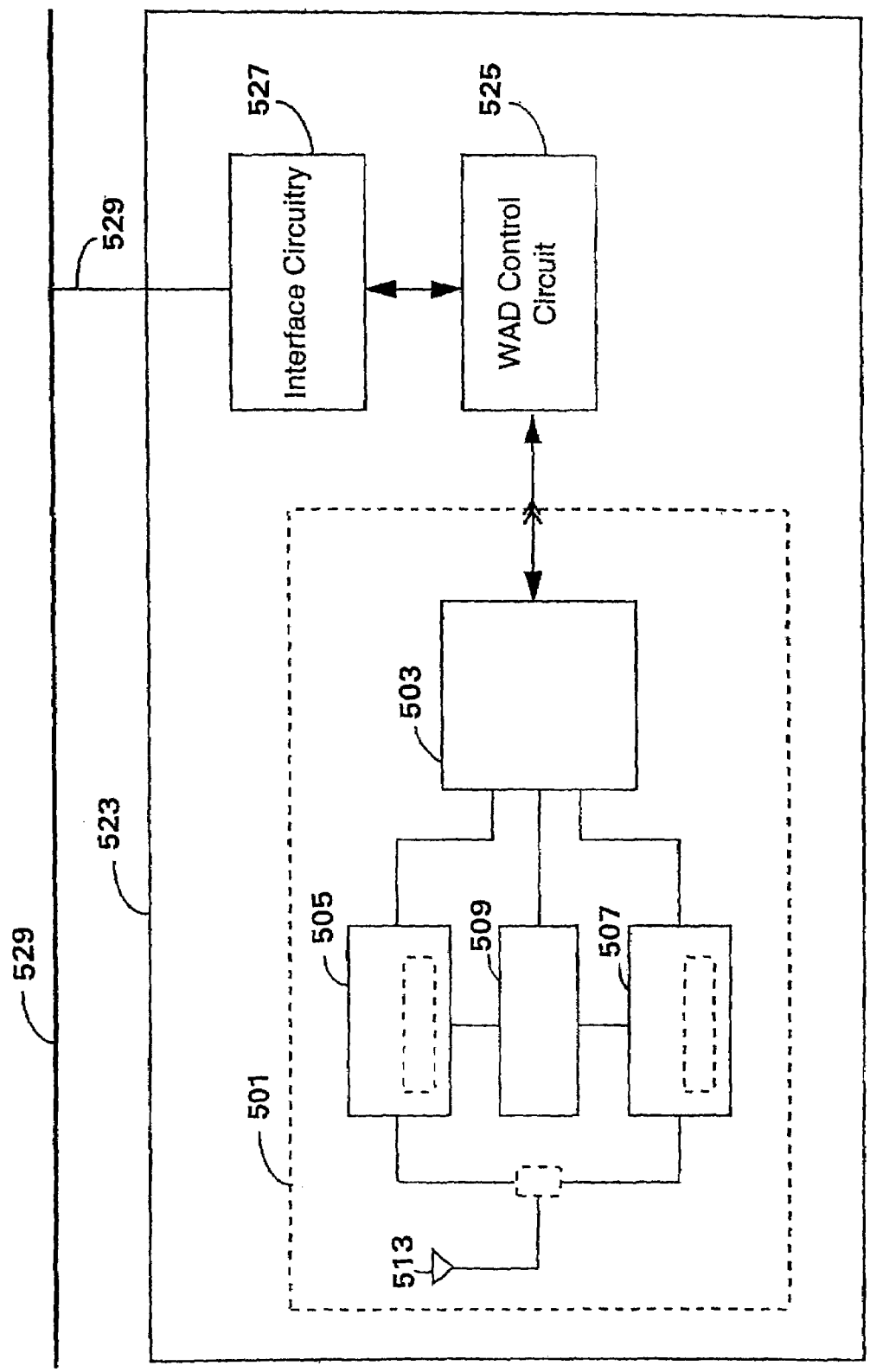
FIG. 1D is a block diagram illustrating the operation of the wireless access device having the multi-mode transceiver of FIG. 1C installed therein.

FIG. 1D is a block diagram illustrating the operation of the wireless access device having the multi-mode transceiver of FIG. 1C installed therein. In particular, a transceiver module 501 (as described in relation to FIG. 1C) is installed within a wireless access device 523. The wireless access device 523 contains control circuitry 525 and interface circuitry 527 for communicating with a wired network 529. In addition to providing typical access device service, the control circuitry 525 of the wireless access device 523 manages all mode and parameter changes for the transceiver module 501. The control circuitry 525 monitors, among other factors, the historical performance characteristics of each mode, neighboring access device modes, parameters and performance and current mode performance (via received signal strength indications and success/failure rates). The control circuitry 525 also maintains and updates the mode table, attachment and detachment of participants, as described above in reference to FIG. 1B for example. The control circuitry 525 performs such functionality via control signals delivered to the control circuitry of the transceiver module 501.

When installed in a portable/mobile or stationary transceiver unit (e.g., peripheral device, code reader, hand-held terminal, etc.), a transceiver module responds to communication control through commands received from the wireless access device while attempting to attach. Such commands direct the mode and parameters of operation of the transceiver module in the transceiver unit. In addition, the control circuitry of the transceiver module 501 directs entry of a default mode and default parameters prior to receiving direction from a wireless access device. Although the transceiver module 501 may receive additional mode and parameter commands from the host controller within the transceiver unit, it need not do so. Such local control by a transceiver unit, however, may prove advantageous in other wireless network embodiments or in specific applications. For example, other network embodiments might involve only two transceiver units without a wireless access device. As such, the transceiver units may negotiate a mode and related parameters amongst themselves, controlling such changes via host processors within the transceiver units. Negotiation of mode and parameter changes might also involve channel condition monitoring or other factors currently assigned to the wireless access device.

Figure 2A:
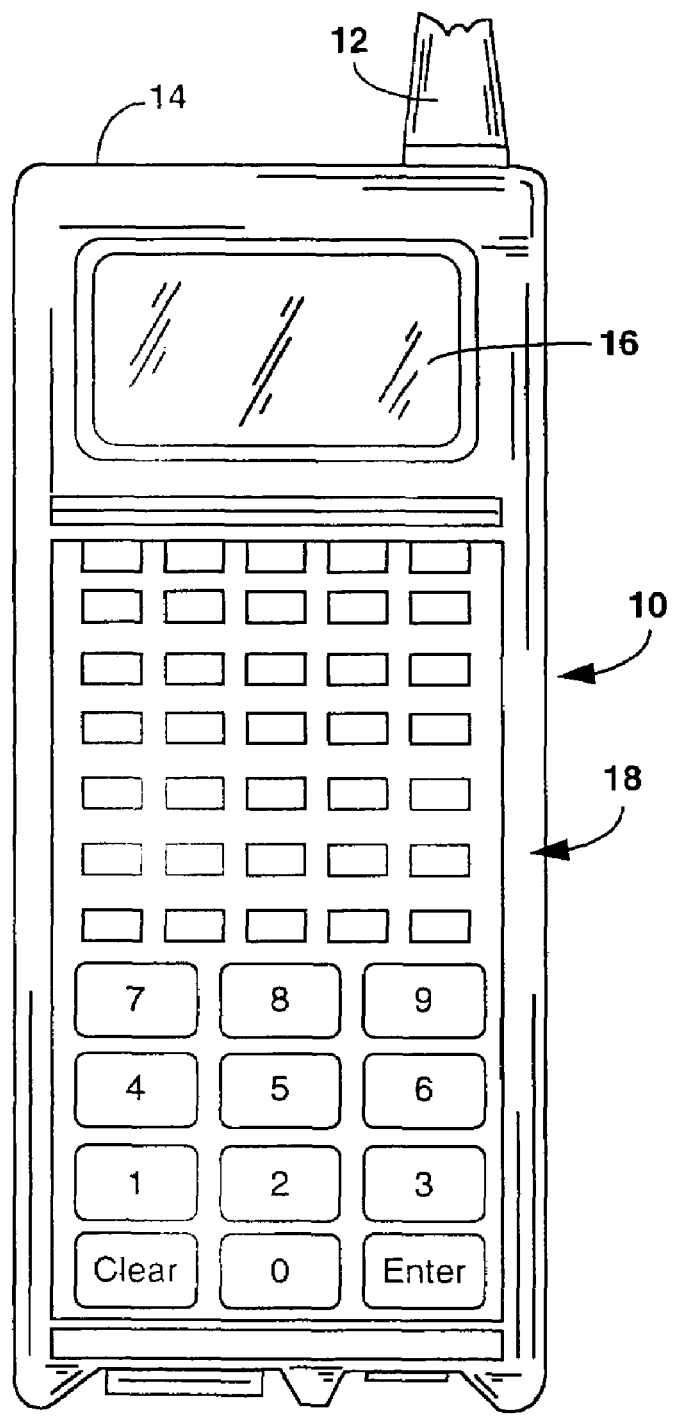
FIG. 2A is a front elevation view of one embodiment of a hand-held portable data terminal having a transceiver module built in accordance with the present invention.

FIG. 2A illustrates a hand-held portable data terminal which incorporates the present invention, designated generally by the numeral 10. The data terminal 10 may be one of several data terminals in a local area network which utilizes radio frequency (RF) communications for data transfer. The data terminal 10 illustrated is a mobile data unit that includes a radio transceiver unit incorporating the present invention. Of course, as has been previously described, the present invention may be incorporated into stationary units as well as mobile units. Further, the stationary units may comprise wireless access points, other function performing devices such as printers, stationary scanners, or other devices. Moreover, mobile units incorporating the present invention need not comprise the hand-held radio format illustrated in FIG. 2A. The mobile units could be installed in vehicles, worn by a user, or installed in any other fashion that causes the device to be mobile.

The data terminal 10 includes an antenna 12 is disposed at the top end 14 of the data terminal for radio frequency transmission and reception. The data terminal may include a display screen 16 for displaying program information and for interfacing the operator with the data terminal 10. The display screen 16 may be a reflective super-twist liquid crystal display (LCD), for example. The data terminal 10 may include a keypad 18 having a plurality of keys for entering data into the data terminal 10 and for control of the data terminal 10 by the operator.

Figure 2B:
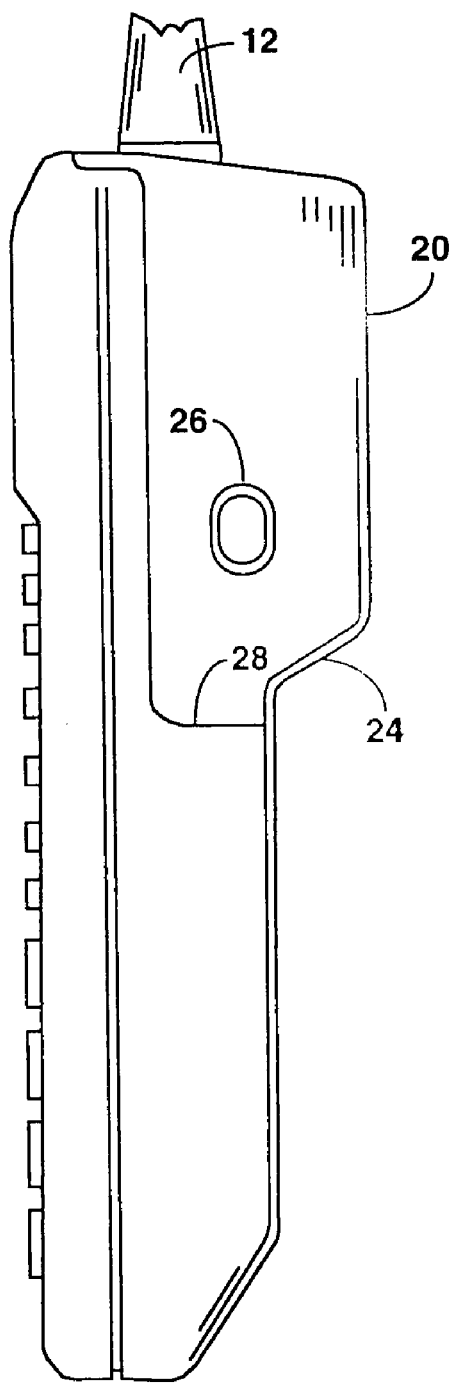
FIG. 2B is a side elevation view of the hand-held portable data terminal of FIG. 2A showing a module of the present invention.

FIG. 2B shows the data terminal 10 of FIG. 2A which includes a module in which circuitry for accomplishing the present invention is disposed. The data terminal 10 has a modularly attached radio module 20 which also contains scanning circuitry in addition to radio circuitry. The antenna 12 of FIG. 2A is affixed to the radio/scanner module 20 and may be a type suitable for portable battery powered electronic devices. The radio/scanner module 20 has an extended outer shell 24 in order to contain both the radio and the scanner circuitry. A button 26 may be disposed on either or both sides of the radio/scanner module 20 to activate the scanning circuitry and scan encoded data, such as that contained in a bar code or two dimensional image. The module 20 could, in another embodiment, include a digital camera or other functional equipment. As illustrated, the radio/scanner module 20 is constructed to be modularly received by a recession 28 in the data terminal such that a continuous unit is formed by attaching the module 20 to the data terminal.

Figure 3:
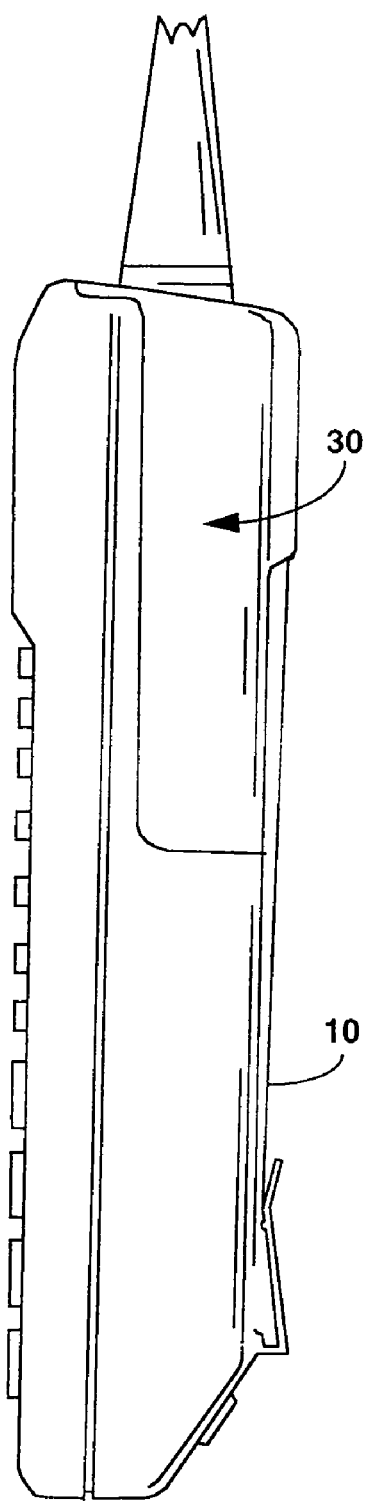
FIG. 3 is a side evaluation view of the hand-held portable data terminal of FIG. 2A showing a module of the present invention.

FIG. 3 shows a side view of another embodiment of a data terminal 10 with an alternate modular radio module attached thereto. The module 30 includes a radio incorporating the teachings of the present invention but does not include the image capture electronics of the radio/scanner module 20 of FIG. 2B. Because the module 30 is more compact than radio scanner module 20 of FIG. 2B, the body of radio module 30 is generally flush with the body of the data terminal 10 when attached thereto.

Figure 4:
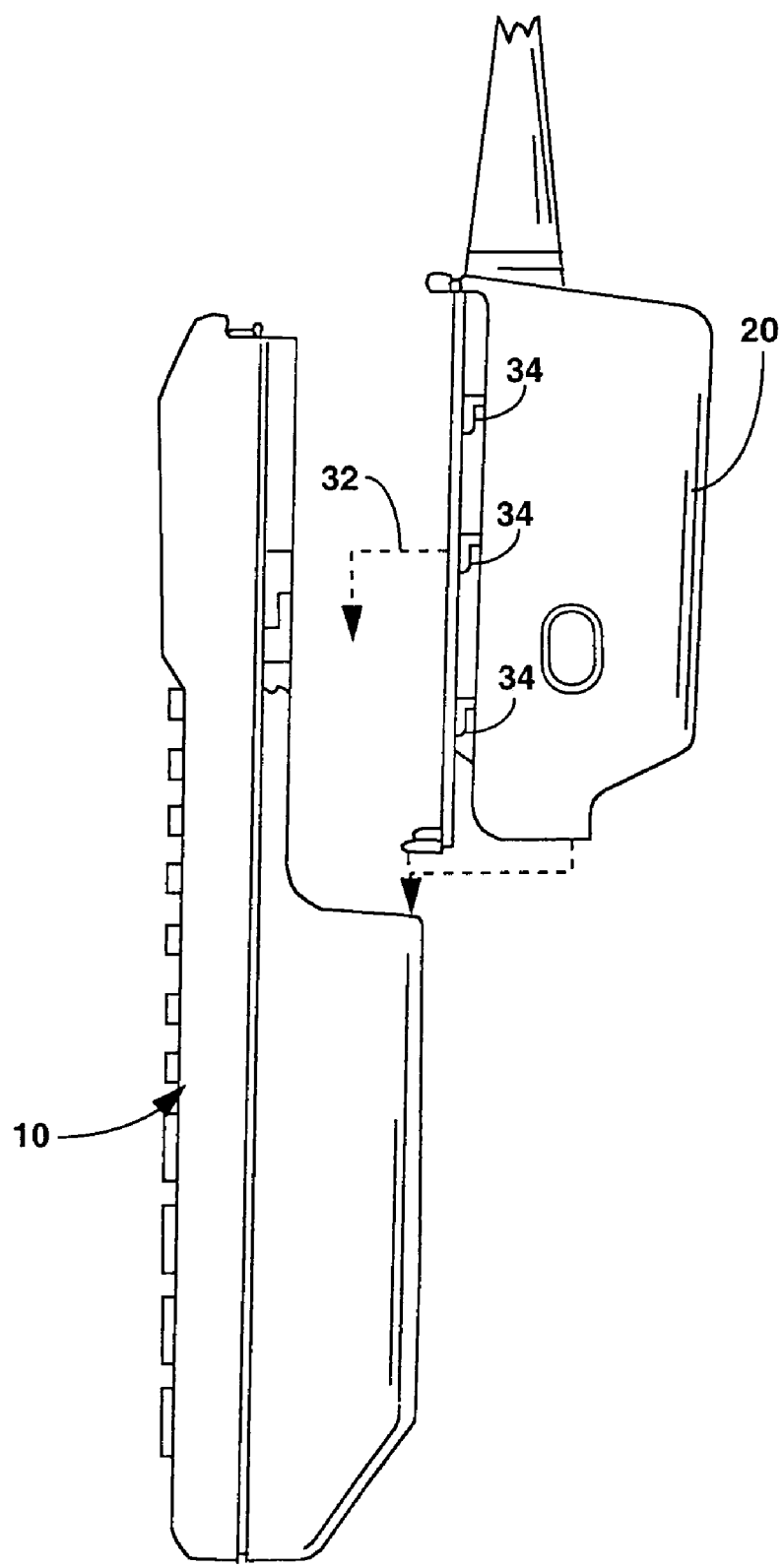
FIG. 4 is a side elevation view of the hand-held portable data terminal of FIG. 2A showing a removably insertible module of the present invention.

FIG. 4 shows a data terminal 10 that is removably attachable to the radio/scanner module 20 of FIG. 2B. The motion required for attachment of the module 20 to the data terminal 10 generally follows the direction of line 32. The module 20 is positioned toward the terminal 10 and then locked into place by a downward movement. L-shaped latches 34 may be used to removably secure the module 20 to the terminal 10.

Figure 4A:
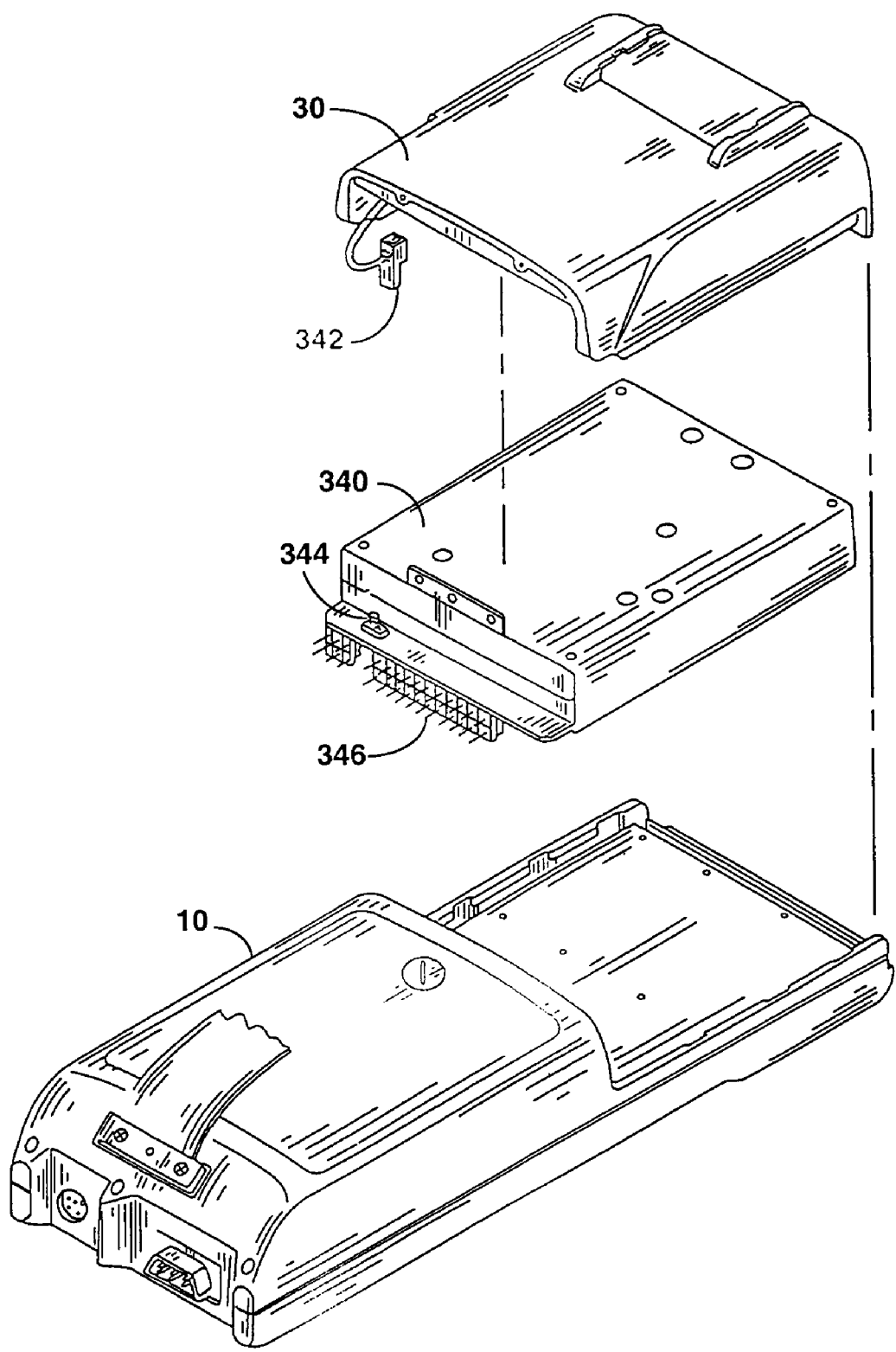
FIGS. 4A, 4B and 4C illustrate in detail the cooperation between a radio module and the hand-held portable data terminal shown in FIG. 3.
Figure 4B:
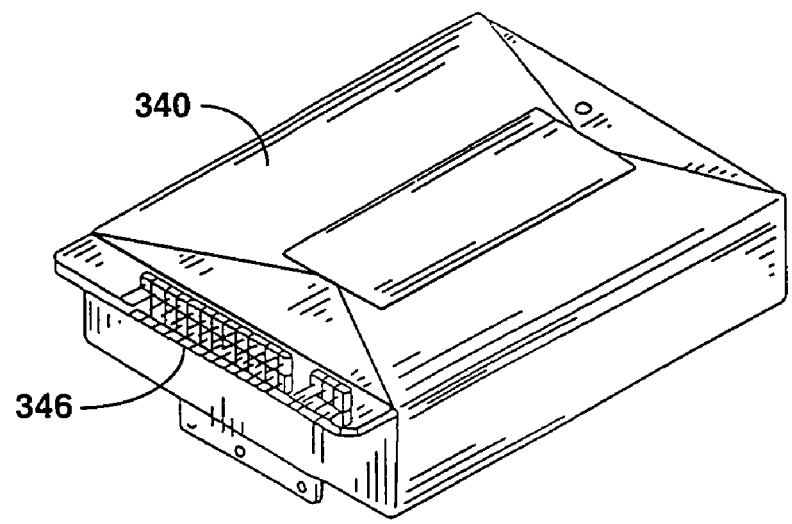
Figure 4C:
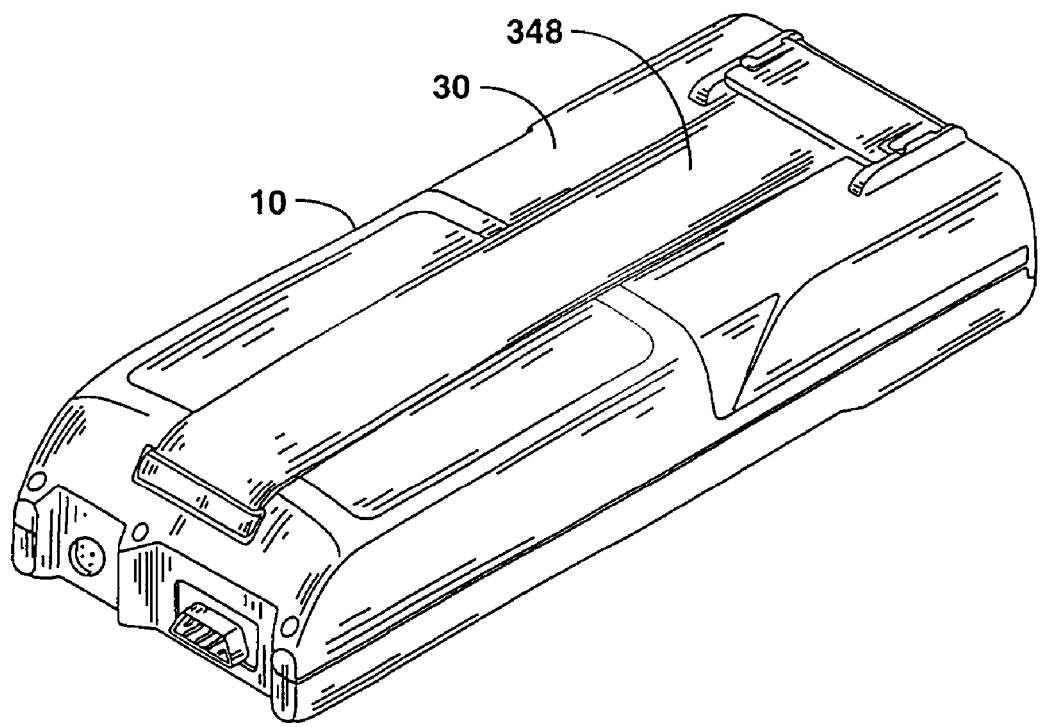

FIGS. 4A, 4B and 4C illustrate in detail the cooperation between a radio module and the hand-held portable data terminal shown in FIG. 3. The radio module 30 houses a radio unit 340. An antenna connector 342 connects to antenna connector pins 344 at an end of the radio unit 340 to provide electrical connection to an antenna which may be internally or externally mounted on the module 30. An array of connecting pins 346 preferably connect the radio unit 340 to the data terminal which may have a receptacle for receiving the connecting pins 346. The radio module 30 may include a hand strap 348, one end of which being connected to the module 30 and the other end being connected to the terminal 10, to facilitate manipulation of the terminal 10 in one hand and to prevent accidental dropping, for example.

Figure 5:
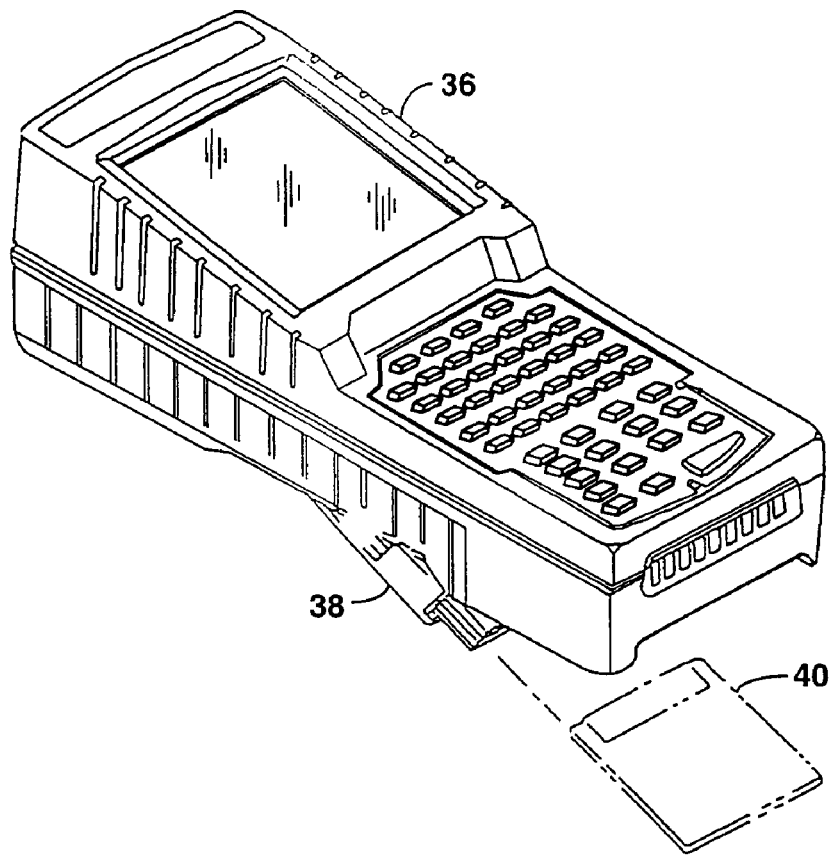
FIG. 5 is a perspective view of another hand-held portable data terminal which may incorporate the present invention.

FIG. 5 depicts another type of hand-held portable data terminal 36 that incorporates the present invention and that is designed to receive standard PCMCIA computer feature card modules. The terminal 36 may have a module carriage housing 38 which may receive various types of PCMCIA cards 40: Type I (3.3 mm in thickness), Type II (5.0 mm in thickness) or Type III (10.5 mm in thickness) PCMCIA sized modules for example.

Figure 6:
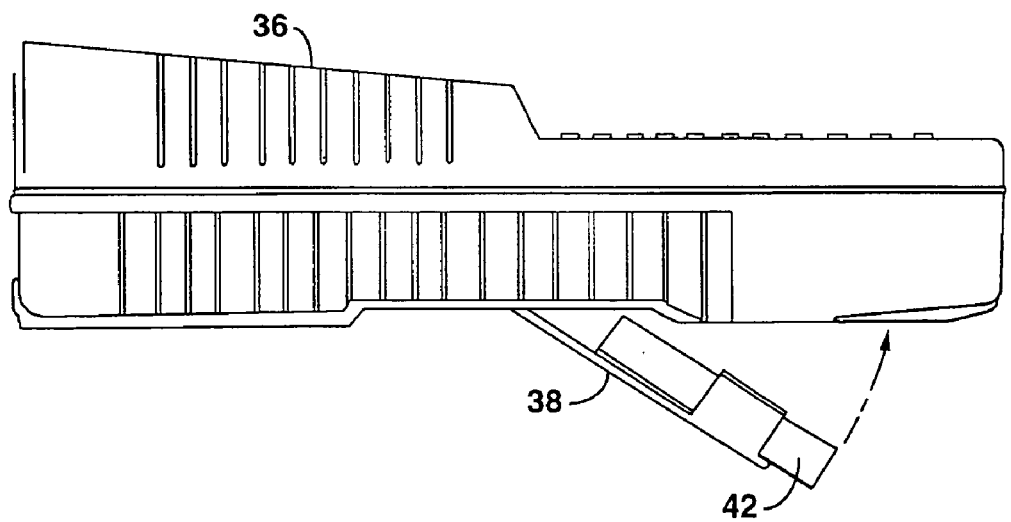
FIG. 6 is a side elevation view of the data terminal of FIG. 5 showing an extendibly retractable rotating carriage housing for receiving a module incorporating the present invention.

FIG. 6 shows the data terminal of 36 of FIG. 5 having a rotatably extendible and retractable carriage housing 38. The carriage housing 38 is shown in the extended position holding a Type III PCMCIA module 42 which may, for example, contain the radio circuitry of the present invention.

Figure 7:
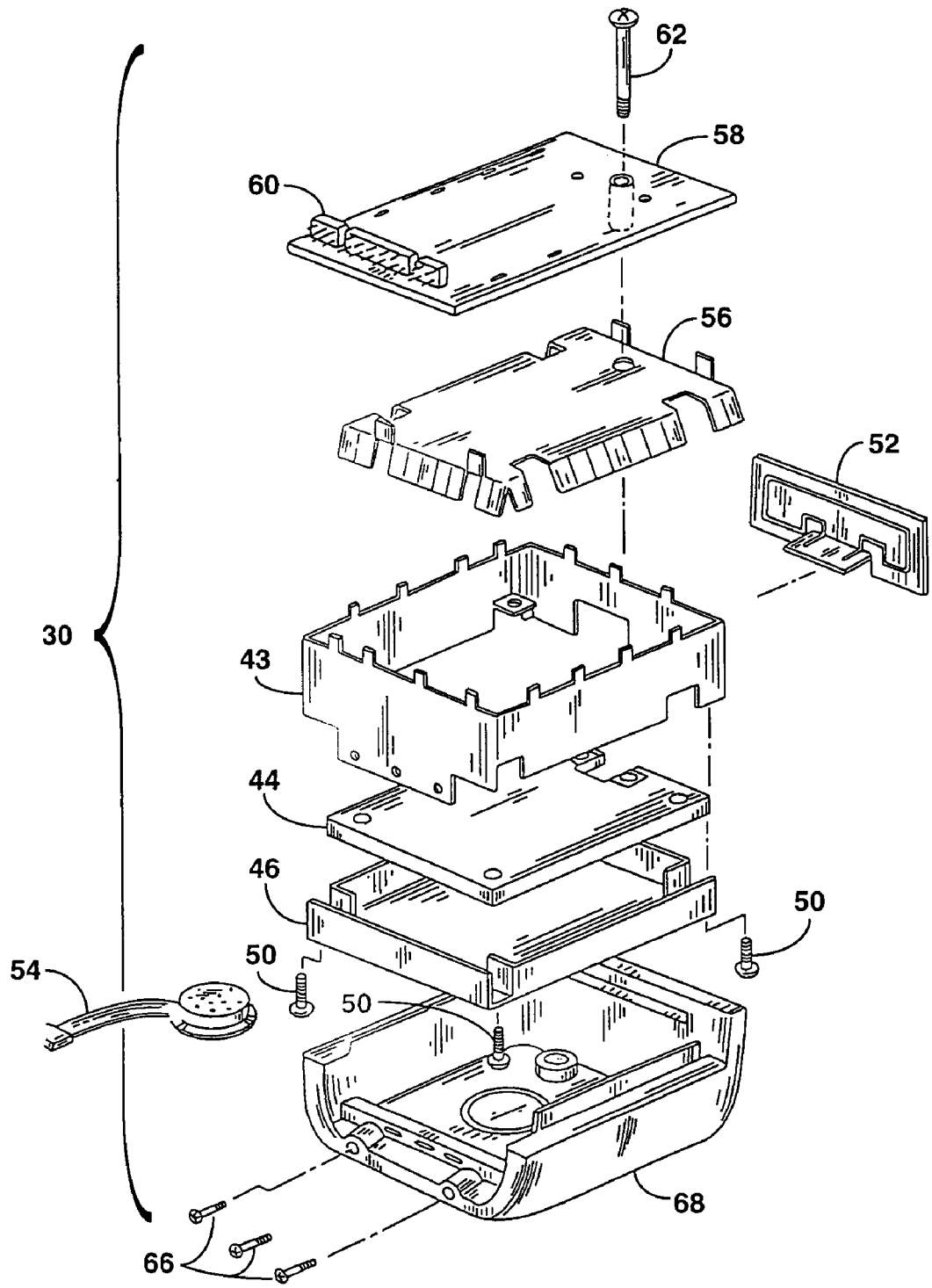
FIG. 7 is an exploded view of a radio module incorporating the present invention.

FIG. 7 is an exploded view of the internal components of a radio module 30 of the present invention such as the module 30 of FIG. 3. The circuitry of radio module 30 of the present invention such as the module 30 is preferably mounted on a circuit card assembly (CCA) board 44 containing, for example, the transmitter and receiver electronic components (not shown). The radio CCA 44 may have metallic coverings, or cans (not shown), soldered to the board over critical radio components to provide two-way electromagnetic shielding to reduce or eliminate radio frequency interference.

In embodiment of FIG. 7, the radio module CCA 44 is contained within a metallic radio cover 46 to provide electromagnetic shielding of the radio CCA 44. The radio CCA 44 and radio cover 46 may be attached to a mounting frame 48 which provides supporting structure for the internal components of the radio module 30. Radio cover 46 and mounting frame 48 may be fabricated of ABS type plastic or of a conductive metal to provide electromagnetic shielding. The radio CCA 44 and the radio cover 36 may be attached to the mounting frame 48 by a plurality of fasteners 50 which may be four #2 screws in a preferred embodiment.

An internal antenna 52 may be connected to the radio circuitry of the radio CCA 44 in lieu of the external linear antenna 12 shown in FIG. 2A and completely contained within the radio module 30. The radio module 30 may utilize the antenna means of U.S. Pat. No. 5,322,991 issued Jun. 21, 1994 and assigned to NORAND Corporation of Cedar Rapids, Iowa, the assignee of the present application, Said U.S. Pat. No. 5,322,991 is hereby incorporated by reference in its entirety. The antenna 53 may comprise a quarter-wavelength single loop of wire of approximately 83 mm for transmissions near 900 MHz. When the loop antenna 52 is driven by the output of the radio module 44, a uniform circulatory current flowing through the antenna 52 results in a radiation pattern similar to that of a magnetic dipole. The antenna 52 preferably has a nominal impedance of 50 S.

An internal shield 56 may be utilized and inserted between the radio circuit card assembly (CCA) 44 and the radio interface card (RIC) 58 which contains the electronic circuitry necessary6 to interface the electronics of the radio CCA 44 with the electronics of the data terminal 10 of FIG. 2A. The radio interface card 58 may be a type used for a 2.4 GHz radio since the interface to the radio CCA 44 is baseband. The 900 MHz radio 44 of the present invention may be designed to appear as a 2.4 GHz radio accepting the same frequency control inputs and employing the same media access control protocols as a 2.4 GHz radio.

Electrical connectors 60 may be mounted at an end of the radio interface card 58 for providing electrical connection to the CPU board (not shown) of the portable data terminal with which the radio module 30 is utilized, such as terminal 10 of FIG. 2A. A mounting fastener 62, which may be a screw, fastens the radio interface card to the radio module assembly 30. An acoustic-electric transducer such as buzzer 64 may be included with the radio module 30 and electronically connected to the radio CCA 44 5to provide the operator with audio information and cues, for example a beep or buzz when the radio module 30 is powered on. Frame mounting screws 66 may be utilized to fasten the assembly to the outer shell 68 via mounting frame 48. The entire module assembly may be wrapped in a metallic foil to provide electromagnetic shielding to the radio module 30. The outer shell 68 is preferably a type of ABS plastic and is formed to modularly and contiguously fit the recession 28 of the data terminal 10 as shown in FIG. 2B.

Figure 8:
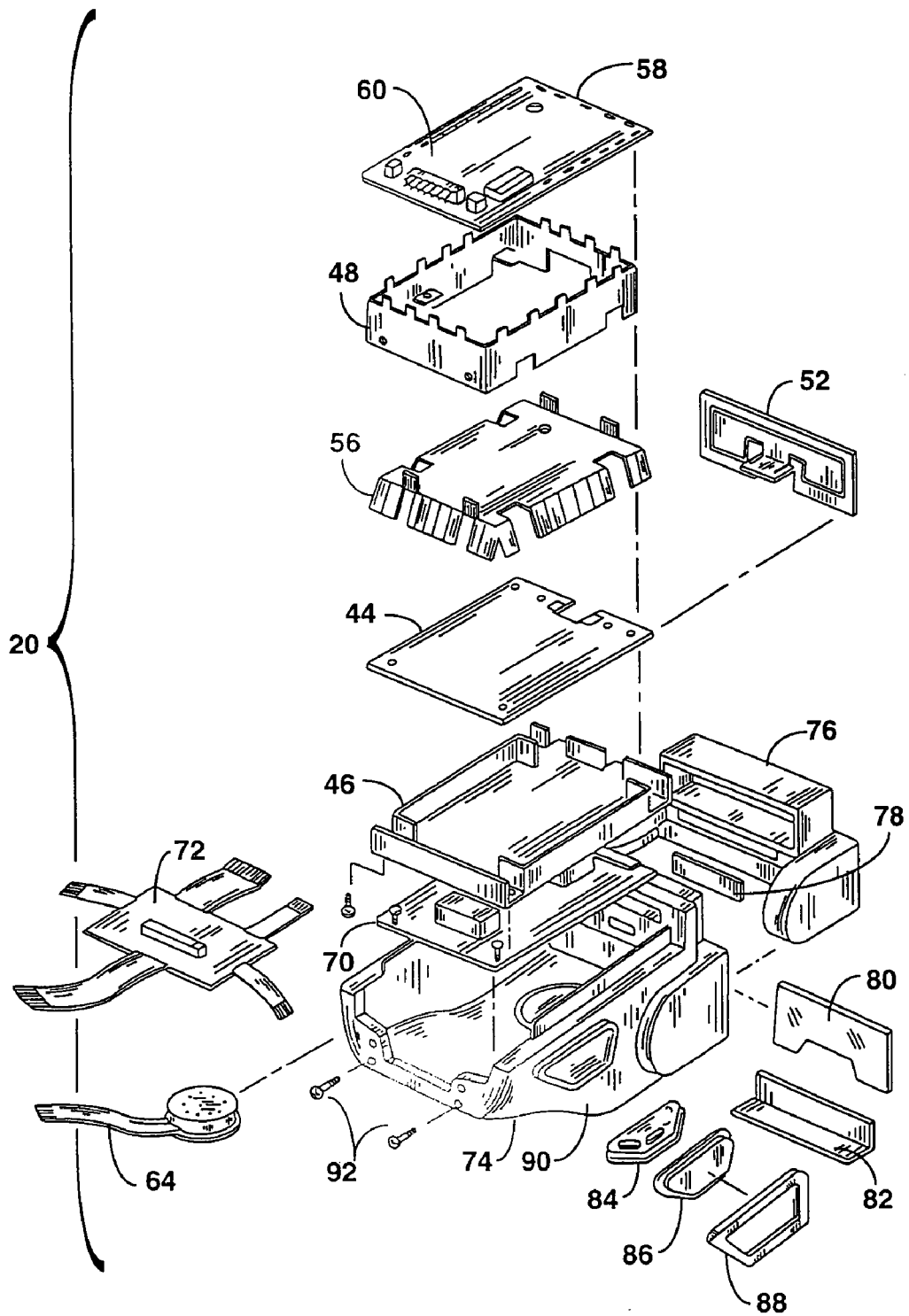
FIG. 8 is an exploded view of a radio module of the present invention further containing a scanner.

FIG. 8 is an exploded view of the radio/scanner module 20 illustrated in FIGS. 2B and 4. The components and assembly thereof of the radio/scanner module 20 are substantially similar, with some slight modifications thereof where necessary, to that of the radio module 30 of FIG. 7, the principle difference being the addition of scanner circuitry in the radio/scanner module 20 for reading optically readable data files such as standard bar codes. The radio/scanner module 20 includes radio interface card 58 with electrical connectors 60, mounting frame 48, internal shield 56, radio CCA 44, antenna 52, radio cover 46, and buzzer 64 as shown in FIG. 7 (and as described in the discussion of FIG. 7).

In addition to the above components, the radio/scanner module 20 includes a scanner printed circuit board 70 on which the scanner electronic circuitry are mounted. A flex circuit connection assembly 72 may be utilized to interconnect the electronic circuitry, such as the circuitry of scanner card 70 and interface card 58. The outer shell 74 of the radio scanner module is substantially similar to the outer shell 68 of radio module 30 as shown in FIG. 7, modified to accommodate the additional components of the radio/scanner module 20.

A rubber nose end cap 76 may be attached to the forward end of the outer shell 74 for providing impact shock absorption and protection. A seal label 78 may be used to provide an adhesive seal between rubber nose end cap 76 and outer shell 74. A lens 80 mounted with a lens seal support 82 may be disposed in the rubber end cap 76 to provide a sealed light aperture for the scanner circuitry. Scanning of an optically readable data file may be controlled with a scam button 86 which covers am input keyboard and elastomer 84 and is supported by a scan button bezel 88 mounted in a button aperture 90 on a side of the outer shell 74. The radio/scanner may have a plurality of scan or input buttons 86. For example, an additional button may be provided on the side of the outer shell 74 opposite the button 86 shown in FIG. 8.

Frame mounting screws 92 are provided to mount the mounting frame 48 containing the module assembly to the outer shell 74. The outer shell 74 and radio/scanner module are formed to modularly and contiguously attach to the data terminal 10 as illustrated in FIGS. 2B and 4 in a manner substantially similar the attachment of radio module 30 to data terminal 10. The entire module assembly 20 may be wrapped in a metallic foil to provide electromagnetic shielding to the radio module 20.

Figure 9:
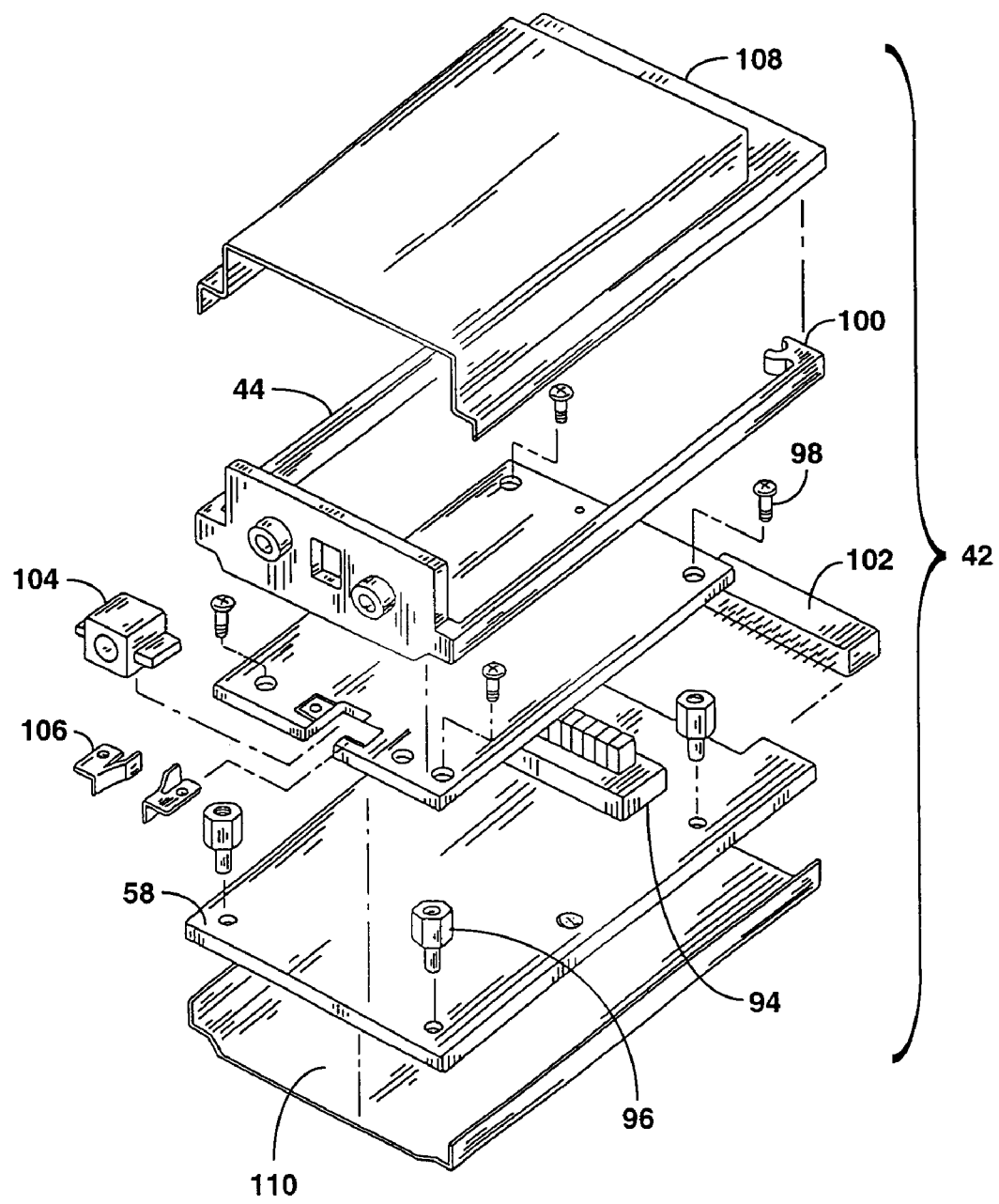
FIG. 9 is an exploded view of a radio module of the present invention contained within a PCMCIA type housing.

FIG. 9 is an exploded view of the PCMCIA Type III radio module 42 of FIG. 6. The PCMCIA radio module 42 may also be constructed within a smaller sized PCMCIA module such as Type II or Type I enclosure by combining the circuitry of the radio interface card 58 and the radio circuit card assembly 44 on a single printed circuit board, for example. The PCMCIA radio module 44 may contain the radio circuit card assembly 44 and the radio interface card 58 of FIGS. 7 and 8. The radio interface card 58 is preferably adapted to conform to PCMCIA device interface standards for utilization in PCMCIA radio module 42. The circuitry of the radio CCA 44 and the radio interface card 68 may be interconnected by a board to board connector 94. Alternatively, all of the circuitry of the RIC 58 and the CCA 44 may be combined on a single printed circuit board for smaller sized radio modules (20, 30 or 42).

Standoffs 96 may be soldered directly to the radio interface card 58 and are provided to separate the radio CCA 44 from the radio interface card 58 and to provide attachment thereto with fasteners 98 (preferably #2-56 screws). The screws 98 preferably attach the radio CCA 44 to a custom PCMCIA Type III frame 100 which provides structural support and protection of the circuit boards 44 and 58. A PCMCIA electrical receptacle 102 may be provided to electrically connect the radio module to standard PCMCIA connectors in the electronic equipment in which the module 42 is to be utilized, such as the data terminal 36 of FIGS. 5 and 6.

An antenna connector 104 may be mounted on the radio CCA 44 for connection of the module to an antenna which may be, for example, the antenna 12 of FIG. 2A, the antenna 52 of FIGS. 6 and 7 of the antenna means of U.S. Pat. No. 5,322,991 issued Jun. 21, 1994 incorporated herein. Alternate antenna clips 106 may be utilized for adapting the radio module 42 to various antenna connection configurations.

The PCMCIA radio module 42 may be contained within top and bottom covers 108 and 110 respectively which are preferably comprised of tin plated cold rolled steel. The module covers 108 and 110 may provide two way electromagnetic shielding of the radio frequency circuitry. When the radio module 42 is assembled and contained within top cover 108 and bottom cover 110 the module preferably conforms to PCMCIA Type III dimensions. The module 42 may also be adapted to conform to PCMCIA Type II or Type I dimensions as well.

The transceiver module as shown in FIG. 9 may be utilized in a standard desktop or portable computer such as a laptop computer which is designed to utilize standard PCMCIA computer modules. The portable computer may be implemented as part of a multilayered communication network such as a communications node to communicate, for example, with several data terminal in a connected wired network, as well as with nodes in the wireless network. In this fashion, the computer could serve as a wireless access point, a wireless access server, or another type of wireless device providing access to the wireless network. A preferred embodiment of the present invention implements Layer 1 (the physical layer) and the medium access control (MAC) sublayer of Layer 2 (the data link layer) of the International Standards Organization Reference Model (ISORM) operating under an ODI or NDIS driver. A driver interface to the MAC sub-layer allows the utilization of industry standard multi-layer communications protocol above the MAC sub-layer.

Figure 10:
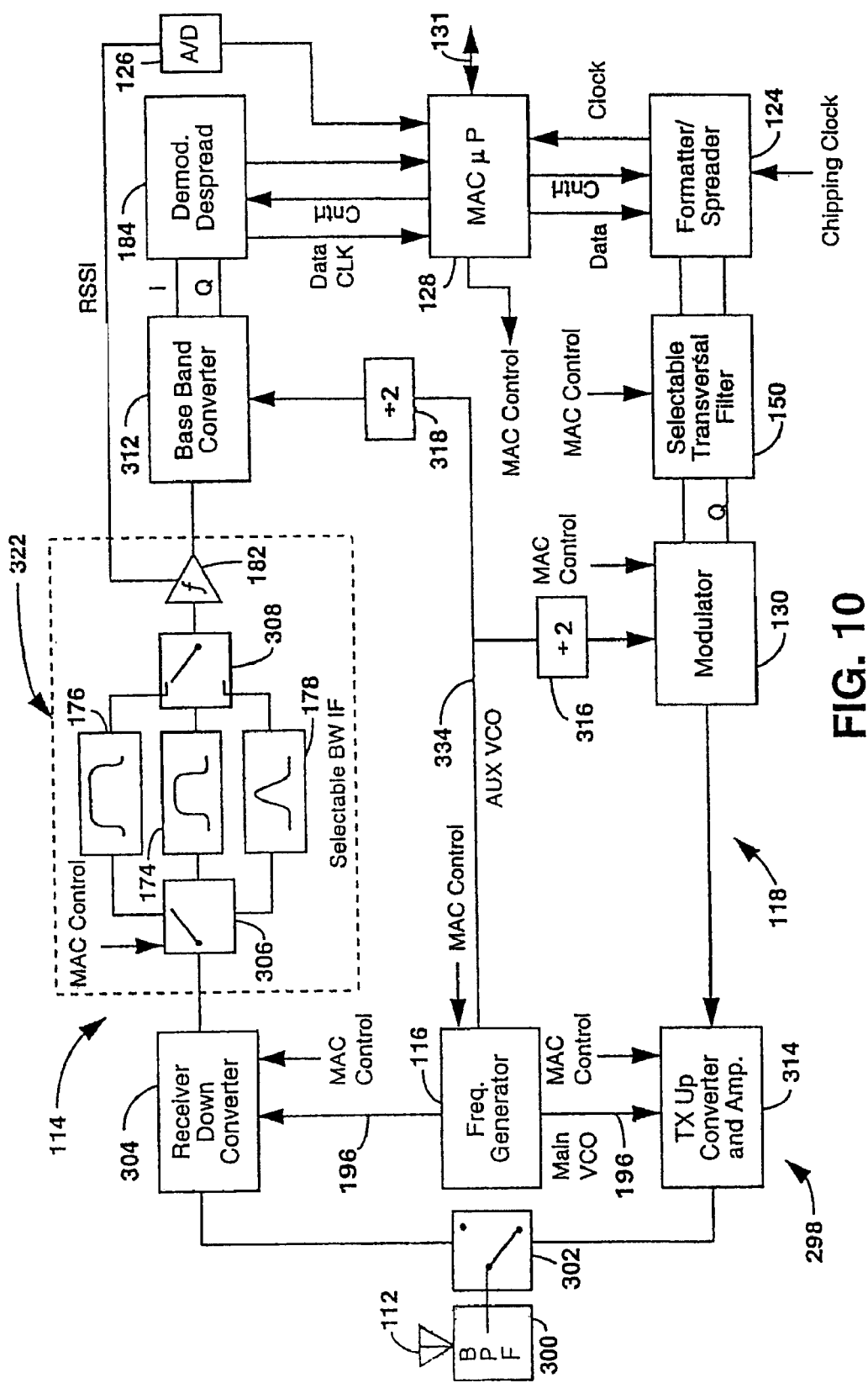
FIG. 10 is a functional block diagram of the architecture of the radio modules of the present invention.

FIG. 10 is a functional block diagram of an embodiment of the radio modules 20, 30 and 42 of the present invention. The components of FIG. 10 implement the teachings of the present invention by causing the radio module to be operable in any of a plurality of spread spectrum modes depending upon system and transmission conditions. The components illustrated could be found in a mobile unit or a stationary unit to provide equivalent functionality in the units. In one embodiment, at least one stationary unit and a plurality of mobile units in a wireless local area network are capable of operating in a plurality of spread spectrum modes such as direct sequence, channelized direct sequence, frequency hopping, channelized frequency hopping, or hybrid modes. The components illustrated in FIG. 10 allow the radio modules to operate in such a fashion.

The antenna section includes an antenna 112 for transmitting and receiving radio frequency energy. The antenna 112 may be one of the antennas described in the discussion of FIGS. 7, 8 and 9. The radio circuitry corresponds to the radio circuitry of the radio CCA 44 of FIGS. 7, 8 and 9 and contains the receiver circuitry 114, the transmitter circuitry 118 and the frequency generator ("FREQ. GENERATOR") 116.

The radio frequency (RF) transceiver 298 of the present invention comprises a receiver 114 and a transmitter 118. The transmitter 118 preferably comprises a data formatter and spreader ("BASE BAND FORMATTER/SPREADER") 124, a selectable transversal filter 150 comprising programmable transversal filters ("PROGRAMMABLE TRANSVERSAL FILTER") 146 and 148 (See FIG. 11), a binary phase shift keying (BPSK) modulator ("BPSK MODULATOR") 130, and a transmitter up converter and linear transmit power amplifier ("TX UP CONVERTER & AMP") 314. The receiver 114 preferably comprises a receiver down converter 304, a selectable bandwidth intermediate frequency (IF) stage ("SELECTABLE BW IF") at a fixed IF center frequency, a non coherent I/Q base band converter ("BASEBAND CONVERTER"), and a demodulator/despreader ("DEMOD. DESPREAD.").

A common radio frequency bandpass filter ("BPF") 399 is shared by both the transmitter 114 and the receiver 118. The transceiver 298 is coupled to an antenna 112 through an antenna switch circuit 302. A frequency generator 116 is common to both the receiver 114 and the transmitter 118, producing a frequency agile main VCO output ("MAIN VCO") 196, and an auxiliary output ("AUX VCO") 334 at twice the IF frequency. A divide by 2 circuit (316 and 318) in the transmit path of the auxiliary VCO signal 334 is activated when the transceiver 298 is switched to the transmit mode.

Figure 18:
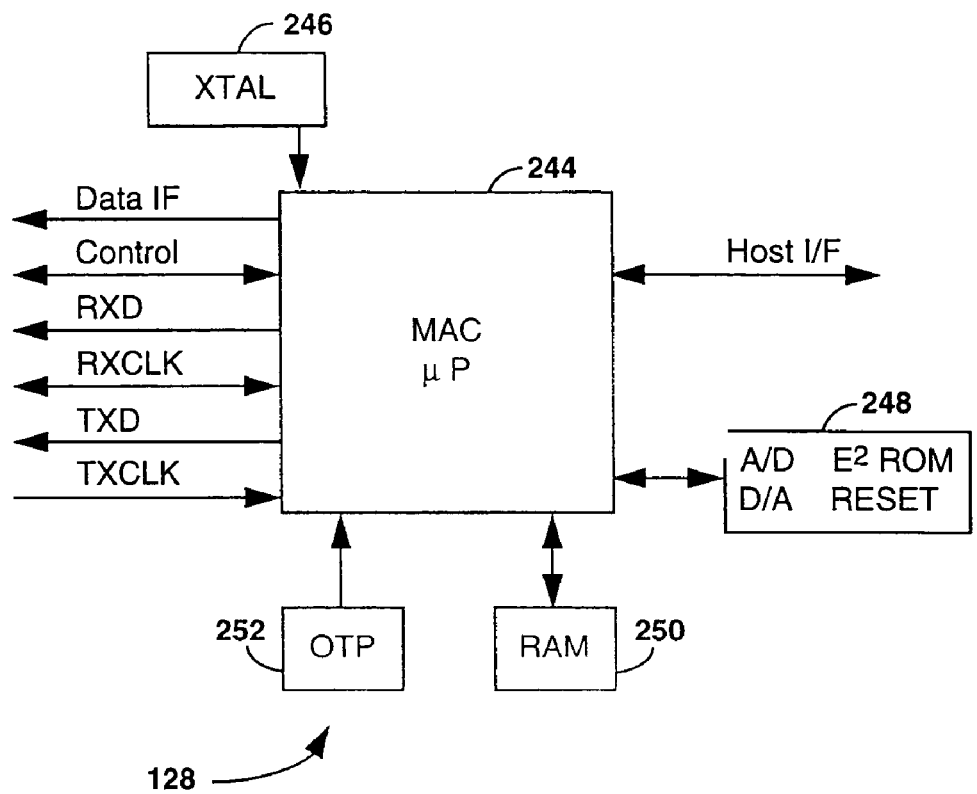
FIG. 18 is a block diagram of the MAC circuitry as shown in FIG. 10.

The transmit operation the media access control (MAC) microprocessor ("MAC μP") 128 enables the various transmit circuits through the control bus (see CONTROL of FIG. 18). In particular, however, the MAC μP 128 controls the various components illustrated in FIG. 10 as illustrated. However, in other embodiments of the present invention, the MAC μP 128 may control only a portion of the components or even more of the components. To implement the teachings of the present invention, the MAC μP 128 controls the various elements illustrated in FIG. 10 so as to perform transmission and reception in any of the various spread spectrum modes. In order to accomplish such various modes, the MAC μP 128 must control the frequency generator 116 to cause modulation over all of a spreading bandwidth via variations in the MAIN VCO frequency. In addition, the MAC μP 128 provides control to the modulator 130, RECEIVER DOWN CONVERTER 304, TX UP CONVERTER & AMP 314, the SELECTABLE BW IF 322, the MODULATOR 130, the SELECTABLE TRANSVERSAL FILTER 150, the DEMODULATOR DESPREADER 184, and the FORMATTER/SPREADER 124 in order to cause the circuitry to perform in the various spread spectrum modes.

As is known, each of the various spread spectrum modes requires packaging, modulating, transmitting, and receiving data in particular formats and frequencies. Thus, the MAC μP 128 provides control over the elements illustrated in FIG. 10 in a fashion so as to enable each of the various spread spectrum modes. Techniques known in the art may be employed to cause the components illustrated in FIG. 10 to perform in particular spread spectrum modes.

The functions of the baseband formatter/spreader 124 may be contained in a digital application-specific integrated circuit, or ASIC, (not shown) with circuitry configurable to the desired transmission mode by the control microprocessor 128. The ASIC preferably produces a clock at the correct data rate for the selected mode which is used to time serial transfer of a data frame from the transmit data output of the MAC μP 128 (see TXD of FIG. 18).

In the direct sequence (DS) modes, the data is mapped into I/Q symbols for either BPSK or QPSK modulation. The ASIC generates a synchronous chip clock at a multiple of the symbol rate that is applied to the pseudo-random number (PN) generator of FIG. 14A to produce a chipping sequence at the selected spreading ratio. The exact chipping sequence is selected by programming the feedback select of FIG. 14A. The chipping sequence is multiplied with the I/Q data symbols by use of exclusive OR gates. The selected data rate and spreading ratio determine the main lobe bandwidth of the transmitted signal. The bandwidth of the main lobe and side lobes are reduced by applying the transversal filters (146 and 148 of FIG. 14B), which comprise circuitry of the transversal filter 150 of FIG. 10 with the shift registers operating at the chipping rate rather than the symbol rate. The main lobe bandwidth is limited to approximately 1.6 times the chip clock frequency.

The remainder of the Transmitter 118 is a standard I/Q modem. The I/Q waveforms are applied to a quadrature PSK modulator operating at ½ the Auxiliary VCO frequency. The modulated signal is filtered to reduce harmonic content, then undergoes a second conversion with the Main VCO output 196 to produce a final output frequency. This signal is filtered to reduce the image of the mix product from this second conversion, and then amplified by the antenna 112 through the antenna switch 302 and RF bandpass filter 300.

In the receive mode, the receiver circuitry 114 is switched on and the transmitter circuitry switched off through the control interface. Incoming signals present at the antenna are amplified and converted to the IF frequency by mixing with the main VCO output 196. The output of the receiver down converter 304 is applied to the selectable bandwidth IF filter 322, which is programmed to the correct bandwidth for the selected mode of operation by the MAC μP 128. The filters 174, 176 and 178 provide rejection of out of band signals for the selected signal bandwidth.

The filtered output is applied to a limiting amplifier, then to the I/Q baseband converter 312. The limiter 182 produces a received signal strength indication that is proportional to log of the signal energy in the IF. This is applied to an A/D converter 126 then to the control μP 128. This function is useful for detecting proximity to the transmitting unit, or to an interferor, and is also useful as an OOK detector.

The baseband converter 312 contains an internal divide-by-two circuit which produces a carrier at ½ the Auxiliary VCO frequency which is also at the nominal IF frequency. This is mixed with the limited IF signal to produce baseband I/Q waveforms. These in turn are applied to comparators that serve as hard decision circuits, then to the correlator 330 (see FIG. 17) within the ASIC.

The frequency generation system 116 must be programmed to produce the Main VCO output. A serial interface within the control bus provides this capability. In the DS modes the Main VCO is programmed to the correct channel frequency and remains there until a mode change or the need to avoid interference is detected. For wideband DS operation, The Main VCO is programmed to the center of the frequency range.

For FH or hybrid operation, i.e., frequency hopping combined with direct sequence operation, the Main VCO is periodically reprogrammed to provide the hopping function. The MAC µP 128 maintains a timer, and table of channels representing the hop sequence. When the timer expires, the MAC µP initiates the hop to the next frequency in the sequence. Frames passed between the various devices within the WLAN establish shared timing references so that all units hop in synchronism.

The MAC µP 128 provides mode control, host interface, transmit frame generation, channel access control, receive frame processing, retries of erred packets, power management of radio circuitry, and frequency hopping control. The frequency hopping control is a superset of the remaining functions, allowing common programming of the remaining functions for both DS and FH.

The host interface for the PCMCIA version is compliant with the PCMCIA physical interface. The software interface is structured to comply with the factory industry standards NDIS and ODI formats.

Data to be transmitted is sent via a bus 131 to the MAC circuitry 128 from a host unit. The data to be transmitted is be modulated by the modulator 130 and frequency controlled by the spreader 124 according to the particular spread spectrum transmission mode to be utilized. The spreader 124 receives a chipping clock input that is at a frequency multiple of the source data frequency. The output of the spreader 124 is sent to the transmitter up converter and amplifier 314 to transmit the RF data signal through the antenna 112.

The radio modules of the present invention may utilize several modes of spread spectrum RF data transmission. In one embodiment of the present invention, the various modes can be user selectable depending upon the particular application in which the radio modules are to be utilized. In another embodiment, the modes of operation are be automatically and dynamically selected, e.g., by the MAC µP 128 based upon criteria previously described. Such selection might also be performed by or with the assistance of the terminal unit or a digital signal processor provided for such task.

In a particular example, a microprocessor in the host terminal may retrieve stored modes of operation utilized on the previous day to which a higher logical multiplier is used to determine which transmission mode or modes are to be selected for that day's data transmissions. Additionally, data such as the average signal strength, most frequently utilizes transmission mode, the average level of interference and noise for a particular mode or transmission success rate (e.g. percentages of transmissions) may be saved in nonvolatile memory and factored into the mode selection routine.

A description of particular spread spectrum modes follows in Table 1. The modulation techniques as described in Table 1 may be direct sequencing (DS), frequency hopping (FH) or on-off-keying (OOK) or a combination thereof. The rate at which data may be transmitted is given is kilobits per second (kb/s) and the channel bandwidth is given for each mode for the operation frequency range of 902 to 928 MHz. The full bandwidth of an embodiment of the radio is 26 MHz Table 1.

TABLE 1

Spread Spectrum Transmission Modes

| MODE | MODULATION TECHNIQUE | DATA RATE | BANDWIDTH |
|---|---|---|---|
| 1 | DS | 250 kb/s | full band |
| 2 | CHANNELIZED DS | 250 kb/s | 5 channel 5 MHz |
| 3 | DS | 500 kb/s | full band |
| 4 | FH | 250 kb/s | 50 channels 500 kHz |
| 5 | FH/DS | 10 kb/s | 50 channels 500 kHz |
| 6 | OOK | 19.2 kb/s | 50 channels 500 kHz |
| 7 | DS | 10 kb/s | 50 channels 500 kHz |

The various spread spectrum modes are utilized to obtain optimum performance for particular modes of operation of the data terminal. The radio of the present invention preferably has a transmission range of up to 300 feet for closely spaced interior surfaces and up to 1300 feet in open spaces resulting in an operational coverage area from 280,000 to 5,300,000 square feet.

Utilization of the various transmissions modes results in variable immunity of the data signals from RF interference. The data terminal in which the radio is utilized thereby has the ability to extract the best system performance in every application regardless of multipath signal levels, interference levels and the sources thereof. The data terminal also thereby has the ability to dynamically trade data rate in return for coverage range (coverage range being a function of process gain) without the need to change radio hardware. Although not shown, capable of operating in the 2.4 GHz circuitry of FIG. 10 or other frequency ranges. Multiple intermediate frequency filter topology may be implemented to achieve interference rejection via varying filter selectivity.

MODES 1 and 3 are full band direct sequence and provide no inband interference protection other than high process gains of 18.7 dB and 15.7 dB respectively. Out-of-band protection from cellular transmissions operating in the vicinity is provided. MODE 1 provides good coverage area and rejection of multipath signal. MODE 3 provides shorter coverage are in return for a high speed data rate.

MODE 2 is a channelized direct sequence mode having a process gain of 17 dB. A single direct sequence cordless telephone operating in the vicinity will not degrade performance on at least four of the channels. MODE 2 provides a reasonable coverage area and jammer avoidance with channelization.

MODE 4 utilizes full band frequency hopping having a process gain of 17.1 dB. A single direct sequence cordless telephone will not degrade average throughput by more than 10 percent. MODE 4 provides moderate coverage area and high system capacity with dynamic jammer immunity with frequency hoping.

MODE 5 is a direct sequence mode which is frequency hopped having a process gain of 37 dB. A single direct sequence cordless telephone operating in the vicinity will not degrade average throughput by more than 10 percent. MODE 5 provides a long and high coverage area and dynamic jammer immunity with frequency hopping in return for a low data rate.

MODE 6 is an on-off-keying (OOK) modulation mode having a process gain of 0 dB. MODE 6 may be utilized as a low speed, low power link to a nearby scanner or printer for example.

MODE 6 the transceiver module is intended to communicator with peripheral devices containing simple AM transceivers. The Main VCO is set to the center frequency of the peripheral AM receiver. For OOK transmission, the data formatter is configured to produce a CW output signal. OOK signaling is providing by strobing the enable line on the transmitter, shown in FIG. 16.

For OOK reception, the Main VCO is set to receive at the AM transmitter center frequency. The RSSI output from the limiting amplifier is used for AM detection. The signaling rate is limited by the speed at which the A/D can quantize the RSSI (preferably sampling several times per symbol), and at which the MAC μP128 can process the sampled data to extract the modulation.

MODE 7 is a channelized direct sequence mode having a process gain of 20 dB. A single cordless telephone operating in the vicinity will not degrade performance on more than nine of the channels.

Other modes may also be included other than those listed above. Other possibly included modes may be variations or new combinations of the above modes or modes utilizing different modulation techniques and frequencies such as other standard RF transmission techniques which may be contemplated by the present invention. For example, an additional mode in an alternative embodiment may include voice communications transmissions utilizing standard audio modulation techniques achieved by switching channels or transmissions modes. Using voice communications the transceiver module may allow data terminal operators of a multilevel radio-frequency communications network to verbally communicate with one another or their supervisors throughout the entire network. Voice and data communications may be utilized with a single portable battery powered electronic device rather than having a data terminal for data communications and a separate mobile radio for voice communications, for example. Similarly, the process gains, sampling rates, etc., are exemplary value which may be modified as proves desirable.

Figure 11:
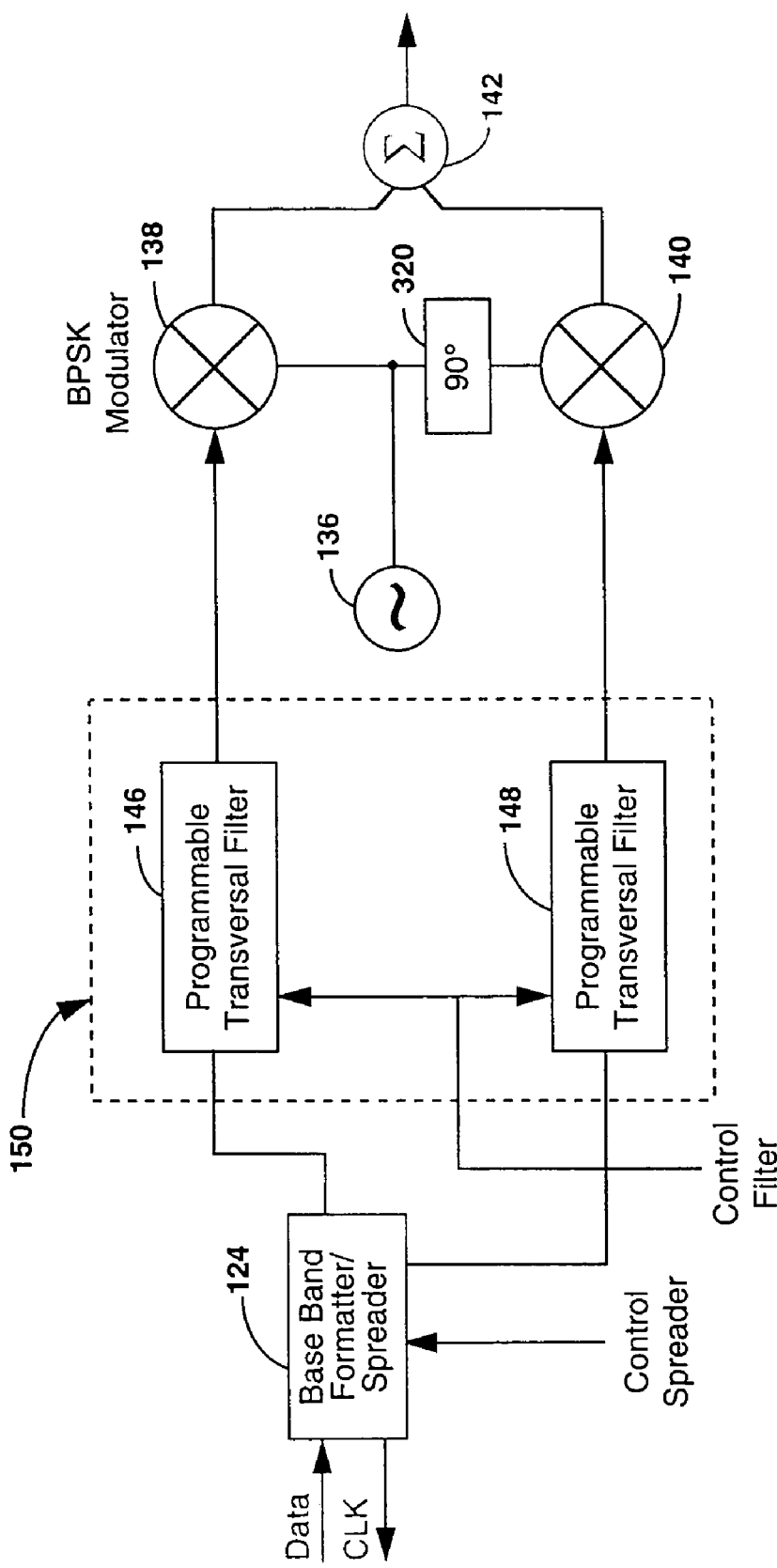
FIG. 11 is a conceptual block diagram of the operation of the transmitter of FIG. 10 when operating in a direct sequence spread spectrum transmission mode.

FIG. 11 is a conceptual block diagram of the operation of the transmitter of FIG. 10 when operating in a direct sequence spread spectrum transmission mode. As illustrated, in the operation, data is received by the BASE BAND FORMATTER/SPREADER which, based upon the CONTROL SPREADER signal received from the MAC μP 128, spreads the code based upon a particular code spreading sequence or pattern. The BASE BAND FORMATTER/SPREADER provides data on two output paths so that the data may be modulated according to the BPSK modulation scheme. The spread code is then processed by a programmable transversal filter 150 having two separate filters, 146 and 148, one for each data path. Once filtered, the data is modulated by the components 136, 138, 140, 320, and 142 of the BPSK modulator. From the BPSK modulator, the data proceeds until it is transmitted.

Figure 12:
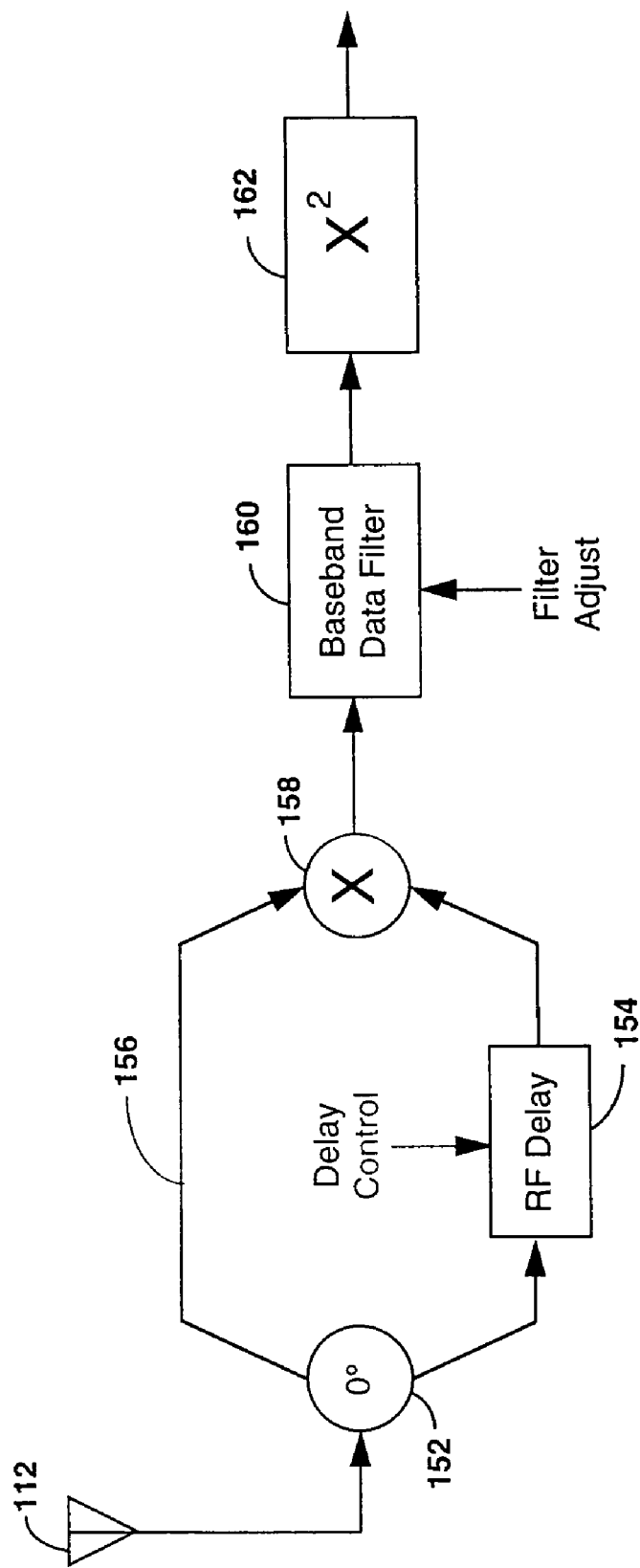
FIG. 12 shows a conceptual diagram of the operation of the receiver utilized in conjunction with the transmitter of FIG. 11.

FIG. 12 shows a conceptual diagram of the operation of the receiver utilized in conjunction with the transmitter of FIG. 11. In the embodiment, data received by the antenna 112 passes through a zero-degree phase shift block 152. From the block, one path goes directly to one input of a multiplier 158 while the second path passes through an RF DELAY block 154 and then passes to a second input of the multiplier 158. DELAY CONTROL is supplied to the RF DELAY block 154 by the MAC μP 128 dependent upon the frequency of the received signal to cause a desired phase shift. From the multiplier 158 the signal passes through a baseband data filter 160 then through $X^2$ block 162 prior to its furthered processing.

Figure 13:
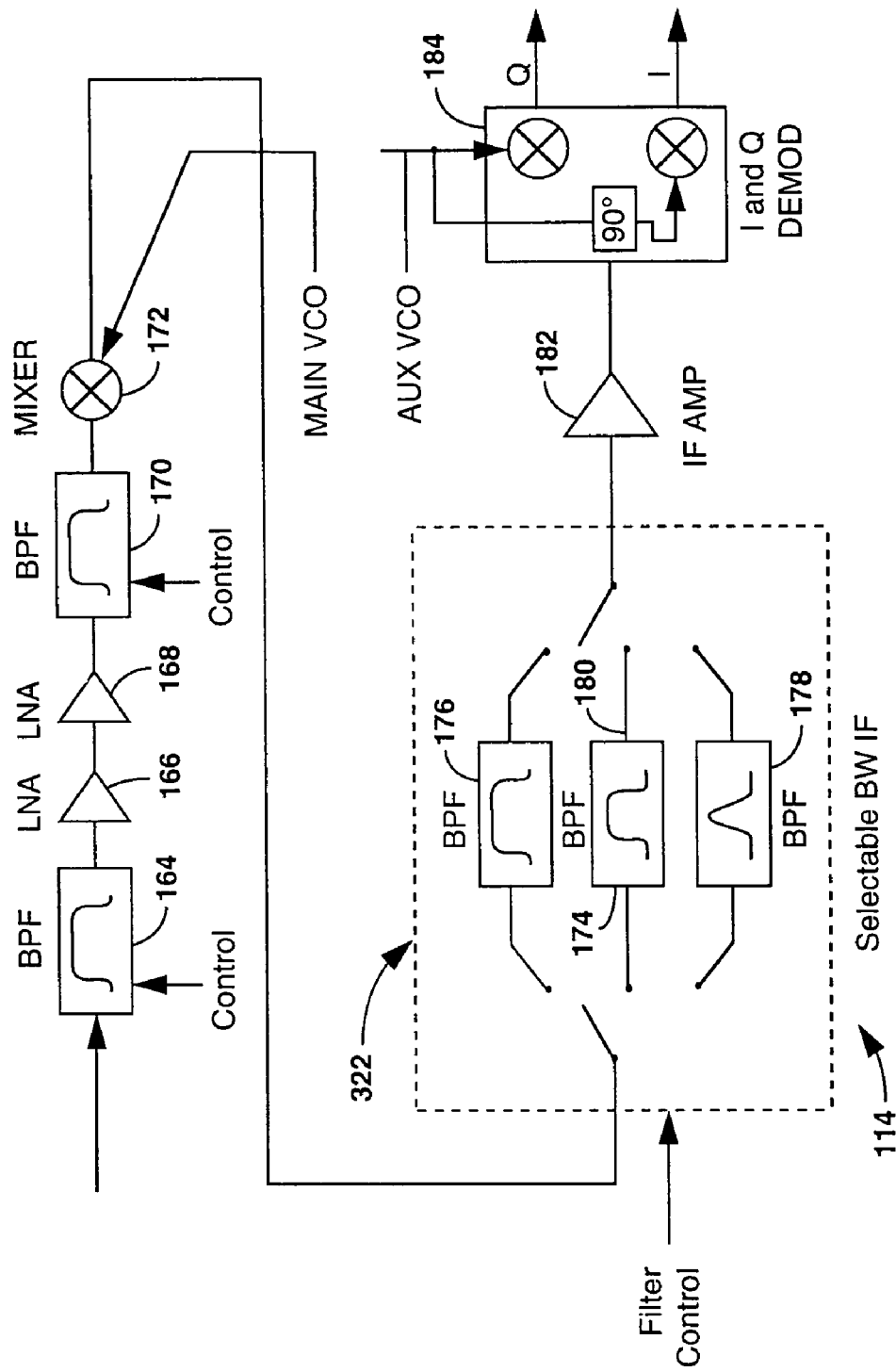
FIG. 13 is a block diagram of an embodiment of a receiver of the present invention.

FIG. 13 is a block diagram of the receiver 114 of the present invention. The receiver 114 may be located on the radio card CCA 44 of FIGS. 7, 8 and 9. Wideband filter 170 provides additional interference protection in the narrow band modes. A preselector filter 164 receives an RF data transmission signal from the antenna 112 (not shown). The preselector filter 164 may be a two pole bandpass filter (BPF) designed to have a wide bandwidth to keep the insertion loss low. In an exemplary embodiment filter 164 has a center frequency of 915 MHz, a bandwidth of 26 MHz and an insertion loss of 3.5 dB. However, the filter 164 could be controllable as well based upon desired filtering characteristics.

The output of the preselector filter 164 is fed into two low noise RF amplifiers (LNA) 166 and 168 each of which preferably has a gain of 10 and a noise figure of 2.2 dB. The gain of the RF amplifies 166 and 168 is sufficient to overcome any noise which may be present on the input RF data signal. The amplified signal may be sent to a bandpass filter (BPF) 170 for additional preselection filtering. Bandpass filter 170 is preferably designed to have four poles to provide high stop band rejection of possible signal images present in the data signal, having design values of 915 MHz center frequency, bandwidth of 26 MHz and an insertion loss of 3.5 dB. Bandpass filter 170 could also be controlled to provide desired filtering characteristics.

The output of filter 170 is sent to the input of a mixer ("MIXER") 170 which mixes the data signal with the output 332 from the main voltage controlled oscillator of the frequency generator circuitry 116 of FIG. 10 which preferably has an output frequency of 844 MHz. The output of the mixer 172 is passed through an additional bandpass filter 174 having a center frequency of 71 MHz, a 26 MHz bandwidth and insertion loss of 2.0.

The data signal is passed through an intermediate frequency selectable bandwidth filter 322 comprising filters 174, 176 and 178 for signal path 180, which varies the filtering of the data signal according to the various modes of operation. Bandpass filter 176 is utilized for MODE 2 operation and has a bandwidth of 5 MHz and an insertion loss of 8 dB. MODES 1 and 3 utilize a direct signal path 180 with an overall bandwidth of 26 MHz from the output of filter 174. MODES 4, 5, 6 and 7 utilize bandpass filter 178 which has a bandwidth of 500 kHz and an insertion loss of 8 dB. Multiple intermediate frequency filter topologies may be implemented to achieve interference rejection via varying filter selectivity.

The data signal is fed into an intermediate frequency amplifier (IF) 182 to overcome the losses from the filters. The IF amplifier 182 is a high gain amplifier having a gain and a noise factor of 7 dB. The output of the IF amplifier 182 drives the demodulator 181 which also receives the output from the auxiliary voltage controlled oscillator of the frequency generator circuitry 116 of FIG. 10 which may operate at a frequency of 142 MHz. The demodulator 184 may have data signal products I and Q which are fed into the inputs of the despreader circuitry 120 of FIG. 10. The receiver 114 may have a noise figure of less than 7 dB, an image rejection figure of 60 dB and adjacent channel rejection of 40 dB.

Figure 14A:
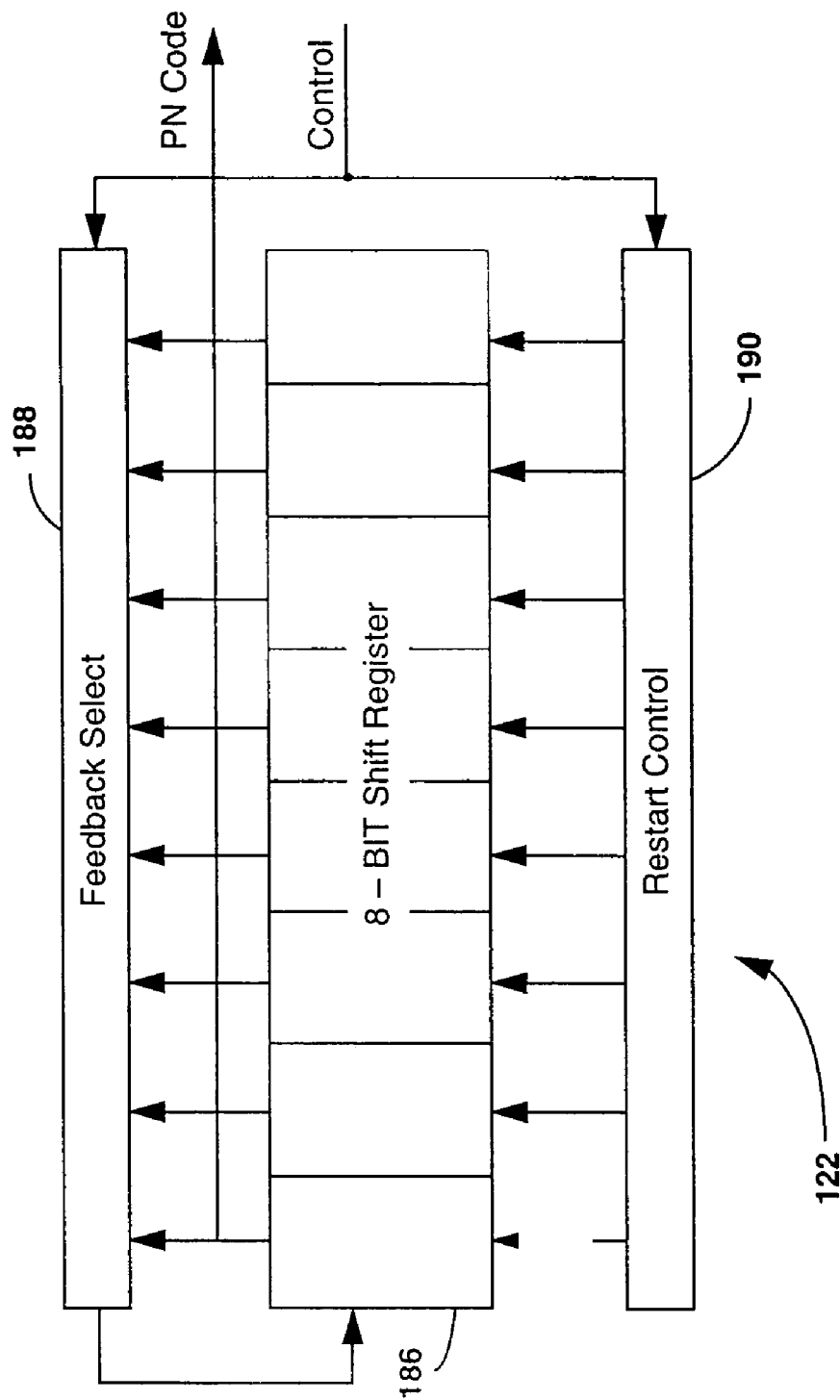
FIG. 14A is a diagram of the pseudo-random number generator shown in FIG. 10.
Figure 14B:
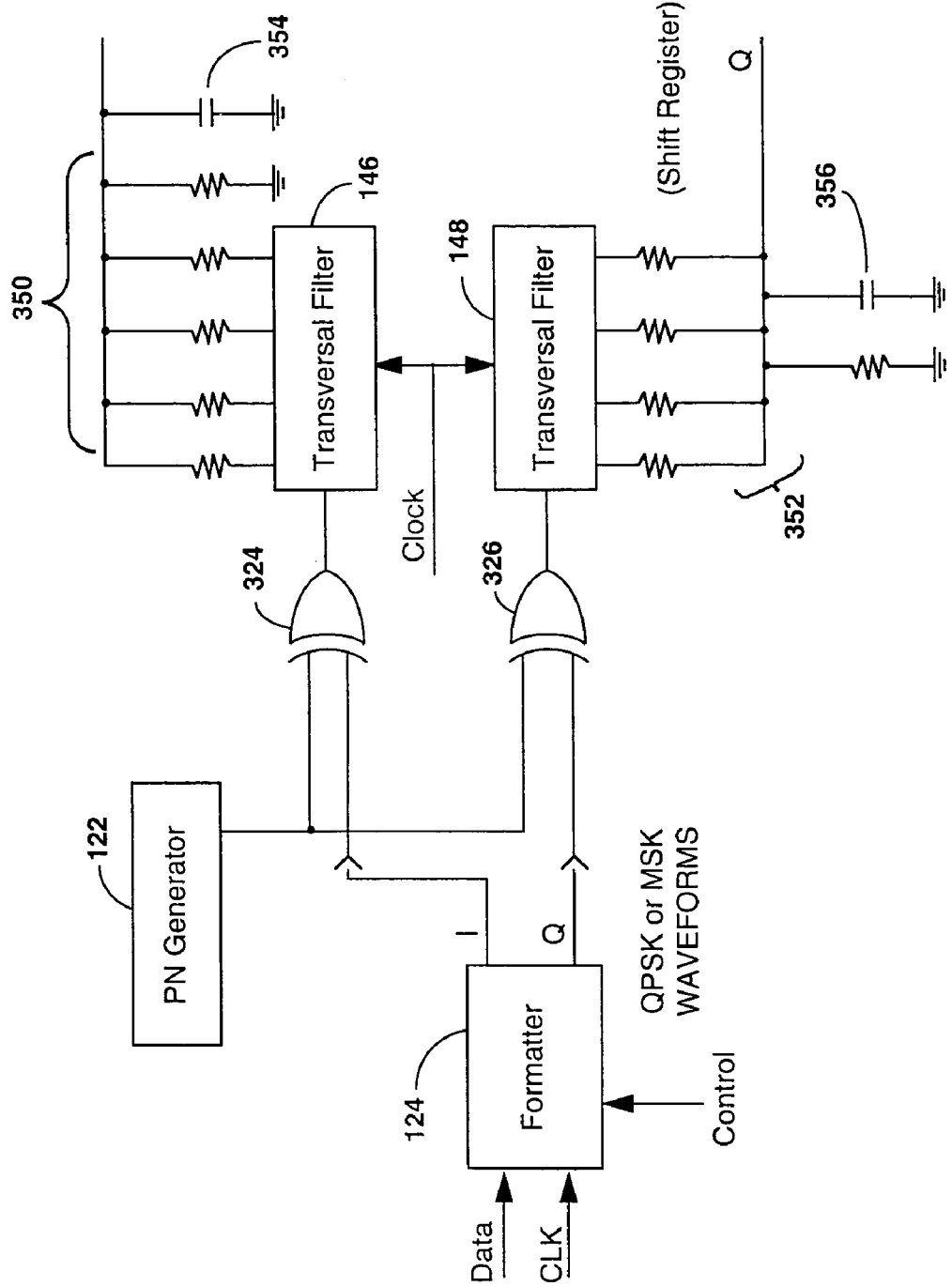
FIG. 14B is a schematic block diagram illustrating the interaction of the pseudo-random number generator of FIG. 14A with traverse filtering and formatter circuitry of FIG. 10.

FIGS. 14A and 14B are diagrams illustrating the operation of the pseudo-random number generator circuitry ("PN GENERATOR") 122 of the traverse filter 150 of FIG. 10. The pseudo-random number generator circuitry 122 is preferably located on the radio interface card 58 of FIGS. 7, 8 and 9. The pseudo-random number generator 122 produces a pseudorandom binary output which is mixed with the data signal code in order to minimize the rate distortion for a given number of bits used to represent the data signal. The PN generator 122 may be comprising an 8-bit shift register ("8-BIT SHIFT REGISTER") 186 utilizing a feed back selector control ("FEEDBACK SELECT") 188 which provides programmable feedback. A restart control device ("RESTART CONTROL") 190 may be utilized to provide a programmable restart interval and a programmable restart vector. The PN generator 122 is preferably controlled by a control input ("CONTROL") from the MAC circuitry 128 of FIG. 10 and produces a PN code output signal ("PN CODE").

In the frequency hop (FH) mode, data is converted to an I/Q format for minimum shift keying (MSK) modulation. Narrowband modulation is preferably employed so the spreader function may disabled. The power spectral density of MSK modulation exhibits a main lobe bandwidth of approximately 1.5 times the symbol rate, but also contains substantial energy in the side lobes. This energy might create interference to other in-band or out of band systems and may also degrade operation if several frequency hopping sequences are used for increased throughput or multiple access. To reduce side lobe energy, transversal filtering is employed in the I/Q modulation paths. These consist of shift registers clocked at the symbol rate or a multiple thereof. The digital outputs from the shift registers are summed using a weighted resistor ladder (350 and 352) is external to the ASIC and constitutes the interface between digital and analog processing.

In the direct sequence (DS) modes, the data is mapped into I/Q symbols for either BPSK or QPSK modulation. The ASIC generates a synchronous chip clock at a multiple of the symbol rate that is applied to the pseudo-random number generator 122 to produce a chipping sequence at the selected spreading ratio. The exact chipping sequence is selected by programming the feedback select 188. The chipping sequence is multiplied with the I/Q data symbols by use of exclusive OR gates (324 and 326). The selected data rate and spreading ration determine the main lobe bandwidth of the transmitted signal. The bandwidths of the main lobe and side lobes are reduced by applying the transversal filters (146 and 148) with the shift registers operating at the chipping rate rather than the symbol rate. The main lobe bandwidth is preferably limited to approximately 1.6 times the chip clock frequency.

Figure 15:
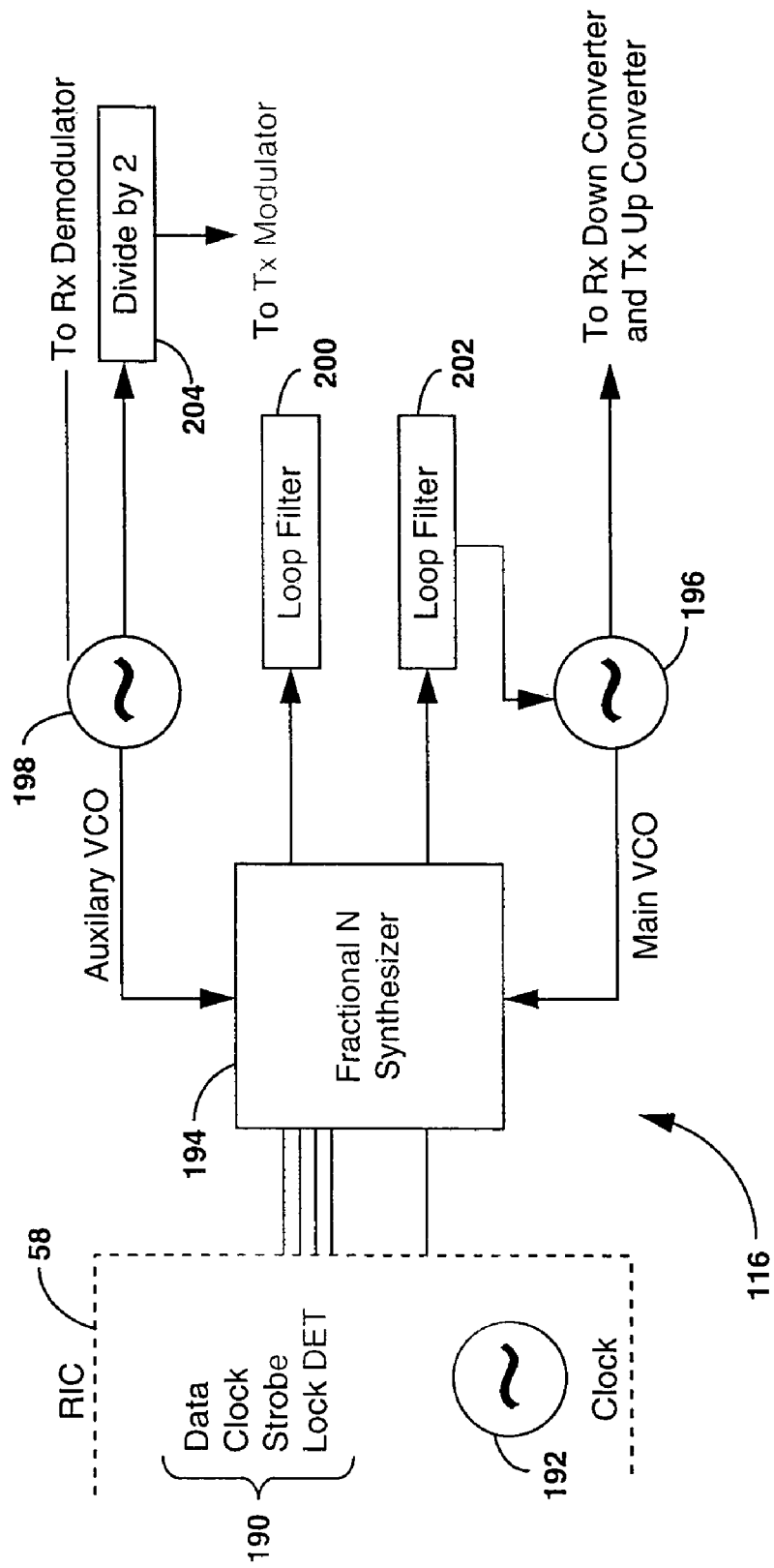
FIG. 15 is a block diagram illustrating the frequency generator circuitry as shown in FIG. 10.

FIG. 15 is a block diagram illustrating the frequency generator circuitry 116 of FIG. 10. The frequency generators 116 are preferably located on the radio card CCA 44 of FIGS. 7, 8 and 9. The radio interface card 58 of FIGS. 7, 8 and 9 may provide data signals ("DATA", "CLOCK", "STROBE" and "LOCK DET") 190 and a clock signal ("CLOCK") 192 which is preferably a 30 MHz clock to the fractional number frequency agile synthesizer ("FRACTIONAL N SYNTHESIZER") 194. The 30 MHz clock signal may be divided to produce frequencies of which 30 MHz is a multiple. The synthesizer 194 may also receive frequency input signals from a main voltage-control oscillator (MAIN VCO) 196 and from an auxiliary-voltage controlled oscillator (AUXILARY VCO) 198. The synthesizer 194 preferably switches between transmission and receiving modes in 200 :s or less.

The main VCO 196 preferably operates at a nominal frequency of 844 MHz while the auxiliary VCO 198 preferably operates at a nominal frequency of 142 MHz. The synthesizer 194 has loop filter feedback paths 200 and 202 to oscillators 198 and 196 respectively for control of the frequency of the outputs of the oscillators 196 and 198. The main VCO 196 supplies a signal to the down converter mixer 172 of the receiver 114 of FIG. 13 and provide a signal to the modulator 206 of the transmitter 118 of FIG. 11 after being fed through a divide by 2 circuit ("DIVIDE BY 2") 204.

Figure 16:
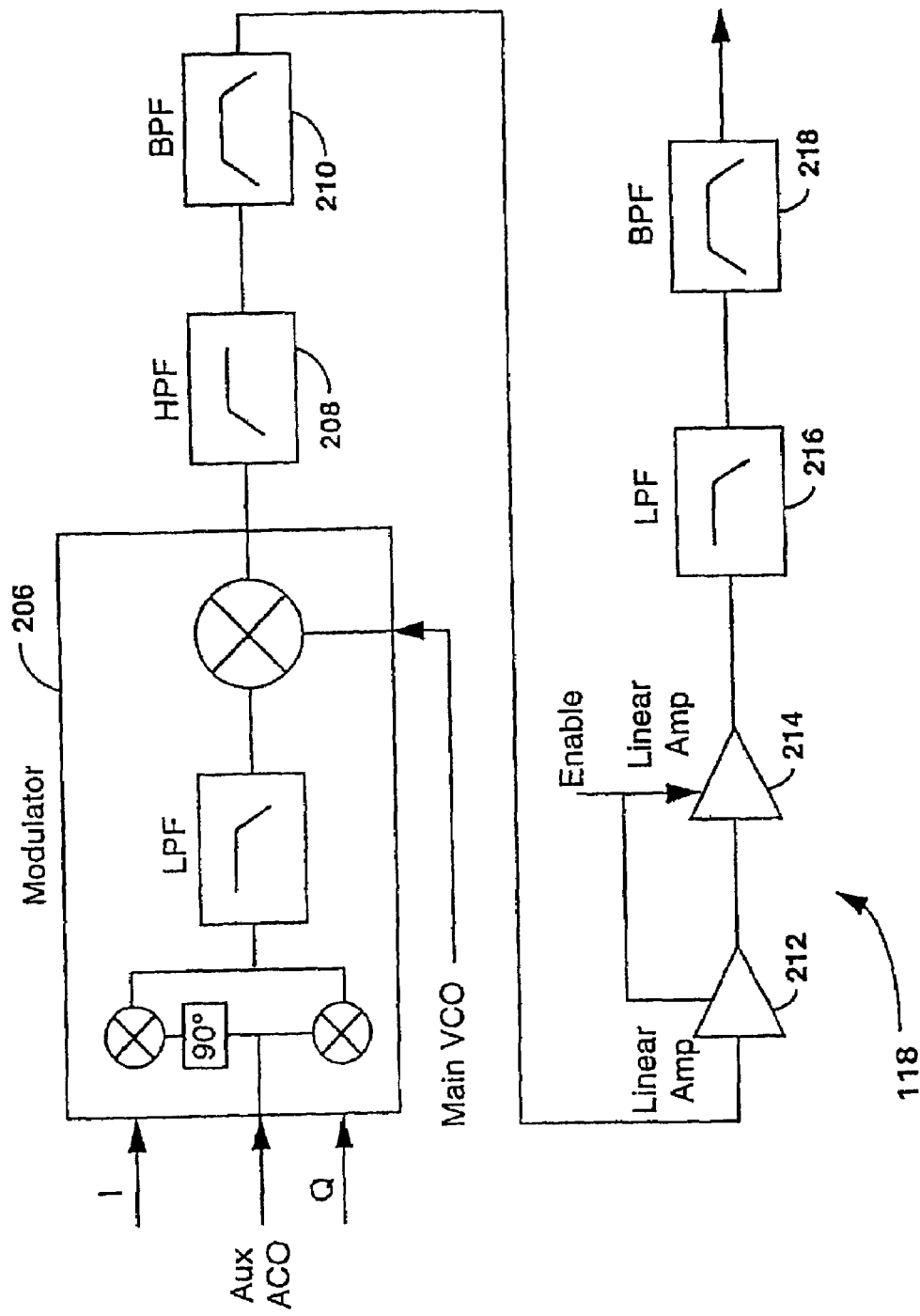
FIG. 16 is a block diagram illustrating the transmitter circuitry as shown in FIG. 10.

FIG. 16 is block diagram illustrating the functionality of the transmitter circuitry 118 of FIG. 10. The transmitter 118 is located on the radio card CCA 44 of FIGS. 7, 8 and 9. The transmitter 118 receives data signal input products I and Q from the modulator and spreader circuitry 124 and 130 of FIG. 10. The transmitter input data signal I and Q are mixed with the output of the auxiliary VCO 198 of FIG. 15 which are then combined and mixed with output of the main VCO 196 of FIG. 15 using an up converter mixer in the transmitter modulator 206.

The output of the transmitter modulator 206 is preferably fed into a high pass filter (HPF) 208 having the data signal below the nominal carrier frequency of 900 MHz for single side band (SSB) transmission. The output of the high pass filter (BPF) 210 which preferably has a counter frequency of 915 MHz and a band width of 26 MHz. The output of bandpass filter 219 is fed into two amplifier (AMP) 214 preferably having a gain of 20 and a second amplifier (AMP) 214 preferably having a gain 30 to provide the necessary transmission output power. The power of the data signal at the output of amplifier 214 is nominally at least 1 watt which is fed through a lowpass filter (LPF) 216 and a bandpass filter (BPF) 218. Because of the insertion losses of the filters 216 and 218 of 0.7 dB and 3.3 dB respectively, the transmitter 118 has a nominal output power of at least 250 mW which is transmitted via antenna 112 of FIG. 10.

Figure 17:
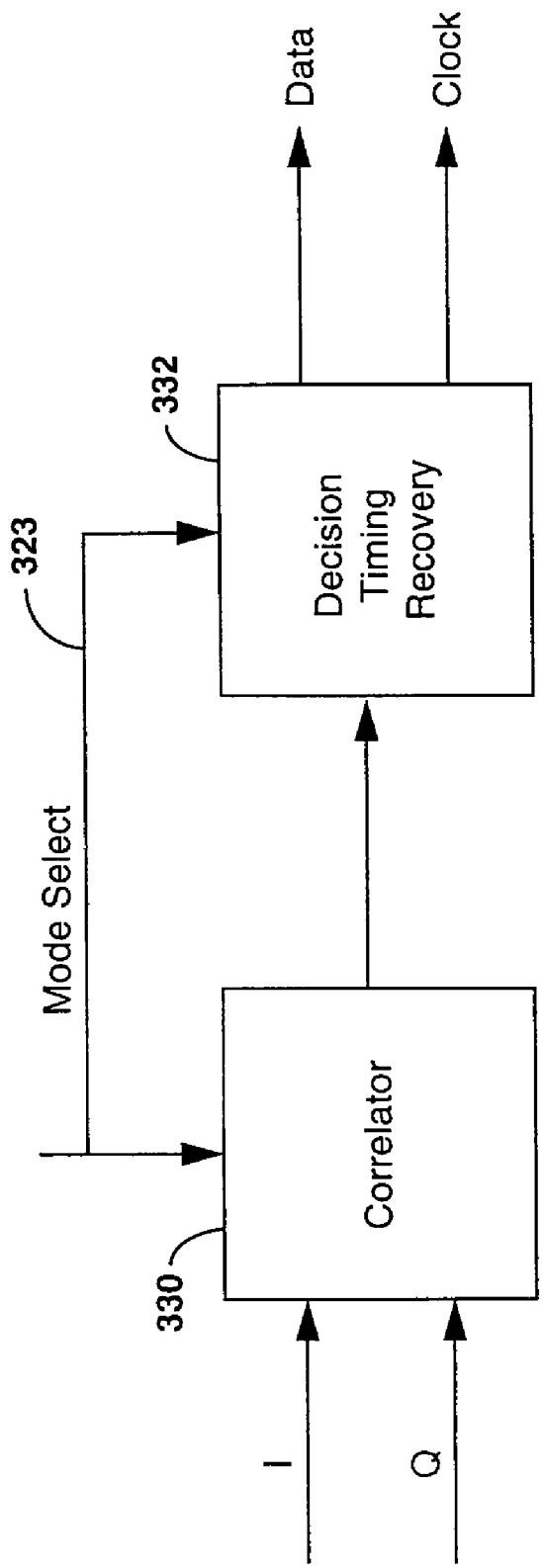
FIG. 17 illustrates the circuitry for selecting between the modes of modulation of the present invention.

FIG. 17 illustrates the circuitry for selecting between the modes of modulation of the present invention. In frequency hopping mode the correlator ("CORRELATOR") 330 us bypassed and the decision and timing recovery block ("DECISION TIMING RECOVERY") 332 performs MSK detection. An alternative approach would be to use an FM discriminator, a function that is commonly available in limiting amplifier IC's. This is possible because MSK signal are known to be capable of demodulation as either FM or PSK signals.

In DS modes the correlator 330 preferably extracts the data symbols from the chipping sequence. The decision and timing recovery block 332 outputs send the recovered data ("DATA") and a clock signal ("CLOCK") to the MAC μP 128 for frame processing.

FIG. 18 is a block diagram of the MAC circuitry 128 of FIG. 10. The MAC circuitry 128 is preferably located on the radio interface card 58 of FIGS. 7, 8 and 9. The medium access control circuitry 128 may be utilized in the protocol of communications media used in a particular communications network. The media access circuitry 128 may also utilize the 2.4 GHz MAC protocols to provide operation on both 900 MHz and 2.4 GHz networks.

The media access protocol may be controlled by a MAC microprocessor ("MAC μP") 224 which receives a timing control signal from a crystal oscillator ("XTAL") 246. The MAC microprocessor 224 may communicate with the electronic device in which the radio of the present invention is to be utilized via a host communications bus ("HOST"). The MAC microprocessor 224 may further have input and output signals 248 from an analog-to-digital converter ("A/D"), digital-to-analog converter ("D/A"), an electrically erasable read only memory (E²ROM") or a reset control circuit ("RESET") for example. The MAC microprocessor 224 may utilize random access memory ("RAM") 250 which may be either volatile or nonvolatile memory. The MAC microprocessor 244 may also receive an input from OTP 252. A control bus ("CONTROL") is utilized to control the circuitry of the radio card 44 of FIGS. 7, 8 and 9.

The MAC microprocessor 244 may have registers to read the status of and control the functions of the radio interface card 58. Registers may also be provided to control the transmission power state of the radio of the present invention. The MAC microprocessor 244 may provide a parallel-to serial converter for control and programming of the synthesizer 194 of FIG. 15. Additionally, the MAC microprocessor 224 may provide a programmable periodic timer, clock control of the CPU of the data terminal 10 and PCMCIA programmable clock generation.

Figure 19:
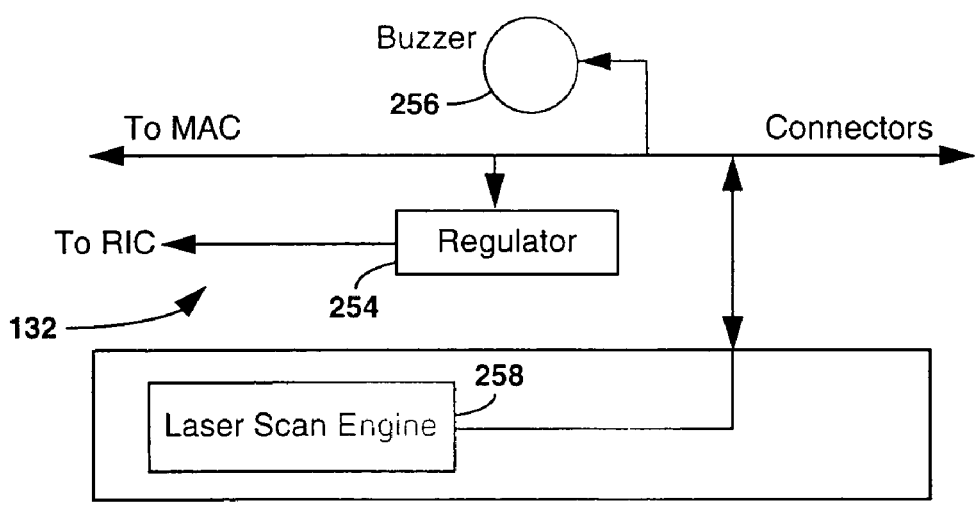
FIG. 19 is a block diagram illustrating the host interface circuitry as shown in FIG. 10 for the radio module of FIG. 7 and for the radio/scanner module of FIG. 8.

FIG. 19 is a block diagram illustrating the host interface circuitry 132 of FIG. 10 for radio module 30 of FIG. 7 and for radio/scanner module 20 of FIG. 8. The host interface circuitry 132 is preferably located on the radio interface card 58 of FIGS. 7 and 8. A regulator ("REGULATOR") 254 functions as the power supply 134 of FIG. 10 and provides a regulated voltage signal to the radio interface card 58 which is connected to the MAC circuitry 128 via a host to MAC communications bus ("TO MAC") which connects to the electronic device in which the radio of the present invention is utilized through connectors ("CONNECTORS") 60 on the radio interface card 58 of FIGS. 7 and 8. Further connection is made to a buzzer ("BUZZER") circuit 256 which may be the buzzer 64 of FIGS. 7 and 8. A bus connection to the radio/scanner module 20 of FIG. 8 is provided for control of the scanner 258 which may be a laser scan engine ("LASER SCAN ENGINE").

Figure 20:
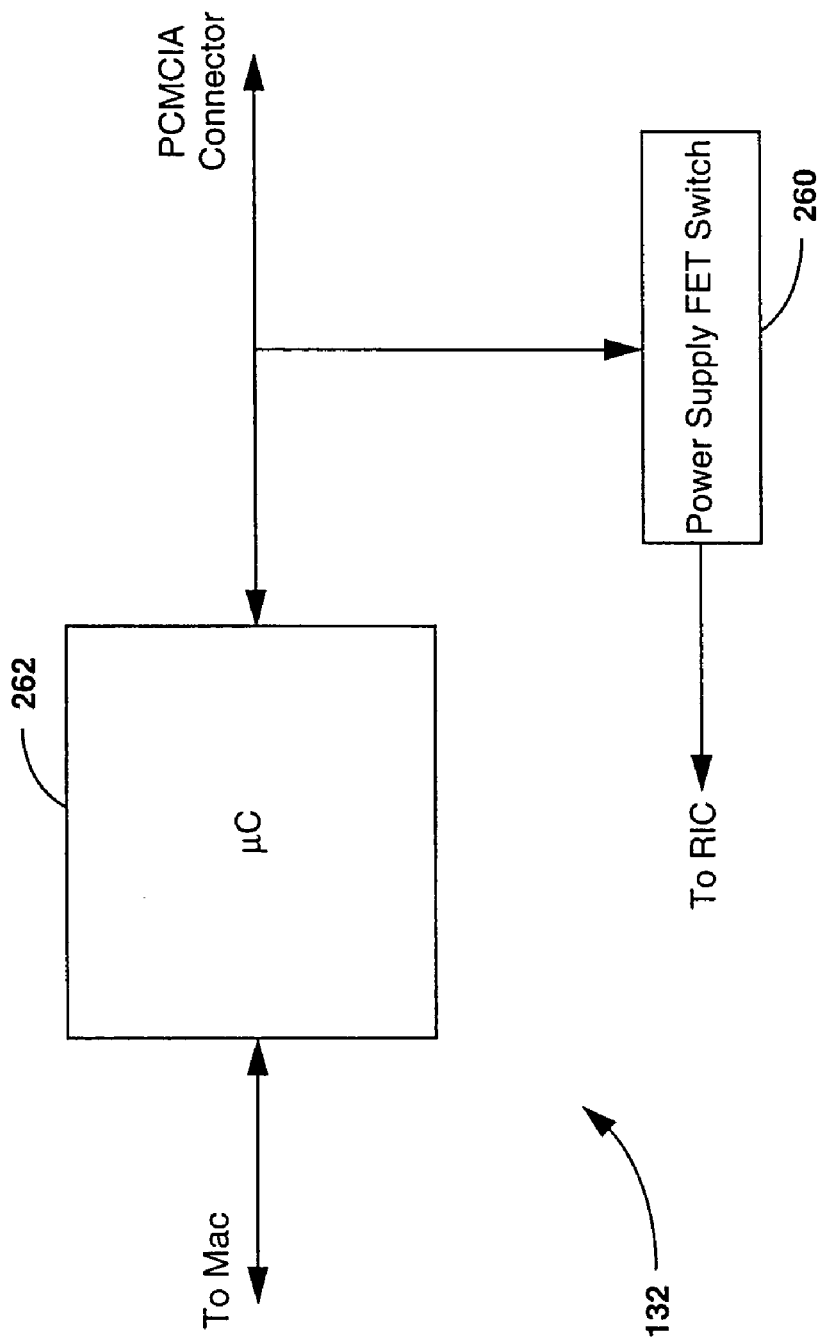
FIG. 20 is a block diagram illustrating the host interface circuitry as shown in FIG. 10 for the radio module of FIG. 9.

FIG. 20 is a block diagram illustrating the host interface circuitry 132 of FIG. 10 for PCMCIA radio module 42 of FIG. 9. The PCMCIA radio module host interface circuitry 132 is preferably located on the radio interface card 58 of FIG. 9. A FET switched power supply ("POWER SUPPLY FET SWITCH") 260 functions as the power supply 134 of FIG. 10 and provides a supply voltage output ("TO RIC") to the radio interface card 58 of FIG. 9. A microcontroller ("μC") 262 provides interfacing signals ("TO MAC and PCMCIA CONNECTOR") between the MAC circuitry 128 of FIG. 2B and the electronic device in which the radio of the present invention is to be utilized through PCMCIA connectors 102 of FIG. 9.

Figure 21:
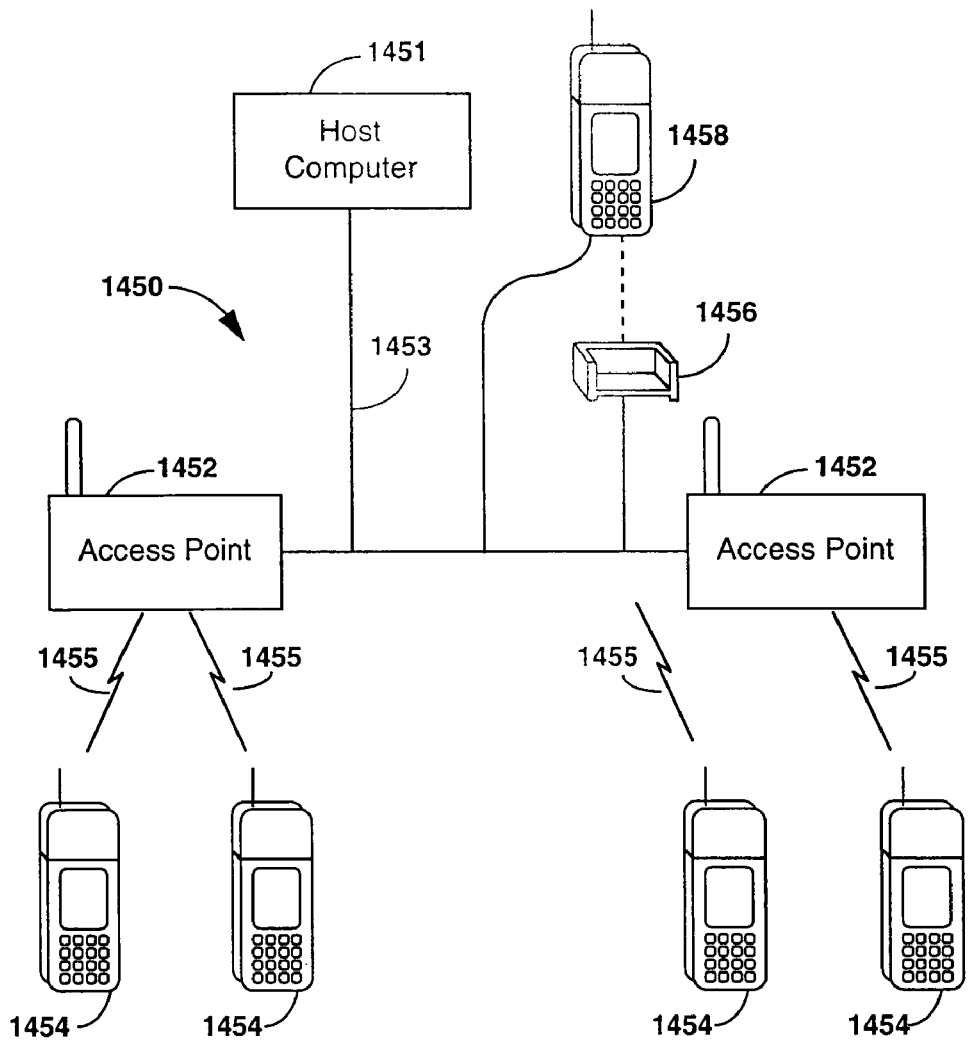
FIG. 21 is a diagram illustrating an alternate configuration of portable data terminals according to the present invention.

FIG. 21 is a diagram illustrating an alternate configuration of portable data terminals according to the present invention. Specifically, a communication network 1450 provides an overall network environment for portable data collection terminals 1454. A host computer 1451 is connected to access points 1452 via a wired connection 1453. The access points 1452 are in turn communicatively coupled to portable data collection terminals 1454 via wireless links 1455. The wireless links 1455 may be one or more of a plurality of wireless communications technologies, including narrowband radio frequency, spread spectrum radio frequency, infrared, and others.

A dock 1456 and a portable data terminal 1458 according to the present invention may be connected to the wired backbone 1453, and may serve a function similar to an access point 1452. The dock 1456 may provide power to the terminal 1458, or alternatively the dock may be absent and the terminal 1458 may run for a limited time under the power of its battery. The terminal 1458 connects directly to the wired backbone 1453, and also communicates with another terminal 1454 through a wireless link 1455. The terminal 1458 may, for example, be equipped with protocol converter circuitry to convert communication on the wire backbone 1453 into wireless communication on the link 1455, and also to convert wireless communication on the link 1455 to a format for communication on the wire backbone 1453. The communication module associated with terminal 1458 thus improves the versatility of the terminal 1458.

Figure 22A:
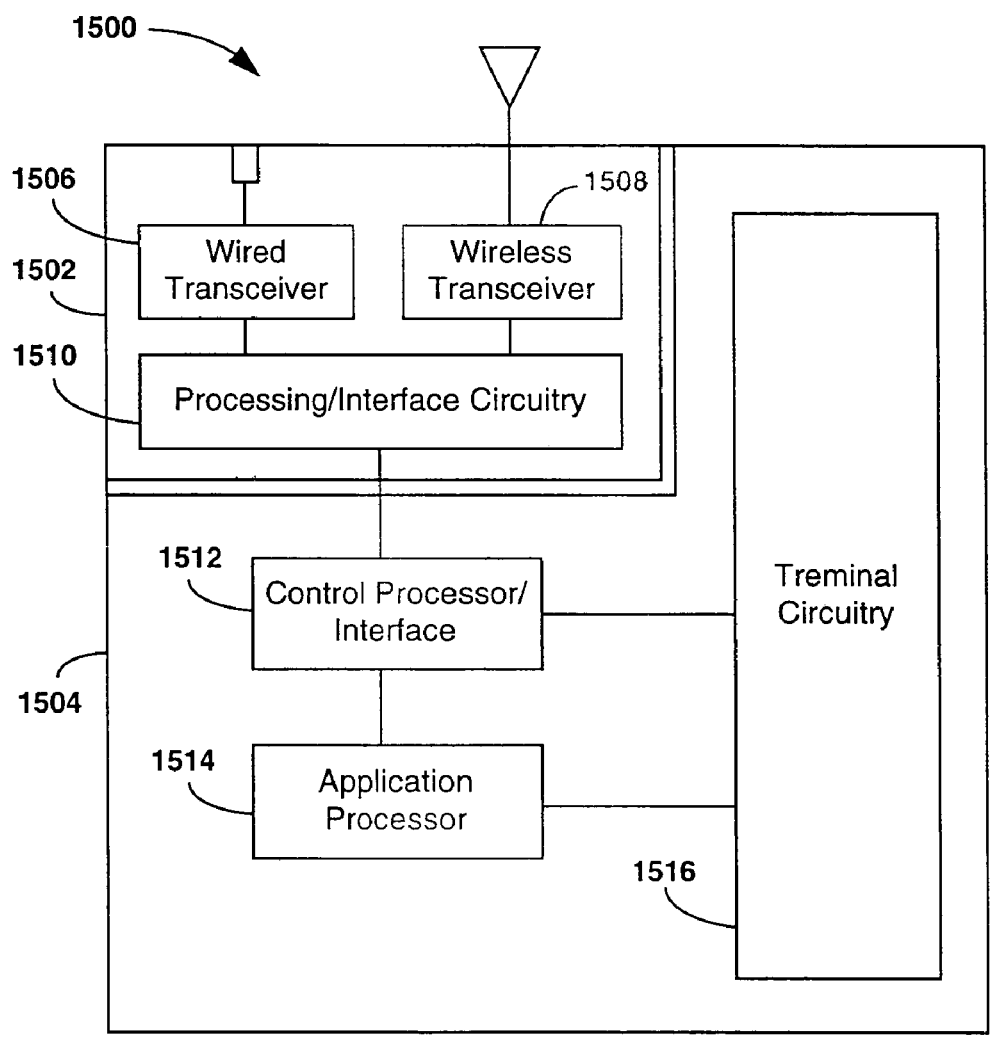
FIG. 22A illustrates one embodiment of the data collection terminal of the present invention, having both wired and wireless communication capability.

FIG. 22A illustrates one embodiment of the data collection terminal of the present invention, having both wired and wireless communication capability. A data terminal 1500 is shown having a communication module 1502 and a base module 1504. The communication module 1502 contains a wired transceiver 1506, a wireless transceiver 1508, and processing and interface circuitry 1510. The base module 1504 contains a control processor and interface 1512, an application processor 1514, and terminal circuitry 1516 containing data input and display portions and other circuitry well known in the art. The blocks shown in communication module 1502 and base module 1504 are simplified for exemplary purposes, and it will be understood by one skilled in the art that a data terminal 1500 according to the present invention is not limited to the block circuitry shown in FIG. 22A. In another embodiment, the communication module 1502 may contain additional transceivers for communicating on other mediums and in other networks. The processing and interface circuitry 1510 of the communication module 1502 isolates the circuitry of the base module 1504 from the differing operating characteristics of the transceivers, so that communication by any of the transceivers can be accommodated by the circuitry and software routines of the base module 1504.

In operation, the processing and interface circuitry 1510 of the communication module 1502 is programmed with the network configuration to route communication through either the wired transceiver 1506 or the wireless transceiver 1508. An incoming message on the wired transceiver 1506 may be routed and processed to a terminal display portion, or may be routed to a host computer, a dock, or another portable data terminal 1500 through the wired transceiver 1506 or through the wireless transceiver 1508, whichever is appropriate. Similarly, an incoming message on the wireless transceiver 1508 may be routed to display or through the wireless transceiver 1508 or through the wired transceiver 1506, whichever is appropriate for the destination. By provided for the routing functions to be done in the communication module 1502, the power used in the base module 1504 can be minimized. Specifically, the interface with the control processor 1512 and the application processor 1514 need not be used, which allows the main terminal in the base module 1504 to remain dormant while communications are routed in the communication module 1502.

The choice of which transceiver to use in routing communication is based on a "least cost" analysis, considering factors such as the power required to send the message through a particular transceiver, the speed at which the message will be received from a particular transceiver, the possibility of error associated with each transceiver, etc. A wired connection is usually selected when available, but routing decisions may vary with the different characteristics of each message and the mobility of the terminal. The processing and interface circuitry 1510 in the communication module 1502 is preferably capable of performing the least cost routing analysis for all communication messages, without activating any processing power from the base module 1504.

Figure 22B:
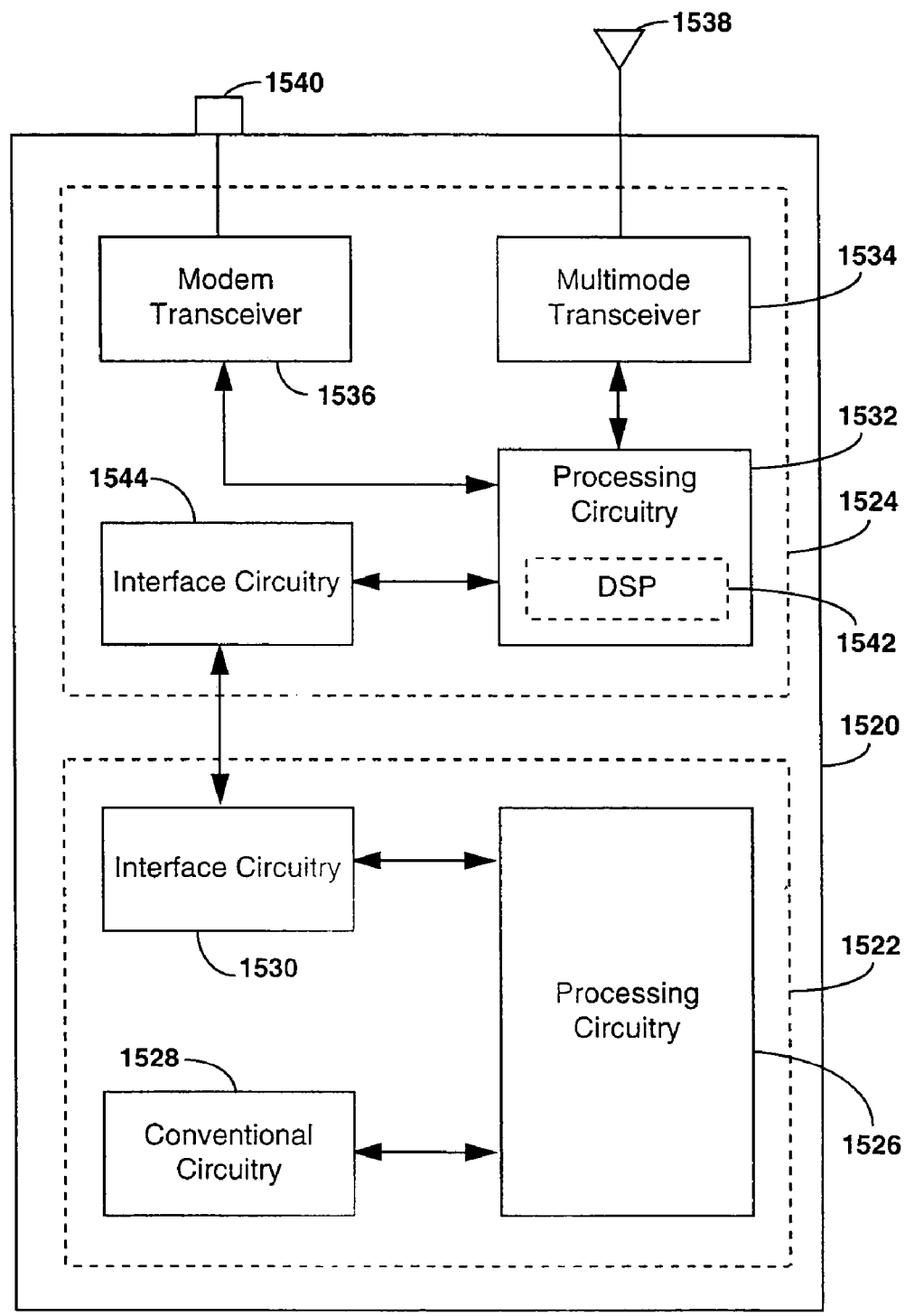
FIG. 22B is a diagram illustrating a specific implementation of the portable terminal of FIG. 22A a single PCMCIA card contains not only a multi-mode wireless transceiver, but also a wired modem transceiver.

FIG. 22B is a diagram illustrating a specific implementation of the portable terminal of FIG. 22A a single PCMCIA card contains not only a multi-mode wireless transceiver, but also a wired modem transceiver. In particular, a portable terminal 1520 contains terminal circuitry 1522 comprising processing circuitry 1526, conventional terminal circuitry 1528 and interface circuitry 1530. The interface circuitry 1530 provides a PCMCIA interface for receiving PCMCIA cards of various functionality. The terminal circuitry 1522 is well known and can be found in conventional portable or hand held computing devices.

Via the interface circuitry 1530, the portable terminal 1520 accepts PCMCIA cards. As illustrated, the PCMCIA card inserted constitutes a communication module 1524 which provides both wired and wireless access. Specifically, the communication module 1524 comprises processing circuitry 1532, a multi-mode wireless transceiver 1534 (such as set forth previously), a wired modem transceiver 1536 and interface circuitry 1544. When in use, the wired modem transceiver 1536 interfaces via a jack 1540 to a telephone line (not shown). Similarly, the wireless multi-mode transceiver 1534 communicates via an antenna 1538.

Whether the modem transceiver 1536 or multi-mode transceiver 1534 is being used, the processing circuitry 1526 always delivers and receives data and messages via the interface circuitry 1530 in the same manner and format, i.e., the interface circuitry 1530 supports a common communication interface and protocol. The processing circuitry 1532 of the communication module 1524 receives data and messages via the interface circuitry 1544. If the modem transceiver 1536 is being used, the processing circuitry 1532 appropriately (de)segments and (de)compresses the data/messages utilizing a digital signal processor (DSP) 1542. Otherwise, the processing circuitry 1532, including the DSP 1542, participate to assist in wireless communication via the multi-mode transceiver 1534. Thus, the module 1524 not only saves on PCMCIA slots (as required when a conventional radio card and a conventional modem card are both being used), but also saves costs and increases reliability by sharing common circuitry resources. In particular, the modem and multi-mode transceivers 1536 and 1534 share the interface circuitry 1544 and processing circuitry 1532 which includes the DSP 1542.

Figure 23:
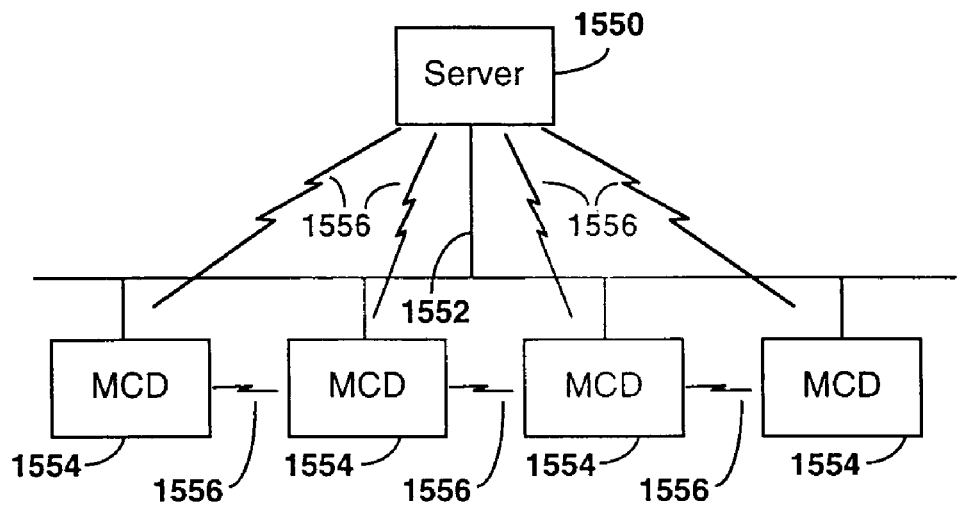
FIG. 23 is a diagram illustrating the use of portable terminals according to the present invention utilizing both wired and wireless communication in a network configuration.

FIG. 23 is a diagram illustrating the use of portable terminals according to the present invention utilizing both wired and wireless communication in a network configuration. Specifically, a server 1515 is shown connected to mobile computing devices (MCDs) 1554 via a wired communication link 1552. The communication link 1552 may alternatively be an infrared link, or another communication technology. MCDs 1554 are connected to each other and to the server via the link 1552. MCDs 1554 are also communicatively coupled to each other via wireless links 1556.

The network involving the server 1550, the communication link 1552, and the MCDs 1554 represents a primary communication network, that is preferable to use when there are no interference or disconnection problems in the network. The network between MCDs 1554 involving wireless links 1556 represents an auxiliary or backup network, which is used where there are problems with the primary network, or to run diagnostics on the primary network. The MCDs 1554 are equipped to automatically switch from the primary network to the auxiliary network when a problem arises on the primary network. This network redundancy allows the MCDs 1554 to remain in constant communication with each other and with server 1550.

For example, a wired network on a communication link 1552 does not recognize connection well, and may not immediately detect a loss of connectivity. MCDs 1554 utilize wireless links 1556 to diagnose a lack of connection on the wired network 1552. For example, an MCD 1554 may activate its radio to send a test message to another component of the network, either another MCD 1554 or the server 1550, to test communication on the wired link 1552 by sending a reply test message back to the inquiring MCD 1554. The test routine is preferably implemented and controlled by the processing/interface circuitry 1510 in the communication module 1502 (see FIG. 49) of the MCD 1554. If the reply communication test is not received, the MCD 1554 will know that there is a problem on the primary network, and will inform other MCDs 1554 to switch to the auxiliary network. The MCDs 1554 can continue to check the primary network via wireless links 1556 until the primary network is back in service.

Some MCDs 1554 may be out of range to effect wireless communication with server 1550 by a wireless link 1556. An out-of-range condition is determined according to the particular communication and connection protocol implemented by MCDs 1554 and other network components such as server 1550. In this situation, the out-of-range MCD 1554 sends its message, along with an out-of-range condition indicator, to another MCD 1554 that is in communication with the server 1550, and the in-range MCD 1554 forwards the message on to the server. Similarly, the server 1550 sends its messages intended for the out-of-range MCD 1554 to an in-range MCD 1554 to be forwarded over a wireless link 1556. The MCDs 1554 are capable of automatically switching from the wired network to the wireless network and vice versa for each communication attempt.

Figure 24:
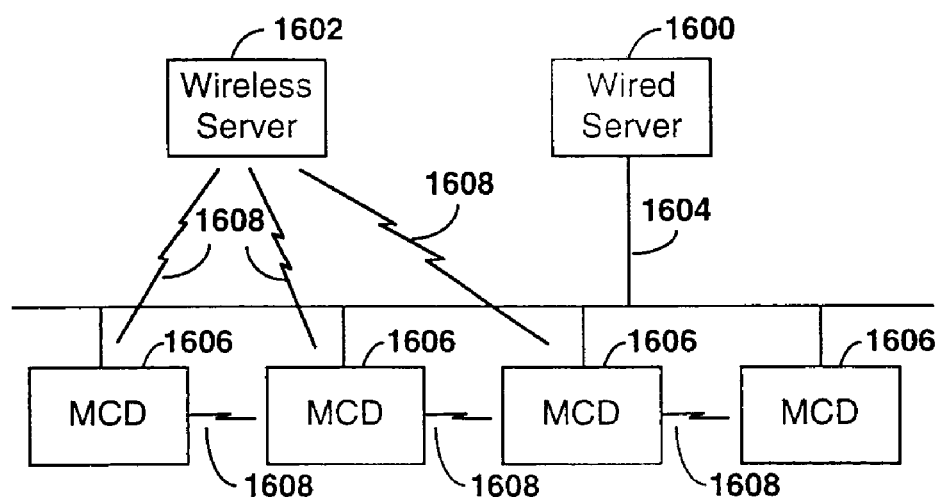
FIG. 24 is a diagram illustrating the use of portable data terminals according to the present invention utilizing both wired and wireless communication to access separate subnetworks in an overall communication network.

FIG. 24 is a diagram illustrating the use of portable data terminals according to the present invention utilizing both wired and wireless communication to access separate subnetworks in an overall communication network. Specifically, a wired network includes wired server 1600 and mobile computing devices (MCDs) 1606 connected by a wired communication link 1604. MCDs 1606 are also part of a wireless network with wireless server 1602, and are communicatively coupled to each other and the wireless server 1602 via wireless communication links 1608. Wireless links 1608 may be radio frequency communication links, such as narrowband, direct sequence spread spectrum, frequency hopping spread spectrum or other radio technologies. Alternatively, wireless links 1608 may be infrared communication links, or other wireless technologies. In another embodiment, the wired server 1600 and the wired communication links 1604 may utilize infrared communication technology, with the wireless communication links 1608 being radio frequency links. The present invention contemplates various combinations of communication technologies, all accommodated by communication modules of MCDs 1606. The communication modules of MCDs 1606 include any number of transceivers operable on any number of communication mediums, since the differences in their operating characteristics are isolated from the base module of the MCDs 1606 by a communication processor. The MCDs 1606 are preferably able to automatically switch between the wired and wireless networks, controlled primarily by a communication processor in their communication modules.

Some MCDs 1606 may be out of range to effect wireless communication with wireless server 1602 by a wireless link 1608. An out-of-range condition is determined according to the particular communication and connection protocol implemented by MCDs 1606 and other network components such as wireless server 1602. In this situation, the out-of-range MCD 1606 sends its message, along with an out-of-range condition indicator, to another MCD 1606 that is in communication with the wireless server 1602, either over a wireless link 1608 or alternatively over a wired link 1604 if both MCDs 1606 are constituents of a wired network. The in-range MCD 1606 then forwards the message on to the wireless server 1602 over wireless link 1608. Similarly, the wireless server 1602 sends its messages intended for the out-of-range MCD 1606 to an in-range MCD 1606 to be forwarded over a wireless link 1608 or a wired link 1604, if both MCDs are constituents of a wired network.

Figure 25A:
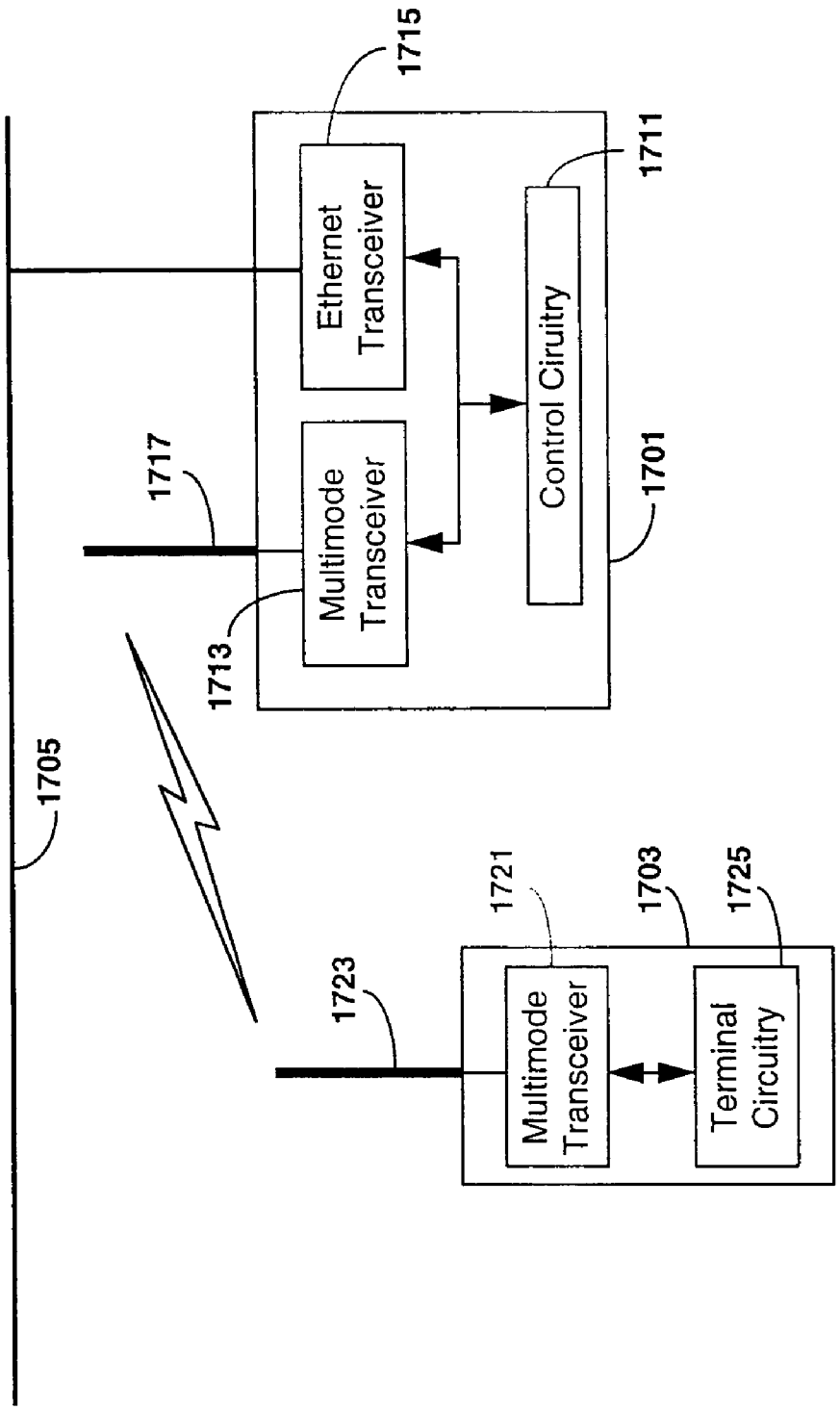
FIG. 25a is a block diagram illustrating an embodiment of the present invention wherein a wireless access device uses a dedicated control/busy channel to manage a plurality of modes of communication with roaming terminals.

FIG. 25*a* is a block diagram illustrating an embodiment of the present invention wherein a wireless access device uses a dedicated control/busy channel to manage a plurality of modes of communication with roaming terminals. Specifically, a wireless access device 1701 manages communication in a cell of network with a plurality of wireless terminals, such as a wireless terminal 1703. The network may contain a plurality of other cells each managed by an associated wireless access device to provide site or premises wide ubiquitous wireless coverage for the plurality of stationary and roaming wireless terminals. As illustrated, for example, the network may also contain wired communication links therein as provided, for example, by a wired Ethernet backbone LAN 1705.

The wireless access device 1701 comprises control circuitry 1711, a multimode transceiver 1713, an Ethernet transceiver 1715 and an antenna 1717. The Ethernet transceiver 1715 supports communication between the backbone LAN 1705 and the control circuitry 1711. Similarly, the multimode transceiver 1713 supports communication into a wireless network cell to wireless devices within range such as the wireless terminal 1703 via the antenna 1717. The multimode transceiver 1713 is more fully described below in reference, for example, to FIG. 1C.

A wireless terminal 1703 also comprises a multimode transceiver, a multimode transceiver 1721, as well as an associated antenna 1723 and conventional terminal circuitry 1725. Using the multimode transceiver 1721 and associated antenna 1723, the wireless terminal 1703 communicates with the wireless access device 1701 when it is within transmission/reception range.

The wireless access device 1701 selects (and may periodically reselect) one of a plurality of communication modes and associated parameters of operation based on a variety of factors mentioned previously such as recent success rate, RSSI, neighboring cell operation, etc. However, when the wireless terminal 1703 roams within range of the wireless access device 1701, the roaming terminal must identify the currently selected mode and associated parameters being used by the wireless access device 1701 to maintain the cell's communication. Although the wireless terminal 1703 could be configured to scan each available mode to identify the currently selected mode and parameters, such efforts often prove time consuming.

Instead, the wireless terminal 1703 and wireless access device 1701 are preconfigured with mode and parameter information that defines a default, busy/control channel. Thus, upon roaming into range of the wireless access device 1701, the wireless terminal 1703 first switches to the busy/control channel by operating the multimode transceiver 1721 according to the preconfigured mode and parameters, and then begins listening. Within a predefined maximum time period thereafter, the wireless terminal 1703 will receive transmissions from the wireless access device 1701 identifying the currently selected communication channel mode and associated parameters. The wireless access device 1701 periodically broadcasts such information on the busy/control channel to capture terminal that happens to need communication channel definitions (e.g., selected mode and parameters) to participate. The wireless terminal 1703 utilizes identified mode and associated parameter information to switch the multimode transceiver 1721 over to the selected communication channel and begins participation thereon.

Figure 25B:
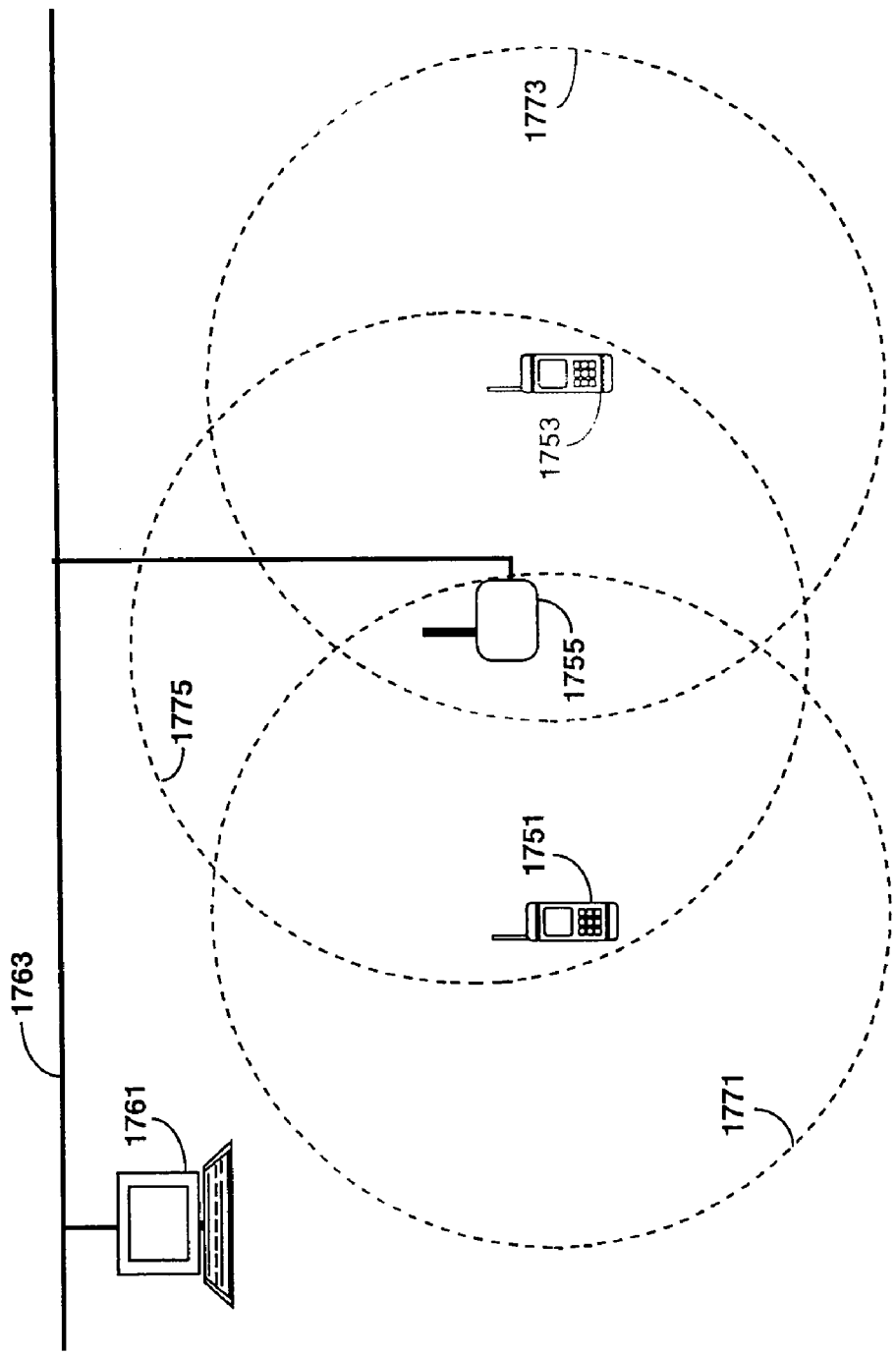
FIG. 25b is a drawing illustrating advantages operation of the wireless access device of FIG. 25a when two roaming terminals encounter hidden terminal conditions.

FIG. 25b is a drawing illustrating advantageous operation of the wireless access device of FIG. 25a when configured to handle hidden terminal conditions. In particular, each of wireless terminals 1751 and 1753 is configured to only switch from the busy/control channel (having predefined mode and associated parameters) to the communication channel (selected by a wireless access device 1755) when there is a need for access to the communication channel and the communication channel is clear (available). In this configuration, when no desire to communicate is present, the terminals 1751 and 1753 need only occasionally check the busy/control channel to identify any outstanding messages or communication requests as transmitted by the wireless access device 1755. If either terminal 1751 or 1753 desires to participate on the communication channel (to initiate communication or to respond to awaiting messages or communication requests), that terminal need only monitor the busy/control channel long enough to identify a clear communication channel before switching over to the communication channel to participate. As before, the wireless access device 1755 also periodically identifies the communication channel mode and associated parameters as selected and reselected by the wireless access device 1755.

To fully appreciate this process, first assume that the wireless terminals 1751 and 1753 are not within range of the wireless access device 1755. Upon wandering within range of the wireless access device 1755, the wireless terminal 1751 utilizing the predefined mode and parameters begins listening for transmissions on a busy/control channel. Within some time period thereafter, the wireless access device 1755 participates on the busy/control channel to transmit: 1) the currently selected communication channel definition (i.e., mode and parameters); 2) pending message and communication request indicators; and 3) current channel conditions. After identifying a need to participate, the wireless terminal 1751 awaits a transmission from wireless access device 1755 (on the busy/control channel) that the selected communication channel is clear (not in use). When the channel is clear, the wireless terminal 1751 adopts the selected communication channel definition and begins participating thereon.

Second, assume that, while the wireless terminal 1751 is engaged in ongoing communication with a computing device 1761 on a backbone LAN 1763 via the wireless access device 1755, the wireless terminal 1753 comes within range of the wireless access device 1755 and desires to participate on the currently selected communication channel. The wireless terminal 1753 adapts itself to participates on the busy/control channel and identifies, in periodic transmissions from the wireless access device 1755, that the communication channel is busy. Thus, the wireless terminal 1753 must monitor the busy/control channel to identify when the communication channel is clear before adapting to the communication channel to participate.

This operation works whether or not the terminals 1751 and 1753 are within range of each other. In particular, the terminal 1751, terminal 1753 and access device 1755 have transmission ranges illustrated by dashed circles 1771, 1773 and 1755, respectively. Although both terminals 1751 and 1753 are within range of the access device 1755, neither are in range of each other and, thus, are referred to as "hidden" from each other. The access device 1755 is within range of both of the terminals 1751 and 1753. If the wireless terminal 1753 attempted to transmit on the communication channel while the terminal 1751 was transmitting, a collision would occur at the wireless access device 1755. However, this is not the case because both of the terminals 1751 and 1753 must receive a communication channel clear indication on the busy/control channel from the wireless access device 1755 that is in range of both, avoiding the hidden terminal problem. When participation is completed on the communication channel, the terminals 1751 and 1753 readopt the busy/control channel definition (i.e., mode and associated parameters).

Participation by the wireless access device 1755 on the busy/control channel need only be by transmitting, although receiving might also be employed in case the busy/control channel is to be shared. Similarly, participation by the wireless terminals 1751 and 1753 need only be by receiving transmissions, although transmitting might also be employed. In particular, transmission might be employed by a wireless terminal on the busy/control channel if the wireless terminal does not support the currently selected communication channel, i.e., does not support the mode and associated parameters.

In addition, should the two terminals 1751 and 1753 be within range of each other and desire to intercommunicate, the wireless access device 1755 will allocate an unused, non-competing mode in which the two terminals can exchange information or data. In particular, one of the wireless terminals 1751 and 1753 first attempts to establish an exchange by gaining access to the communication channel (via busy/control channel monitoring). Once access has been established, the wireless terminal, e.g., the terminal 1751 delivers a request for poll message (RFP) to the wireless access device 1755 which identifies the amount of data or information to be exchanged if known, the recipient or target (e.g., the terminal 1753), and characteristics of the data or information such as whether real time dedicated bandwidth is not needed, desired or required. If the amount of data or information to be exchanged is minimal and requires no dedicated bandwidth, the wireless access device 1755 will not bother attempting to dedicate a mode to the transceivers 1751 and 1753. Instead, the wireless access device 1755 will merely relay the information or data received from the terminal 1751 to the terminal 1753 and vice versa. Otherwise, the wireless access device 1755 will examine its lookup table to see if the terminal 1753 currently participates within the network cell (i.e., within range) of the wireless access device 1755. If the terminal 1753 doesn't participate, the wireless access device 1755 will inform the terminal 1751 and only proceed with relaying functionality (or spanning tree wireless routing, for example) per confirmation by the terminal 1751. However, if the terminal 1753 does participate, the wireless access device 1755 concludes that there is a good chance that the terminals 1751 and 1753 are within range of each other. Thus, the wireless access device 1755 attempts to identify an available and appropriate mode and associated parameters that may be temporarily assigned to the terminals 1751 and 1753 for their communication exchange. The wireless access device 1755 attempts to communicate such channel information to both of the terminals 1751 and 1753. Thereafter, as soon as either of the terminals 1751 and 1753 receive the information, the terminal will immediately set their multimode radio to the dedicated mode and parameters, listen for polling messages from the other terminal, and, if no poll messages are detected, begin transmitting polling messages to the other terminal. If a polling message is received, the communication exchange, such as dedicated voice bandwidth, will take place. Afterwards, the terminals 1751 and 1753 inform the wireless access device 1755 that the allocated channel is no longer needed and may be reallocated. Similarly, if a terminal polls for the other for a predefined period of time on the allocated channel without receiving any response, that terminal will inform the wireless access device 1755 of the failure, and the wireless access device will free the allocated mode for reallocation or communication channel use.

Figure 25C:
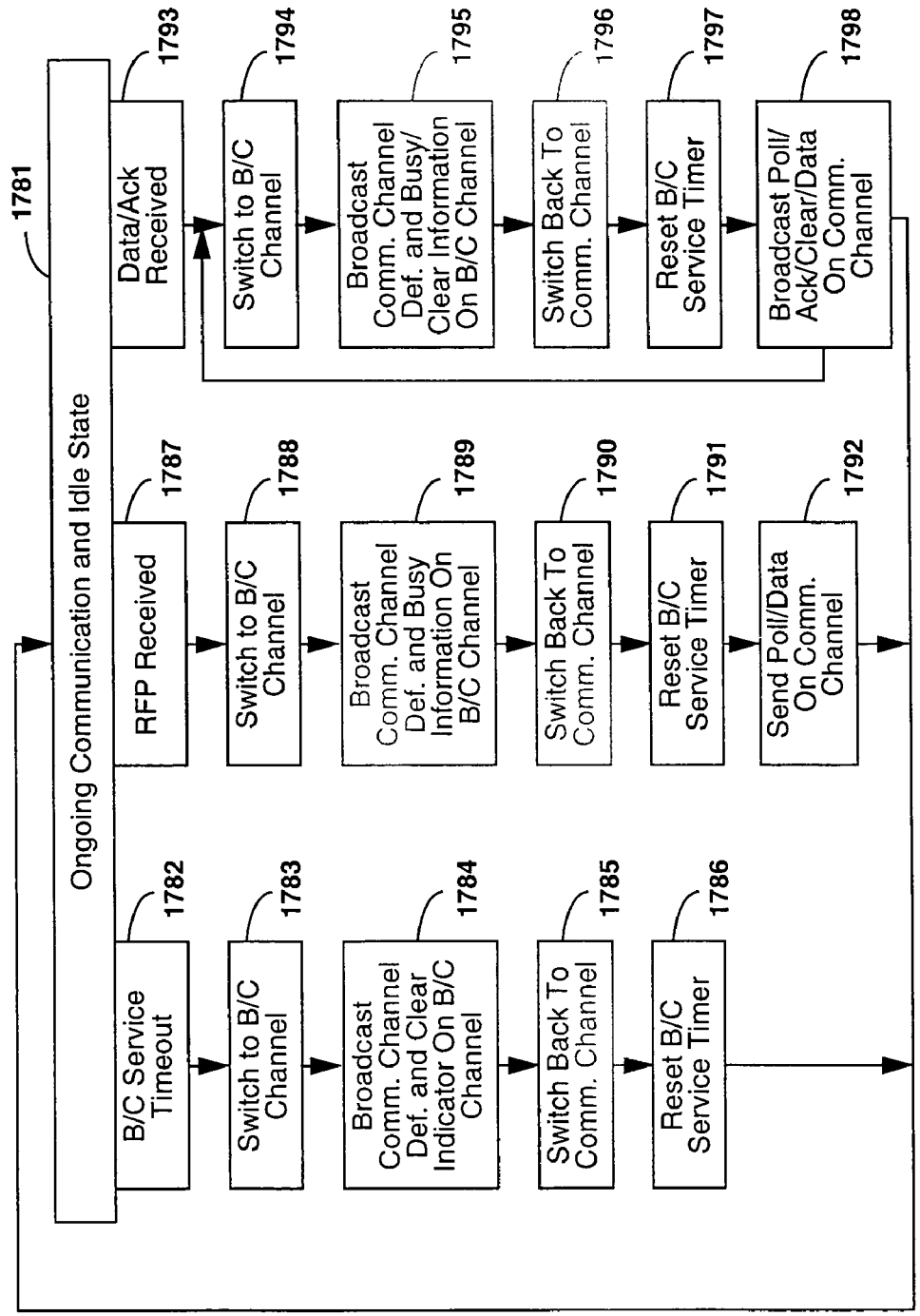
FIG. 25c is a flow diagram illustrating the functionality of the wireless access device of FIGS. 25a-b in managing communication using a control/busy channel.

FIG. 25*c* is a flow diagram illustrating the functionality of one embodiment of the wireless access device of FIG. 25*b* in managing a communication channel using a second channel, i.e., the busy/control channel. The wireless access device maintains ongoing communication or otherwise waits in an idle state at a block 1781. If a predetermined time out period (e.g., a B/C service time period) lapses while the access device is in an idle state as indicated at a block 1782, the access device switches to the predefined mode and associated parameters of the busy/control channel at a block 1783. At a block 1784, on the busy/control channel, the access device transmits: 1) the currently selected communication channel definition (mode and parameters); 2) channel status indications; and 3) pending message/communication request indications. Thereafter, at a block 1785, the access device switches back to the selected communication channel mode and parameters, resets the B/C service time period (at a block 1786) and returns to the block 1781 to participate on the communication channel.

If, while participating on the selected communication channel at the block 1781, a request for poll (RFP) transmission is received from a wireless terminal as indicated at an event block 1787, the wireless access device responds by switching to the busy/control channel at a block 1788 to deliver communication channel definition, channel "busy" indications and any pending message/communication request indications at a block 1789. Although the busy indication may only indicate that the selected communication channel is not available, it also indicates an estimated amount of time during which the channel will be busy. The wireless access device derives this estimate from the overall data size to be transferred as determined from the data itself or from a field in the RFP transmission, if known. This way, a waiting wireless transceiver may go to sleep while an ongoing exchange is taking place and wake up when the exchange is scheduled to have finished.

Thereafter, at a block 1790, the wireless access device switches back to the selected communication channel mode and parameters, resets the B/C service time period (at a block 1791), transmits a Poll or Data message (whichever is appropriate under the circumstances) on the communication channel at a block 1792, and returns to the block 1781 to await a Data or Ack (acknowledge) message from a participating wireless transceiver. In particular, in response to an RFP from a participating wireless device that has Data to deliver via the wireless access device, the wireless access device delivers a Poll message at the block 1792 to the participant, prompting for the Data. Otherwise, if the RFP indicates a desire by the participating wireless terminal to receive Data, the wireless access device sends the Data at the block 1792. The Data sent at the block 1792 may be of any length including dedicated bandwidth for an unknown duration. Thus, if a wireless terminal listens for a period of time greater than the B/C service time period and detects no transmission from the access device on the busy/control channel, the wireless terminal concludes that the selected communication channel is busy.

Alternately, data may be segmented into Data packets for transmission one packet at a time via the blocks 1781 and 1787-92. In this way, a listening wireless terminal will can be sure that it will receive a communication channel broadcast via the blocks 1782-86 between each Data packet transmission. Upon receipt, wireless terminals may place their transceivers in a sleep mode until each of the Data packets of the data have been exchanged, and the communication channel is clear.

Upon receiving the data (or Data packet) or an acknowledge (ACK) message indicating successful receipt of data (or a Data packet) as indicated at an event block 1793, the wireless access device broadcasts a Poll, Ack or Clear message or sends data (or packets thereof) as proves appropriate at a block 1798. The access device then switches to the busy/channel at a block 1794 to transmit the currently selected communication channel definition, busy or clear indications and pending messages/requests at a block 1794. Afterwards, the wireless access device switches back to the communication channel at a block 1796, resets the B/C service time period at a block 1797 and returns to the block 1781 to continue communication exchanges or enter an idle state if the exchange is complete.

Figure 26A:
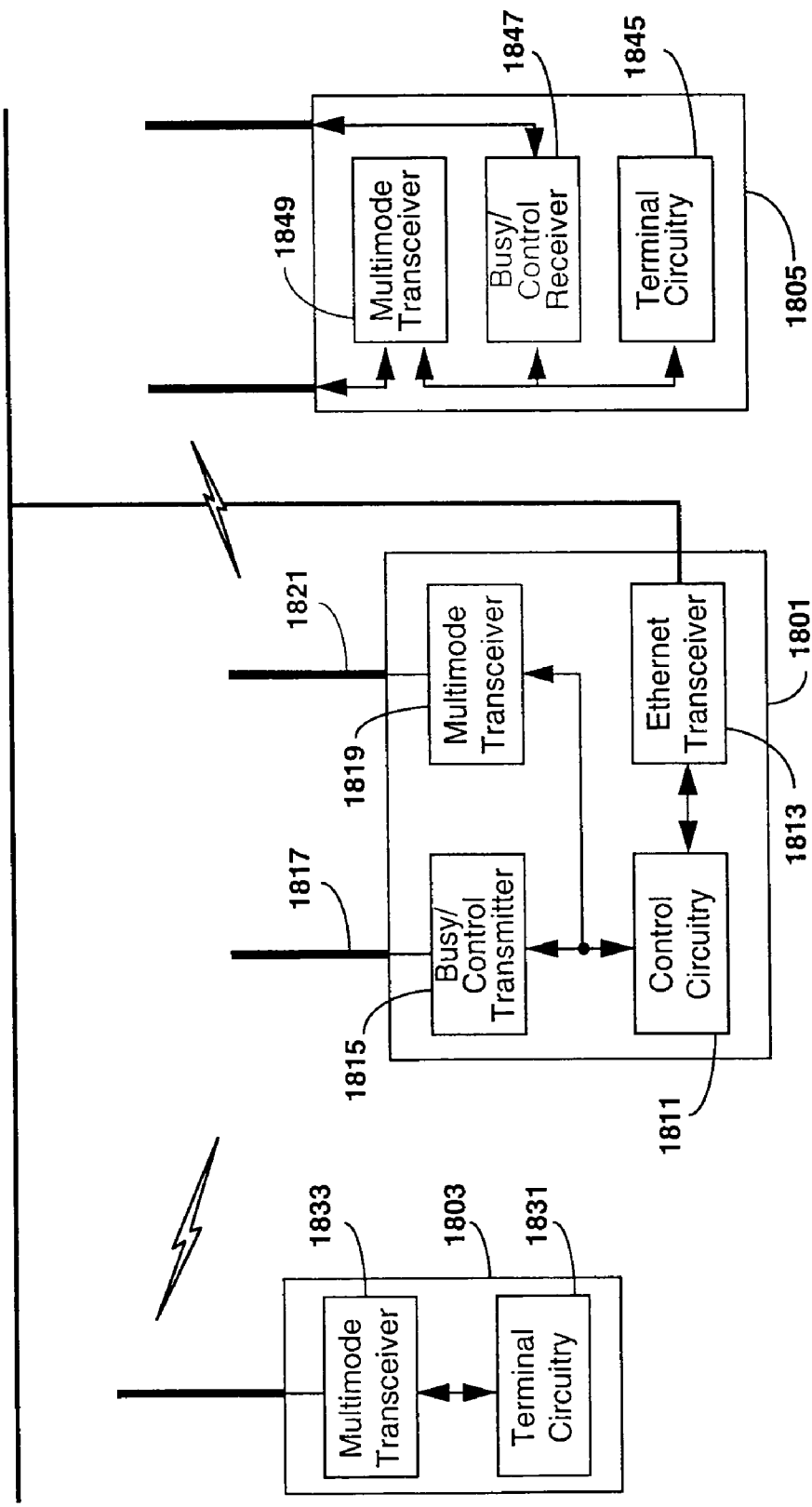
FIG. 26a is a block diagram illustrating an alternate embodiment of that shown in FIG. 25a wherein a wireless access device uses a separate transmitter for the dedicated control/busy channel and a roaming terminal uses either a shared multimode transmitter or a multimode transmitter and a separate busy/control channel receiver.

FIG. 26*a* is a block diagram illustrating an alternate embodiment of that shown in FIG. 25*a* wherein a wireless access device uses a separate transmitter for the dedicated control/busy channel and a roaming terminal uses either a shared multimode transmitter or a multimode transmitter and a separate busy/control channel receiver. In the previous embodiments of FIGS. 25*a-c*, the wireless access device and wireless transceivers each used a multimode transceiver to support participation on two wireless channels: the selected communication channel and the busy/control channel. As illustrated, this need not be the case. Instead, a wireless access device 1801 participates using two radios when communicating with a wireless transceiver 1803 (having only a single multimode radio) and a wireless transceiver 1805 (having two radios). With a dual radio configuration, participation on both channels may occur at the same time, increasing overall performance in many circumstances.

In particular, a wireless access device 1801 comprises control circuitry 1811, an Ethernet transceiver 1813, a busy/control transmitter 1815 and corresponding antenna 1817, and a multimode transceiver 1819 and corresponding antenna 1821. Having separate radio units and antennas, the wireless access device 1801 participates on: 1) a selected communication channel defined by mode and parameter information, servicing data exchanges in the communication network cell; and 2) the busy/control channel defined by predetermined mode and parameter information known to all wireless transmitters, controlling access to the selected communication channel. Such participation is often simultaneous, preventing a wireless terminal from having to wait long on the busy/control channel for a transmission.

In one configuration, where hidden terminals prove to be of little concern, the wireless terminals 1803 and 1805 are only forced to wait on the busy/control channel until they receive the selected communication channel definition. In another configuration, as better exemplified in FIG. 26*b* which follows, all wireless terminals participate on the busy/control channel except when they have a need and gain access to the selected communication channel. In this latter configuration, when the wireless access device 1801 is participating on the selected communication channel with the wireless terminal 1805, for example, the wireless access device 1801 concurrently delivers communication channel definition, busy/clear status and message/request indications on the busy/control channel. Such information can be repeatedly transmitted at any time interval desired or may be transmitted continuously.

Similarly, although a wireless transceiver may operate with a single multimode radio as described previously, it may also take advantage of multiple radios. Specifically, the wireless transceiver 1803 comprises terminal circuitry 1831 and only one radio, a multimode transceiver 1833. Thus, the wireless transceiver 1803 is forced to time share participation on the busy/control channel and the selected communication channel—often all that is needed. However, the wireless terminal 1805 comprises terminal circuitry 1845 and two radios, a busy/control channel receiver 1847 and a multimode transceiver 1849. As such, the wireless terminal 1805 may place the multimode transceiver 1849 in a low power state, and only powering up its busy/control channel receiver 1847 to check in. Characteristics of the busy/control channel may be chosen to permit significant overall power savings and simplicity in the design of the receiver 1847.

Figure 26B:
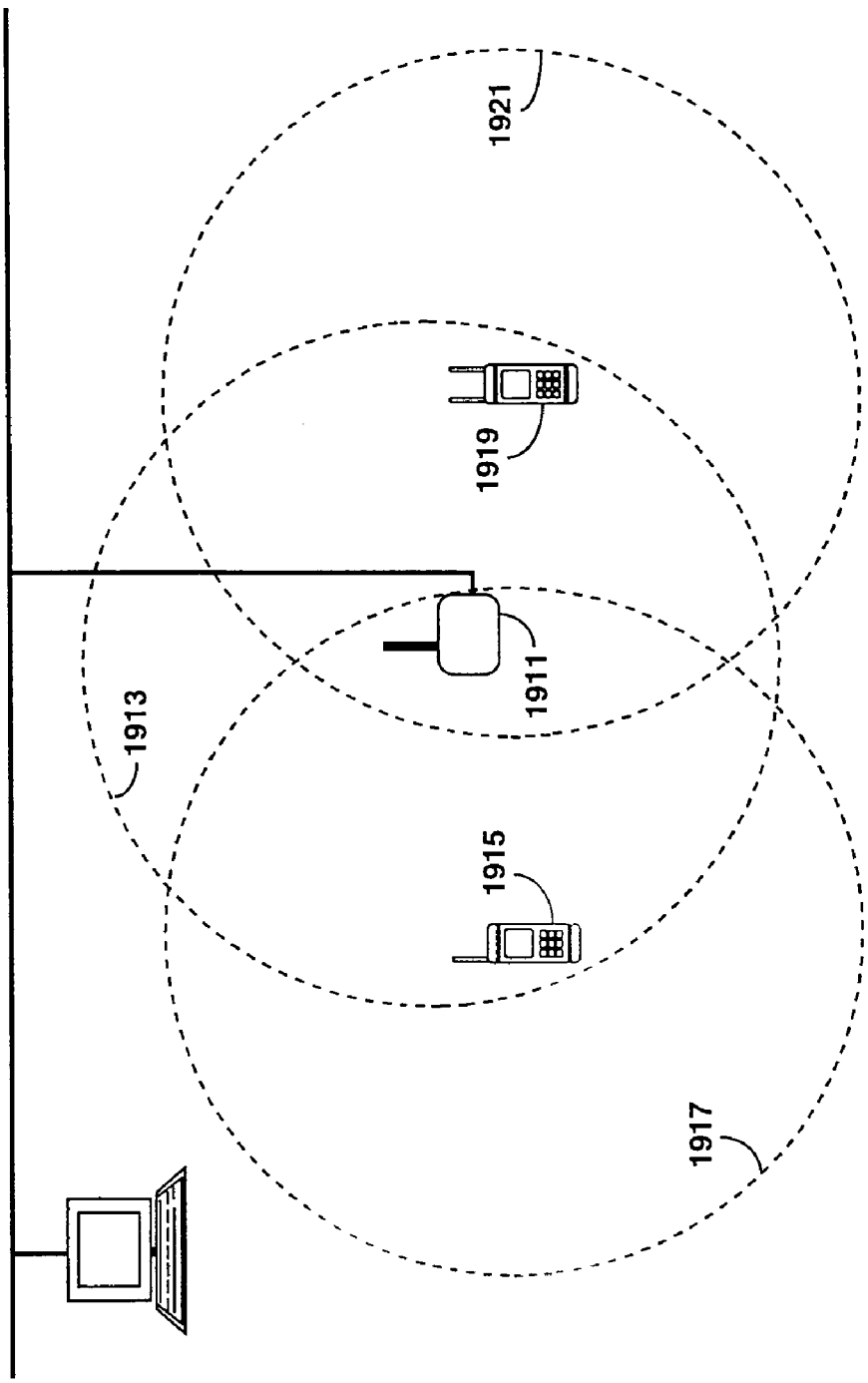
FIG. 26b is a drawing illustrating advantageous operation of the wireless access device of FIG. 26a when the two roaming terminals encounter hidden terminal conditions.

FIG. 26*b* is a drawing illustrating advantageous operation of the wireless access device of FIG. 26*a* when configured to overcome the hidden terminal conditions. As with FIG. 25*b*, the range of a wireless access device 1911 is defined by a dashed circle 1913. Similarly, the wireless terminals 1915 and 1919 have ranges defined by dashed circles 1917 and 1921, respectively. The wireless terminals 1915 and 1919 are out of range of each other. The wireless access device 1911 is within range of each of the wireless terminals 1915 and 1919.

Unlike the wireless access device 1755 (of FIG. 25*b*), the wireless access device 1911 participates on both a busy/control channel and a selected communication channel simultaneously. The wireless access device 1911 delivers all communication channel information either continuously or periodically on the busy/control channel, while idle or servicing any wireless terminal on the communication channel. By doing so, the wireless access device 1911 is free to set any length data segments or none at all on a selected communication channel, while delivering communication channel information as often as desired on the busy/control channel. Thus, the busy/control channel and communication channel can be designed for optimized performance without having to consider time sharing of a single channel or time sharing a transceiver.

Thus, the busy/control channel can be designed to minimize the listening time of the wireless terminals 1915 and 1919 to gain status information. Sleep periods of the wireless (and often hand-held and portable) terminals 1915 and 1919 increased saving critical battery power. Similarly, data segmentation can be set based solely on the conditions of the selected communication channel, and not merely to guarantee the wireless access device 1911 a maximum interleaving time period during which the wireless access device 1911 will participate on the busy/control channel.

Figure 26C:
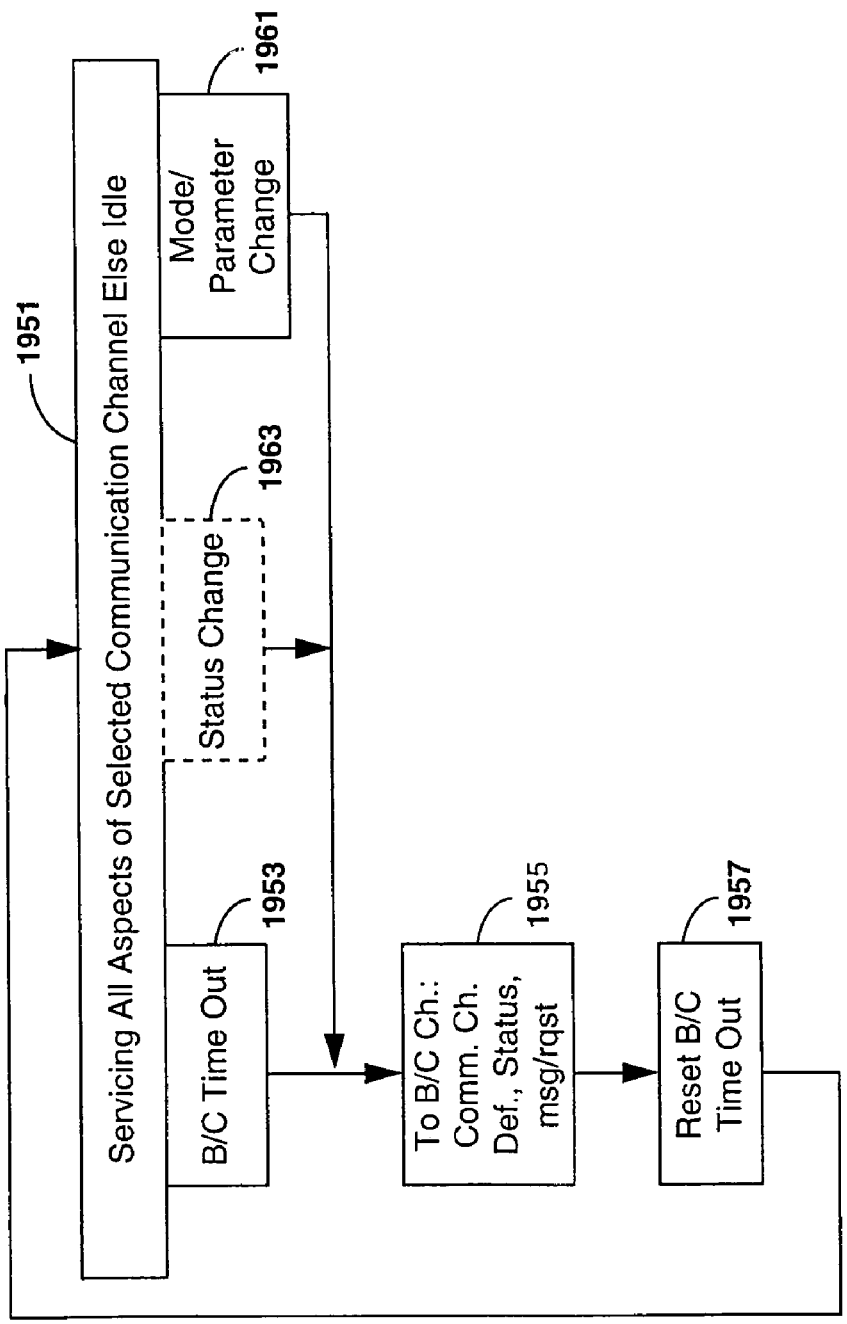
FIG. 26c is a flow diagram illustrating the functionality of the wireless access device of FIGS. 26a-b in managing communication using a control/busy channel.

FIG. 26*c* is a flow diagram illustrating the functionality of one embodiment of the wireless access device of FIG. 26*b* in managing a communication channel using a control/busy channel with dual radios. Specifically, a wireless access device waits in an idle state or is engaged in ongoing communication on the selected communication channel at a block 1951. As soon as a B/C time period lapses as indicated by an event block 1953, the wireless access device branches to a block 1955 to transmit mode, parameter and status information regarding the currently selected communication channel along with indicators of pending messages and communication requests. Afterwards, the wireless access device resets the B/C time period at a block 1957 and branches back to the block 1951 to continue servicing the selected communication channel or reenter an idle state. Thus, a preset (B/C time period) intervals, the wireless access device delivers the selected communication channel information on the busy/control channel. The B/C time period may be configured to either minimize transmission overhead or minimize wireless terminal listening times. The B/C time period might also be set to zero, causing the wireless access device to continuously transmit the selected control channel information (i.e., the selected mode and parameters, busy or clear status, predicted duration of a current exchange, and pending messages and communication requests). The B/C period is thus a synchronous period. Thus, a maximum value of the B/C period (or an other commonly known value) provides a wireless terminal with a guaranteed maximum listening time.

Although the B/C time interval may prove sufficient to communicate updates to the selected communication channel information, the wireless access device is also configured to immediately identify any mode or parameter changes of the selected communication channel. In particular, at a block 1961, if for any of a variety of reasons the wireless access device decides to switch the mode and/or parameters of the communication channel, the wireless access device vectors to immediately deliver such information on the busy/control channel via the blocks 1955 and 1957. Similarly, the wireless access device may also be configured (as indicated by the dashed lines) to respond to immediately report status changes such as whether a message or a request for dedicated bandwidth has been received as indicated at a block 1963 and the blocks 1955 and 1957. Other immediate event servicing may also be added and similarly serviced.

Unlike the single radio (shared) embodiments previously mentioned, the wireless access device services the block 1955 and 1957 no matter what the wireless access device is currently engaged in on the selected communication channel.

Figure 27:
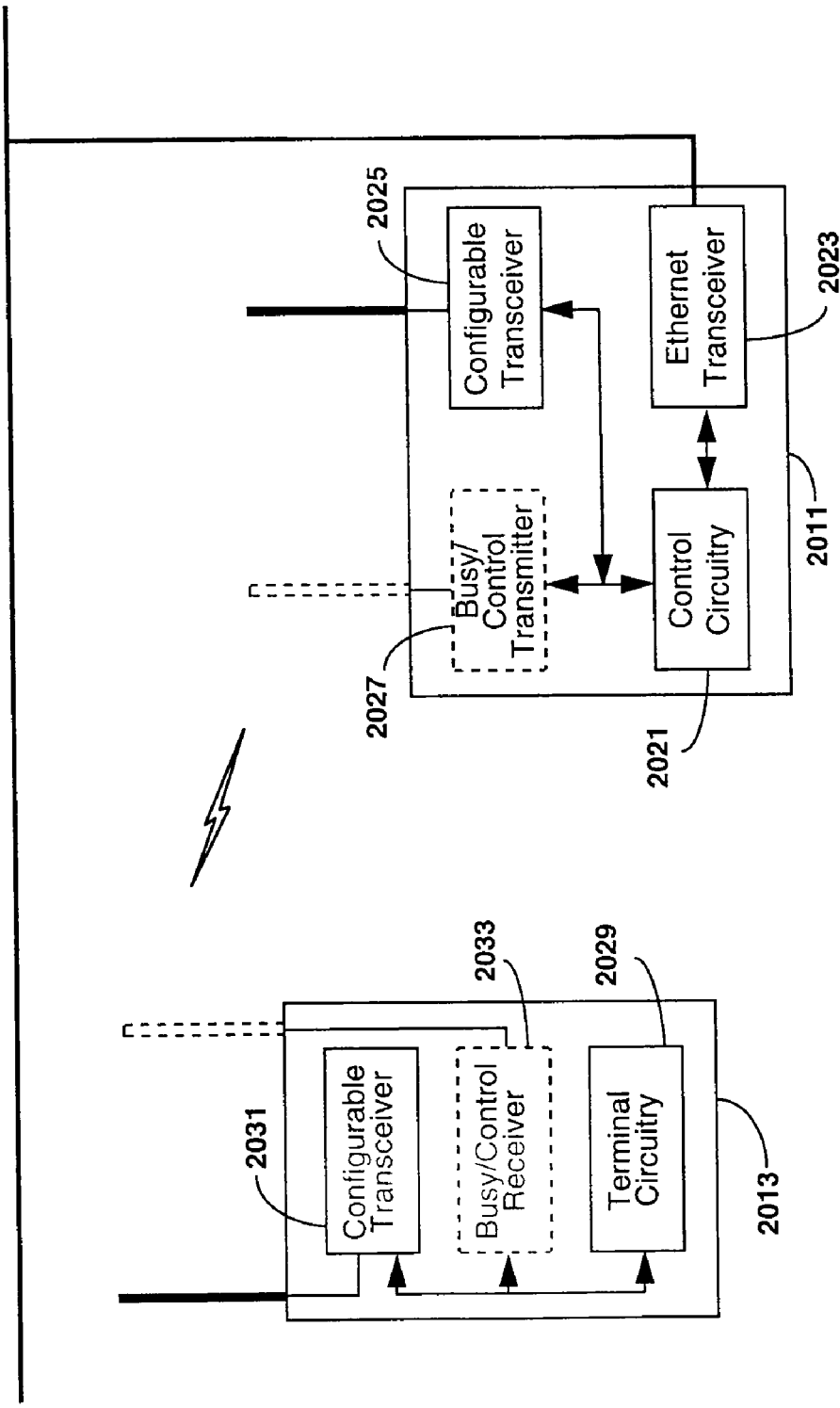
FIG. 27 is a block diagram illustrating a further embodiment of the present invention wherein channel selection and operating parameters are delivered by a wireless access device on a dedicated busy/control channel with or without multimode transceiver capabilities.

FIG. 27 is a block diagram illustrating further embodiments of the present invention wherein channel selection and operating parameters are delivered by a wireless access device on a dedicated busy/control channel with or without multimode transceiver capabilities. In particular, supporting a plurality of wireless terminals such as a terminal 2013, a wireless access device 2011 maintains two channels: a communication channel and a busy/control channel as previously described. To carry out such functionality, the wireless access device 2011 may comprise control circuitry 2021, an Ethernet transceiver 2023 and either a single, configurable transceiver 2025 (for operating on both the communication and busy/control channels) or a single transceiver 2025 (for the communication channel which may have only limited if any configuration capability) and a single transmitter 2027 (for operating on the control channel).

With the single, configurable transceiver 2025, the wireless access device may operate identically to that described in reference to FIGS. 25A-C. However, the configurable transceiver 2025 may not provide multimode operation, but only support multiple channels operating in a single mode. For example, the transceiver 2025 may only support the mode of channelized direct sequence. Although only a single mode is available, the parameters such as (and defining) spreading codes, spreading code lengths, channel center frequency and channel bandwidth, for example, alone, and without mode change, provide the wireless access device 2011 with the ability to support a dedicated busy/control channel and provide a plurality of other channels for maintaining the communication channel.

Alternatively, the wireless access device 2011 may also comprise a dedicated busy/control transmitter 2027. If it does, the wireless access device 2011 with a multimode transceiver 2025 would operate as detailed in reference to FIGS. 26A-C. If configured with a single mode transceiver 2025 supporting only one channel, the wireless access device 2011 would still maintain the communication and busy/control channels buy need only identify parameter and pending messages and communication requests on the busy/control channel. Of course the busy/control channel would still solve the hidden terminal problems and provide the associated benefits described above. Finally, with the transmitter 2027 supporting the busy/control channel, the transceiver 2025 might support multiple communication channels without supporting multiple modes of operation. In such configurations, the wireless access device 2011 need not report mode change information on the busy/control channel. Reporting all other information and aforementioned control would still take place.

The wireless transmitter 2013 could accommodate the same wireless configuration as described in reference to the wireless access device 2011. Along with conventional terminal circuitry 2029, it may have a multimode or non-multimode, configurable or non-configurable transceiver 2031. The transceiver 2031 might operate independently or utilize a supporting busy/control receiver 2033. Lastly, although not necessary, the transmitter 2027 and receiver 2033 might each constitute transceivers.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents. It is to be understood that many variations and modifications may be effected without departing from the scope of the present disclosure.

What is claimed is:

1. A PCMCIA-sized card suitable for connection to a portable computer comprising a radio transceiver within the card capable of processing radio communications, the transceiver comprising a receiver including:
   a down converter arranged to convert RF communication signals to IF communication signals;
   a first IF bandpass filter capable of passing a first band of frequencies; and
   a second IF bandpass filter capable of passing a second band of frequencies different from the first band of frequencies,
   wherein the portable computer supports spanning tree routing.

2. The card of claim 1 wherein the radio transceiver is arranged to transmit and receive spread spectrum radio frequency communications.

3. The card of claim 1 wherein the radio transceiver is capable of processing radio communications according to a first protocol used for communications and also is capable of processing radio communications according to a second protocol used for communications.

4. The card of claim 3 wherein the first protocol is used for communications in a first frequency range and wherein the second protocol is used for communications in a second frequency range different from the first frequency range.

5. The card of claim 4 wherein the second frequency range includes 2.4 GHz.

6. The card of claim 1 and further comprising a metallic shield adjacent the card arranged to provide electromagnetic shielding for the radio transceiver.

7. The card of claim 1 wherein the portable computer comprises a laptop computer.

8. A PCMCIA-sized card suitable for connection to a portable wireless communications device, the card comprising a wireless radio frequency (RF) transceiver that is configured to support wireless spread spectrum communications, the wireless RF transceiver comprising a receiver that comprises a down converter, a first intermediate frequency (IF) bandpass filter and a second IF bandpass filter, the down converter being configured to convert RF communication signals into IF communication signals, the first IF bandpass filter being configured to pass a first band of frequencies, the second IF bandpass filter being configured to pass a second band of frequencies different from the first band of frequencies, wherein the portable wireless communications device supports spanning tree routing.

9. The card of claim 8, wherein the wireless spread spectrum communications comprises communications that employ frequency hopping.

10. The card of claim 8, wherein the wireless spread spectrum communications comprises direct sequence spread spectrum communications.

11. The card of claim 8, wherein the wireless spread spectrum communications comprises communications that employ code spreading.

12. The card of claim 8, wherein the portable wireless communications device supports direct sequence spread spectrum communications and frequency hopping.

13. The card of claim 8, wherein the portable wireless communications device supports a plurality of spread spectrum communication modes.

14. The card of claim 8, wherein the portable wireless communications device supports wireless local area network communications.

15. The card of claim 8, wherein the portable wireless communications device supports cell-based network communications.

16. The card of claim 15, wherein the portable wireless communications device comprises a hand-held wireless communications device.

17. The card of claim 15, wherein the portable wireless communications device comprises a roaming wireless communications device.

18. The card of claim 8, wherein the portable wireless communications device is battery powered.

19. The card of claim 8, wherein the portable wireless communications device supports on-off keying.

20. The card of claim 8, wherein the wireless RF transceiver is capable of processing radio communications according to a first communications protocol and is capable of processing radio communications according to a second communications protocol.

21. The card of claim 20, wherein the first communications protocol is used for communications in a first frequency range, and wherein the second communications protocol is used for communications in a second frequency range that is different from the first frequency range.

22. The card of claim 21, wherein a frequency of 2.4 GHz is part of the second frequency range.

23. The card of claim 8, wherein the portable wireless communications device comprises a metallic shield that is adjacent the card and that provides electromagnetic shielding for the wireless RF transceiver.

24. The card of claim 8 wherein the portable wireless communications device comprises a laptop computer.

* * * * *